United States Patent [19]
Silverbrook

[11] Patent Number: 6,002,847
[45] Date of Patent: Dec. 14, 1999

[54] HIGH CAPACITY COMPRESSED DOCUMENT IMAGE STORAGE FOR DIGITAL COLOR PRINTERS

[75] Inventor: Kia Silverbrook, Leichhardt, Australia

[73] Assignee: Eastman Kodak Company, Rochester, N.Y.

[21] Appl. No.: 08/750,312

[22] PCT Filed: Apr. 10, 1996

[86] PCT No.: PCT/US96/04897

§ 371 Date: Nov. 26, 1996

§ 102(e) Date: Nov. 26, 1996

[87] PCT Pub. No.: WO96/32811

PCT Pub. Date: Oct. 17, 1996

[51] Int. Cl.[6] ............................. B41B 15/00; G01D 9/28
[52] U.S. Cl. .......................... 395/116; 395/116; 395/115; 395/114; 395/110; 395/108; 395/111; 395/112; 346/49; 346/51
[58] Field of Search ..................................... 395/115, 114, 395/110, 116, 108, 111, 112; 346/49, 51

[56] References Cited

U.S. PATENT DOCUMENTS 5,539,865  7/1996  Gentile ..................................... 395/115

FOREIGN PATENT DOCUMENTS

WO 90/14233  11/1990  WIPO .

*Primary Examiner*—Edward L. Coles
*Assistant Examiner*—Twyler Lamb
*Attorney, Agent, or Firm*—Milton S. Sales

[57] ABSTRACT

A high capacity compressed document image storage apparatus for color printing systems.

The compressed document storage system is highly suited for use with high speed color pagewidth print heads. However, the document storage apparatus can also be used with other printing systems, such as color electrophotographic and other systems.

The compressed document storage system is composed of the following major components:
1) an image creation system which can operate on a band by band basis.
2) an input memory which stores at least one band of the uncompressed page image. Two bands are preferred to allow double buffering, so that the RIP and compression stages can proceed simultaneously.
3) a page image compression system which can operate on a band by band basis. A new page image compression scheme which achieves high compression ratio and preserves high image quality is disclosed.
4) a mass storage device for storing compressed page images.
5) a real-time page image expansion system which expands the compressed page images at the rate required by the print engine.
6) an output memory which stores at least one band of the expanded page image. The recommended minimum is the number of lines from the first line of the print engine to the last line of the print engine, plus two bands.
7) an interface which reads data from the output memory and provides it at the correct timing to the print engine.

The page image compression scheme can achieve a typical compression ratio in excess of 80:1 when compared to a CC'MM'YK 800 dpi bitmap, and in excess of 420:1 when compared to an 800 dpi CMYK contone image. The high compression ratio allows the storage of more than 1,000 A4 800 dpi full color page images on a low cost 1 GByte disk drive. The compression scheme reduces the compressed data rate required for high speed (120 A4 ppm) printing to that which can be achieved using commonly available magnetic hard disk drives.

An improvement to JPEG image compression when used with text or graphics overlays is also disclosed.

64 Claims, 24 Drawing Sheets

HIGH CAPACITY COMPRESSED DOCUMENT IMAGE STORAGE FOR DIGITAL COLOR PRINTERS

CROSS REFERENCE TO RELATED APPLICATIONS

Reference is made to my commonly assigned, co-pending U.S. Pat. Applications: Ser. No. 08/701,021 entitled CMOS PROCESS COMPATIBLE FABRICATION OF PRINT HEADS filed Aug. 21, 1996; Ser. No. 08/733,711 entitled CONSTRUCTION AND MANUFACTURING PROCESS FOR DROP ON DEMAND PRINT HEADS WITH NOZZLE HEATERS filed Oct. 17, 1996; Ser. No. 08/734,822 entitled A MODULAR PRINT HEAD ASSEMBLY filed Oct. 22, 1996; Ser. No. 08/736,537 entitled PRINT HEAD CONSTRUCTIONS FOR REDUCED ELECTROSTATIC INTERACTION BETWEEN PRINTED DROPLETS filed Oct. 24, 1996; Ser. No. 08/750,320 entitled NOZZLE DUPLICATION FOR FAULT TOLERANCE IN INTEGRATED PRINTING HEADS filed Nov. 26, 1996; Ser. No. 08/753,718 entitled NOZZLE PLACEMENT IN MONOLITHIC DROP-ON-DEMAND PRINT HEADS and Ser. No. 08/750,606 entitled A COLOR VIDEO PRINTER AND A PHOTO CD SYSTEM WITH INTEGRATED PRINTER both filed on Nov. 27, 1996; Ser. No. 08/750,438 entitled A LIQUID INK PRINTING APPARATUS AND SYSTEM, Ser. No. 08/750,599 entitled COINCIDENT DROP SELECTION, DROP SEPARATION PRINTING METHOD AND SYSTEM, Ser. No. 08/750,435 entitled MONOLITHIC PRINT HEAD STRUCTURE AND A MANUFACTURING PROCESS THEREFOR USING ANISTROPIC WET ETCHING, Ser. No. 08/750,436 entitled POWER SUPPLY CONNECTION FOR MONOLITHIC PRINT HEADS, Ser. No. 08/750,437 entitled MODULAR DIGITAL PRINTING, Ser. No. 08/750,439 entitled A HIGH SPEED DIGITAL FABRIC PRINTER, Ser. No. 08/750,763 entitled A COLOR PHOTOCOPIER USING A DROP ON DEMAND INK JET PRINTING SYSTEM, Ser. No. 08/765,756 entitled PHOTOGRAPH PROCESSING AND COPYING SYSTEMS, Ser. No. 08/750,646 entitled FAX MACHINE WITH CONCURRENT DROP SELECTION AND DROP SEPARATION INK JET PRINTING, Ser. No. 08/759,774 entitled FAULT TOLERANCE IN HIGH VOLUME PRINTING PRESSES, Ser. No. 08/750,429 entitled INTEGRATED DRIVE CIRCUITRY IN DROP ON DEMAND PRINT HEADS, Ser. No. 08/750,433 entitled HEATER POWER COMPENSATION FOR TEMPERATURE IN THERMAL PRINTING SYSTEMS, Ser. No. 08/750,640 entitled HEATER POWER COMPENSATION FOR THERMAL LAG IN THERMAL PRINTING SYSTEMS, Ser. No. 08/750,650 entitled DATA DISTRIBUTION IN MONOLITHIC PRINT HEADS, and Ser. No. 08/750,642 entitled PRESSURIZABLE LIQUID INK CARTRIDGE FOR COINCIDENT FORCES PRINTERS all filed Dec. 3, 1996; Ser. No. 08/750,647 entitled MONOLITHIC PRINTING HEADS AND MANUFACTURING PROCESSES THEREFOR, Ser. No. 08/750,604 entitled INTEGRATED FOUR COLOR PRINT HEADS, Ser. No. 08/750,605 entitled A SELF-ALIGNED CONSTRUCTION AND MANUFACTURING PROCESS FOR MONOLITHIC PRINT HEADS, Ser. No. 08/682,603 entitled A COLOR PLOTTER USING CONCURRENT DROP SELECTION AND DROP SEPARATION INK JET PRINTING TECHNOLOGY, Ser. No. 08/750,603 entitled A NOTEBOOK COMPUTER WITH INTEGRATED CONCURRENT DROP SELECTION AND DROP SEPARATION COLOR PRINTING SYSTEM, Ser. No. 08/765,130 entitled INTEGRATED FAULT TOLERANCE IN PRINTING MECHANISMS; Ser. No. 08/750,431 entitled BLOCK FAULT TOLERANCE IN INTEGRATED PRINTING HEADS, Ser. No. 08/750,607 entitled FOUR LEVEL INK SET FOR BI-LEVEL COLOR PRINTING, Ser. No. 08/750,430 entitled A NOZZLE CLEARING PROCEDURE FOR LIQUID INK PRINTING, Ser. No. 08/750,600 entitled METHOD AND APPARATUS FOR ACCURATE CONTROL OF TEMPERATURE PULSES IN PRINTING HEADS, Ser. No. 08/750,608 entitled A PORTABLE PRINTER USING A CONCURRENT DROP SELECTION AND DROP SEPARATION PRINTING SYSTEM, and Ser. No. 08/750,602 entitled IMPROVEMENTS IN IMAGE HALFTONING all filed Dec. 4, 1996; Ser. No. 08/765,127 entitled PRINTING METHOD AND APPARATUS EMPLOYING ELECTROSTATIC DROP SEPARATION, Ser. No. 08/750,643 entitled COLOR OFFICE PRINTER WITH A HIGH CAPACITY DIGITAL PAGE IMAGE STORE, and Ser. No. 08/765,035 entitled HEATER POWER COMPENSATION FOR PRINTING LOAD IN THERMAL PRINTING SYSTEMS all filed Dec. 5, 1996; Ser. No. 08/765,036 entitled APPARATUS FOR PRINTING MULTIPLE DROP SIZES AND FABRICATION THEREOF, Ser. No. 08/765,017 entitled HEATER STRUCTURE AND FABRICATION PROCESS FOR MONOLITHIC PRINT HEADS, Ser. No. 08/750,772 entitled DETECTION OF FAULTY ACTUATORS IN PRINTING HEADS, Ser. No. 08/765,037 entitled PAGE IMAGE AND FAULT TOLERANCE CONTROL APPARATUS FOR PRINTING SYSTEMS all filed Dec. 9, 1996; and Ser. No. 08/765,038 entitled CONSTRUCTIONS AND MANUFACTURING PROCESSES FOR THERMALLY ACTIVATED PRINT HEADS filed Dec. 10, 1996.

FIELD OF THE INVENTION

The present invention is in the field of computer controlled printing devices. In particular, the field is data compression and expansion systems for high resolution color printing

BACKGROUND OF THE INVENTION

Many different types of digitally controlled printing systems have been invented, and many types are currently in production. These printing systems use a variety of actuation mechanisms, a variety of marking materials, and a variety of recording media. Examples of digital printing systems in current use include: laser electrophotographic printers; LED electrophotographic printers; dot matrix impact printers; thermal paper printers; film recorders; thermal wax printers; dye diffusion thermal transfer printers; and ink jet printers. However, at present, such electronic printing systems have not significantly replaced mechanical printing presses, even though this conventional method requires very expensive setup and is seldom commercially viable unless a few thousand copies of a particular page are to be printed. Thus, there is a need for improved digitally controlled printing systems, for example, being able to produce high quality color images at a high-speed and low cost, using standard paper.

Inkjet printing has become recognized as a prominent contender in the digitally controlled, electronic printing arena because, e.g., of its non-impact, low-noise characteristics, its use of plain paper and its avoidance of toner transfers and fixing.

Many types of ink jet printing mechanisms have been invented. These can be categorized as either continuous ink jet (CIJ) or drop on demand (DOD) ink jet. Continuous ink jet printing dates back to at least 1929: Hansell, U.S. Pat. No. 1,941,001.

Sweet et al U.S. Pat. No. 3,373,437, 1967, discloses an array of continuous ink jet nozzles where ink drops to be printed are selectively charged and deflected towards the recording medium. This technique is known as binary deflection CIJ, and is used by several manufacturers, including Elmjet and Scitex.

Hertz et al U.S. Pat. No. 3,416,153, 1966, discloses a method of achieving variable optical density of printed spots in CIJ printing using the electrostatic dispersion of a charged drop stream to modulate the number of droplets which pass through a small aperture. This technique is used in ink jet printers manufactured by Iris Graphics.

Kyser et al U.S. Pat. No. 3,946,398, 1970, discloses a DOD ink jet printer which applies a high voltage to a piezoelectric crystal, causing the crystal to bend, applying pressure on an ink reservoir and jetting drops on demand. Many types of piezoelectric drop on demand printers have subsequently been invented, which utilize piezoelectric crystals in bend mode, push mode, shear mode, and squeeze mode. Piezoelectric DOD printers have achieved commercial success using hot melt inks (for example, Tektronix and Dataproducts printers), and at image resolutions up to 720 dpi for home and office printers (Seiko Epson). Piezoelectric DOD printers have an advantage in being able to use a wide range of inks. However, piezoelectric printing mechanisms usually require complex high voltage drive circuitry and bulky piezoelectric crystal arrays, which are disadvantageous in regard to manufacturability and performance.

Endo et al GB Pat. No. 2,007,162, 1979, discloses an electrothermal DOD ink jet printer which applies a power pulse to an electrothermal transducer (heater) which is in thermal contact with ink in a nozzle. The heater rapidly heats water based ink to a high temperature, whereupon a small quantity of ink rapidly evaporates, forming a bubble. The formation of these bubbles results in a pressure wave which cause drops of ink to be ejected from small apertures along the edge of the heater substrate. This technology is known as Bubblejet™ (trademark of Canon K.K. of Japan), and is used in a wide range of printing systems from Canon, Xerox, and other manufacturers.

Vaught et al U.S. Pat. No. 4,490,728, 1982, discloses an electrothermal drop ejection system which also operates by bubble formation. In this system, drops are ejected in a direction normal to the plane of the heater substrate, through nozzles formed in an aperture plate positioned above the heater. This system is known as Thermal Ink Jet, and is manufactured by Hewlett-Packard. In this document, the term Thermal Ink Jet is used to refer to both the Hewlett-Packard system and systems commonly known as Bubblejet™.

Thermal Ink Jet printing typically requires approximately 20 µJ over a period of approximately 2 µs to eject each drop. The 10 Watt active power consumption of each heater is disadvantageous in itself and also necessitates special inks, complicates the driver electronics and precipitates deterioration of heater elements.

Other ink jet printing systems have also been described in technical literature, but are not currently used on a commercial basis. For example, U.S. Pat. No. 4,275,290 discloses a system wherein the coincident address of predetermined print head nozzles with heat pulses and hydrostatic pressure, allows ink to flow freely to spacer-separated paper, passing beneath the print head. U.S. Pat. Nos. 4,737,803; 4,737,803 and 4,748,458 disclose ink jet recording systems wherein the coincident address of ink in print head nozzles with heat pulses and an electrostatically attractive field cause ejection of ink drops to a print sheet.

Each of the above-described inkjet printing systems has advantages and disadvantages. However, there remains a widely recognized need for an improved ink jet printing approach, providing advantages for example, as to cost, speed, quality, reliability, power usage, simplicity of construction and operation, durability and consumables.

SUMMARY OF THE INVENTION

My concurrently filed applications, entitled "Liquid Ink Printing Apparatus and System" and "Coincident Drop-Selection, Drop-Separation Printing Method and System" describe new methods and apparatus that afford significant improvements toward overcoming the prior art problems discussed above. Those inventions offer important advantages, e.g., in regard to drop size and placement accuracy, as to printing speeds attainable, as to power usage, as to durability and operative thermal stresses encountered and as to other printer performance characteristics, as well as in regard to manufacturability and the characteristics of useful inks. One important purpose of the present invention is to further enhance the structures and methods described in those applications and thereby contribute to the advancement of printing technology.

The invention provides a high capacity compressed document image storage apparatus including:

(a) an image creation system which can operate on a band by band basis;

(b) an input memory which stores at least one band of the uncompressed page image, but less than 50% of said uncompressed page image;

(c) a page image compression system which can operate on a band by band basis;

(d) a mass storage device able to store a plurality of compressed page images;

(e) a page image expansion system which expands compressed page image data to form an expanded page image at a rate which is within 20% of the page printing rate when measured over the duration of the page printing time;

(f) an output memory which stores at least one band of said expanded page image, but less than 50% of said expanded page image; and (g) an apparatus which provides page image data from said output memory to a printing device wherein the time taken to provide a band of image data to the printing device does not vary by more than ±50% of the mean time to provide a band of image data to the printing device.

The invention also provides a method of page image compression including the following steps:

(a) dividing said page image into an array of cells of pixels;

(b) encoding said cells containing only white pixels to a specific code;

(c) encoding said cells containing only black and white pixels to a different specific code, and supplementing said code with information encoding the pattern of black and white pixels in said cell; and (d) encoding said cells containing a plurality of colors to a mutually different code, and supplementing said code with information encoding the colors of the pixels in said cell.

The invention also provides a printing system incorporating a page image compression system, where the printing system includes a print head comprising:
(a) a plurality of drop-emitter nozzles;
(b) a body of ink associated with said nozzles;
(c) pressure means for subjecting ink in said body of ink to a pressure of at least 2% above ambient pressure, at least during drop selection and separation;
(d) drop selection means for selecting predetermined nozzles and generating a difference in meniscus position between ink in selected and non-selected nozzles; and
(e) drop separating means for causing ink from selected nozzles to separate as drops from the body of ink, while allowing ink to be retained in non-selected nozzles.

The invention also provides a printing system incorporating a page image compression system, where the printing system includes a print head comprising:
(a) a plurality of drop-emitter nozzles;
(b) a body of ink associated with said nozzles;
(c) drop selection means for selecting predetermined nozzles and generating a difference in meniscus position between ink in selected and non-selected nozzles; and
(d) drop separating means for causing ink from selected nozzles to separate as drops from the body of ink, while allowing ink to be retained in non-selected nozzles, said drop selecting means being capable of producing said difference in meniscus position in the absence of said drop separation means.

The invention also provides a printing system incorporating a page image compression system, where the printing system includes a print head comprising:
(a) a plurality of drop-emitter nozzles;
(b) a body of ink associated with said nozzles, said ink exhibiting a surface tension decrease of at least 10 mN/m over a 30° C. temperature range;
(c) drop selection means for selecting predetermined nozzles and generating a difference in meniscus position between ink in selected and non-selected nozzles; and
(d) drop separating means for causing ink from selected nozzles to separate as drops from the body of ink, while allowing ink to be retained in non-selected nozzles.

The invention also provides an expansion apparatus for expanding compressed page image data in real-time as the page is being printed, said apparatus including:
(a) a mass storage unit for storage of the compressed page images;
(b) a JPEG decoder which expands the JPEG encoded portions of the compressed page image into contone image data;
(c) a contone band memory which temporarily holds at least one band of said contone image data;
(d) an expander circuit which expands compressed black and white text and graphics bitmaps and combines said bitmaps with said contone image data read from said contone band memory.

The invention also provides a method of compressing an image which includes the steps of:
(a) dividing the image into a plurality of cells;
(b) detecting which of the pixels in each cell are of a specific color;
(c) compressing information specifying the location of said pixels;
(d) replacing said specific color in said pixels with a different color; and
(e) compressing said cells by JPEG compression.

The invention also provides a compressed image expansion apparatus comprising:
(a) a JPEG decoder which converts first compressed image data to contone pixel data at a first resolution;
(b) a resolution conversion device which converts said first contone pixel data to a second contone pixel data of a second resolution, said second resolution being different from said first resolution;
(c) a compressed bitmap decoder which converts second compressed image data to bitmap image data at said second resolution;
(d) creation means to create a third contone pixel data at said second resolution, based upon the pattern of true and false entries in said bitmap image data; and
(e) a combination means which combines said second contone pixel data with said third contone pixel data to produce a fourth contone pixel data.

DETAILED DESCRIPTION OF PREFERRED EMBODIMENTS

Figure 1A:
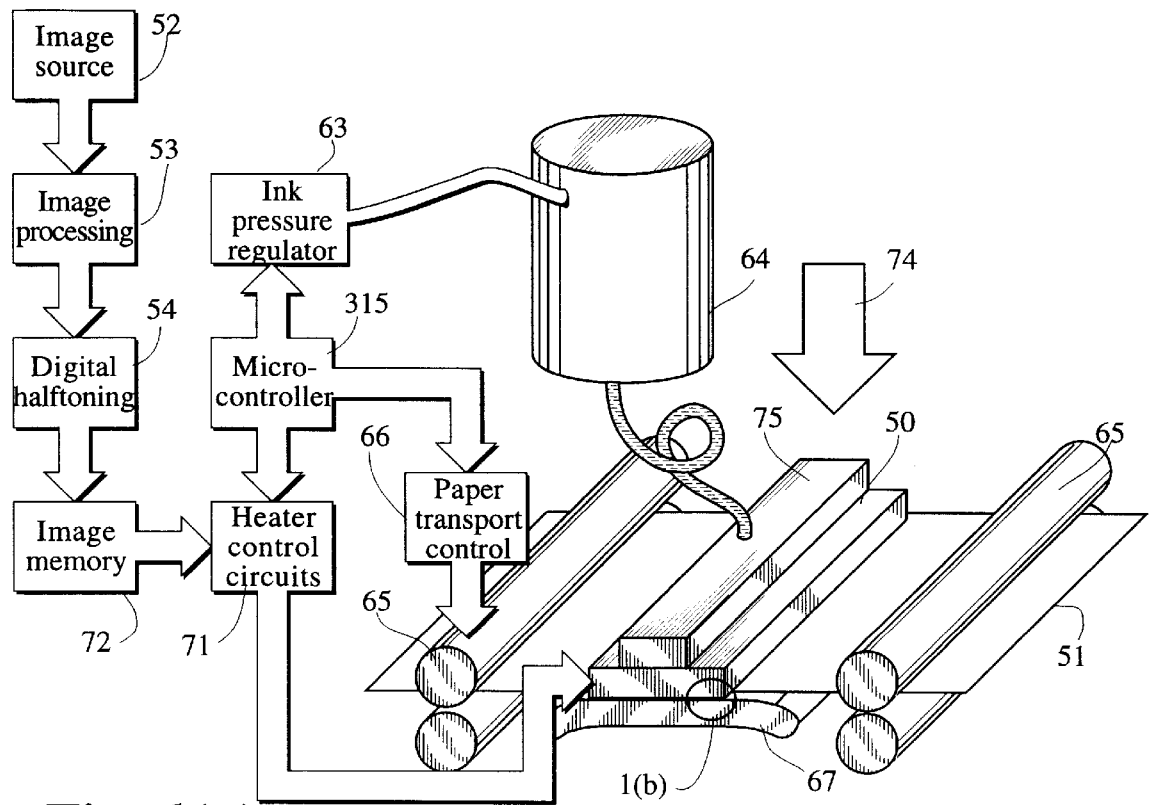
FIG. 1(a) shows a simplified block schematic diagram of one exemplary printing apparatus according to the present invention.

The present invention is a high capacity compressed document image storage apparatus for color printing systems.

The compressed document storage system is highly suited for use with high speed color pagewidth print heads. However, the document storage apparatus can also be used with other printing systems, such as color electrophotographic and other systems.

The compressed document storage system uses a new compression scheme which is described herein. This page image compression scheme can achieve a typical compression ratio in excess of 80:1 when compared to a CC'MM'YK 800 dpi bitmap, and in excess of 420:1 when compared to an 800 dpi CMYK contone image. This compression is achieved while maintaining a high image quality which is largely indistinguishable from the original image with the naked eye. The high compression ratio allows the storage of more than 1,000 A4 800 dpi full color page images on a low cost 1 GByte disk drive. The compression scheme reduces the compressed data rate required for high speed (120 A4 ppm) printing to that which can be achieved using commonly available magnetic hard disk drives.

The compressed document storage system can be used for electronic collation. Electronic collation is relevant when multiple copies of a multiple page document are printed. A system without electronic collation will print all copies of the first page, followed by all copies of the second page, and so on. This requires either manual collation, which is inconvenient and time consuming for the user, or mechanical collation, which is bulky, expensive, and normally limited to a maximum number of copies (typically 10 or 20 copies).

The compressed document storage system can also be used for print-on-demand applications, where compressed digital copies of various documents are stored locally to the printer, and can be printed when required.

The compressed document storage system is composed of the following major components:

1) an image creation system which preferably can operate on a band by band basis. This will usually be a Adobe Postscript' interpreter and Raster Image Processor (RIP).
2) an input memory which stores at least one band of the uncompressed page image. Two bands are preferred to allow double buffering, so that the RIP and compression stages can proceed simultaneously.
3) a page image compression system which can operate on a band by band basis. A new page image compression scheme which achieves high compression ratio and preserves high image quality is described herein.
4) a mass storage device for storing compressed page images. A 1 GByte HDD can be used to store 1,000 or more pages.
5) a real-time page image expansion system which expands the compressed page images at the rate required by the print engine.
6) an output memory which stores at least one band of the expanded page image. The recommended minimum is the number of lines from the first line of the print engine to the last line of the print engine, plus two bands.
7) an interface which reads data from the output memory and provides it at the correct timing to the print engine.

The compression scheme can operate on a sequence of page bands, allowing the use of band by band rasterization and avoiding the requirement for a full page memory of uncompressed information.

The compression scheme is also suited for real-time expansion for high speed color printing systems. A real-time expansion system capable of expanding 120 pages per minute is disclosed.

The clock to the print head 50 is generated from the system clock 408 by the Head clock generator 407, and buffered by the buffer 406. To facilitate testing of the Head control ASIC, JTAG test circuits 499 may be included.

In one general aspect, the invention constitutes a drop-on-demand printing mechanism wherein the means of selecting drops to be printed produces a difference in position between selected drops and drops which are not selected, but which is insufficient to cause the ink drops to overcome the ink surface tension and separate from the body of ink, and wherein an alternative means is provided to cause separation of the selected drops from the body of ink.

The separation of drop selection means from drop separation means significantly reduces the energy required to select which ink drops are to be printed. Only the drop selection means must be driven by individual signals to each nozzle. The drop separation means can be a field or condition applied simultaneously to all nozzles.

The drop selection means may be chosen from, but is not limited to, the following list:
1) Electrothermal reduction of surface tension of pressurized ink
2) Electrothermal bubble generation, with insufficient bubble volume to cause drop ejection
3) Piezoelectric, with insufficient volume change to cause drop ejection
4) Electrostatic attraction with one electrode per nozzle The drop separation means may be chosen from, but is not limited to, the following list:
1) Proximity (recording medium in close proximity to print head)
2) Proximity with oscillating ink pressure
3) Electrostatic attraction
4) Magnetic attraction The table "DOD printing technology targets" shows some desirable characteristics of drop on demand printing technology. The table also lists some methods by which some embodiments described herein, or in other of my related applications, provide improvements over the prior art.

| \multicolumn{2}{c}{DOD printing technology targets} | |
| --- | --- |
| Target | Method of achieving improvement over prior art |
| High speed operation | Practical, low cost, pagewidth printing heads with more than 10,000 nozzles. Monolithic A4 pagewidth print heads can be manufactured using standard 300 mm (12") silicon wafers |
| High image quality | High resolution (800 dpi is sufficient for most applications), six color process to reduce image noise |
| Full color operation | Halftoned process color at 800 dpi using stochastic screening |
| Ink flexibility | Low operating ink temperature and no requirement for bubble formation |
| Low power requirements | Low power operation results from drop selection measn not being required to fully eject drop |
| Low cost | Monohlithic print head without aperture plate, high manufacturing yield, small number of electrical connections, use of modified existing CMOS manufacturing facilities |
| High manufacturing yield | Integrated fault tolerance in printing head |
| High reliability | Integrated fault tolerance in printing head. Elimination |

-continued

| DOD printing technology targets | |
|---|---|
| Target | Method of achieving improvement over prior art |
| | of cavitation and kogation. Reduction of thermal shock. |
| Small number of electrical connections | Shift registers, control logic, and drive circuitry can be integrated on a monolithic print head using standard CMOS processes |
| Use of existing VLSI manufacturing facilities | CMOS compatibility. This can be achieved because the heater drive power is less is than 1% of Thermal Ink Jet heater drive power |
| Electronic collation | A new page compression system which can achieve 100:1 compression with insignificant image degradation, resulting in a compressed data rate low enough to allow real-time printing of any combination of thousands of pages stored on a low cost magnetic disk drive. |

In thermal ink jet (TIJ) and piezoelectric ink jet systems, a drop velocity of approximately 10 meters per second is preferred to ensure that the selected ink drops overcome ink surface tension, separate from the body of the ink, and strike the recording medium. These systems have a very low efficiency of conversion of electrical energy into drop kinetic energy. The efficiency of TIJ systems is approximately 0.02%. This means that the drive circuits for TIJ print heads must switch high currents. The drive circuits for piezoelectric ink jet heads must either switch high voltages, or drive highly capacitive loads. The total power consumption of pagewidth TIJ printheads is also very high. An 800 dpi A4 full color pagewidth TIJ print head printing a four color black image in one second would consume approximately 6 kW of electrical power, most of which is converted to waste heat. The difficulties of removal of this amount of heat precludes the production of low cost, high speed, high resolution compact pagewidth TIJ systems.

One important feature of embodiments of the invention is a means of significantly reducing the energy required to select which ink drops are to be printed. This is achieved by separating the means for selecting ink drops from the means for ensuring that selected drops separate from the body of ink and form dots on the recording medium. Only the drop selection means must be driven by individual signals to each nozzle. The drop separation means can be a field or condition applied simultaneously to all nozzles.

The table "Drop selection means" shows some of the possible means for selecting drops in accordance with the invention. The drop selection means is only required to create sufficient change in the position of selected drops that the drop separation means can discriminate between selected and unselected drops.

| Drop selection means | | |
|---|---|---|
| Method | Advantage | Limitation |
| 1. Electrothermal reduction of surface tension of pressurized ink | Low temperature increase and low drop selection energy. Can be used with many ink types. Simple fabrication. CMOS drive circuits can be fabricated on same substrate | Requires ink pressure regulating mechanism. Ink surface tension must reduce substantially as temperature increases |
| 2. Electrothermal reduction of ink viscosity, combined with oscillating ink pressure | Medium drop selection energy, suitable for hot melt and oil based inks. Simple fabrication. CMOS drive circuits can be fabricated on same substrate | Requires ink pressure oscillation mechanism. Ink must have a large decrease in viscosity as temperature increases |
| 3. Electrothermal bubble generation, with insufficient bubble volume to cause drop ejection | Well known technology, sinrple fabrication, bipolar drive circuits can be fabricated on same substrate | High drop selection energy, requires water based ink, problems with kogation, cavitation, thermal stress |
| 4. Piezoelectric, with insufficient volume change to cause drop ejection | Many types of ink base can be used | High manufacturing cost, incompatible with integrated circuit processes, high drive voltage, mechanical complexity, bulky |
| 5. Electrostatic attraction with one electrode per nozzle | Simple electrode fabrication | Nozzk pitch must be relatively large. Crosstalk between adjacent electric fields. Requires high voltage drive circuits |

Other drop selection means may also be used.

The preferred drop selection means for water based inks is method 1: "Electrothermal reduction of surface tension of pressurized ink". This drop selection means provides many advantages over other systems, including; low power operation (approximately 1% of TIJ), compatibility with CMOS VLSI chip fabrication, low voltage operation (approx. 10 V), high nozzle density, low temperature operation, and wide range of suitable ink formulations. The ink must exhibit a reduction in surface tension with increasing temperature.

The preferred drop selection means for hot melt or oil based inks is method 2: "Electrothermal reduction of ink viscosity, combined with oscillating ink pressure". This drop selection means is particularly suited for use with inks which exhibit a large reduction of viscosity with increasing temperature, but only a small reduction in surface tension. This occurs particularly with non-polar ink carriers with relatively high molecular weight. This is especially applicable to hot melt and oil based inks.

The table "Drop separation means" shows some of the possible methods for separating selected drops from the body of ink, and ensuring that the selected drops form dots on the printing medium. The drop separation means discriminates between selected drops and unselected drops to ensure that unselected drops do not form dots on the printing medium.

'A Liquid ink Fault Tolerant (LIFT) printing mechanism' (Filing no.: PN2308);
'Electrothermal drop selection in LIFT printing' (Filing no.: PN2309);
'Drop separation in LIFT printing by print media proximity' (Filing no.: PN2310);
'Drop size adjustment in Proximity LIFT printing by varying head to media distance' (Filing no.: PN2311);
'Augmenting Proximity LIFT printing with acoustic ink waves' (Filing no.: PN2312);
'Electrostatic drop separation in LIFT printing' (Filing no.: PN2313);
'Multiple simultaneous drop sizes in Proximity LIFT printing' (Filing no.: PN2321);
'Self cooling operation in thermally activated print heads' (Filing no.: PN2322); and

Drop separation means

| Method | Advantage | Limitation |
| --- | --- | --- |
| 1. Electrostatic attraction | Can print on rough surfaces, simple implementation | Requires high voltage power supply |
| 2. AC electric field | Higher field strength is possible than electrostatic, operating margins can be increased, ink pressure reduced, and dust accumulation is reduced | Requires high voltage AC power supply synchronized to drop ejection phase. Multiple drop phase operation is difficult |
| 3. Proximity (print head in close proximity to, but not touching, recording medium) | Very small spot sizes can be achieved. Very low power dissipation. High drop position accuracy | Requires print medium to be very close to print head surface, not suitable for rough print media, usually requires transfer roller or belt |
| 4. Transfer Proximity (print head is in close proximity to a transfer roller or belt | Very small spot sizes can be achieved, very low power dissipation, high accuracy, can print on rough paper | Not compact due to size of transfer roller or transfer belt. |
| 5. Proximity with oscillating ink pressure. | Useful for hot melt inks using viscosity reduction drop selection method, reduces possibility of nozzle clogging, can use pigments instead of dyes | Requires print medium to be very close to print head surface, not suitable for rough print media. Requires ink pressure oscillation apparatus |
| 6. Magnetic attraction | Can print on rough surfaces. Low power if permanent magnets are used | Requires uniform high magnetic field strength, requires magnetic ink |

Other drop separation means may also be used.

The preferred drop separation means depends upon the intended use. For most applications, method 1: "Electrostatic attraction", or method 2: "AC electric field" are most appropriate. For applications where smooth coated paper or film is used, and very high speed is not essential, method 3: "Proximity" may be appropriate. For high speed, high quality systems, method 4: "Transfer proximity" can be used. Method 6: "Magnetic attraction" is appropriate for portable printing systems where the print medium is too rough for proximity printing, and the high voltages required for electrostatic drop separation are undesirable. There is no clear 'best' drop separation means which is applicable to all circumstances.

Further details of various types of printing systems according to the present invention are described in the following Australian patent specifications filed on Apr. 12, 1995, the disclosure of which are hereby incorporated by reference:

'Thermal Viscosity Reduction LIFT printing' (Filing no.: PN2323).

A simplified schematic diagram of one preferred printing system according to the invention appears in FIG. 1(a).

An image source 52 may be raster image data from a scanner or computer, or outline image data in the form of a page description language (PDL), or other forms of digital image representation. This image data is converted to a pixel-mapped page image by the image processing system 53. This may be a raster image processor (RIP) in the case of PDL image data, or may be pixel image manipulation in the case of raster image data. Continuous tone data produced by the image processing unit 53 is halftoned. Halftoning is performed by the Digital Halftoning unit 54. Halftoned bitmap image data is stored in the image memory 72. Depending upon the printer and system configuration, the image memory 72 may be a full page memory, or a band memory. Heater control circuits 71 read data from the image memory 72 and apply time-varying electrical pulses to the nozzle heaters (103 in FIG. 1(*b*)) that are part of the print head 50. These pulses are applied at an appropriate time, and to the appropriate nozzle, so that selected drops will form spots on the recording medium 51 in the appropriate position designated by the data in the image memory 72.

The recording medium 51 is moved relative to the head 50 by a paper transport system 65, which is electronically controlled by a paper transport control system 66, which in turn is controlled by a microcontroller 315. The paper transport system shown in FIG. 1(*a*) is schematic only, and many different mechanical configurations are possible. In the case of pagewidth print heads, it is most convenient to move the recording medium 51 past a stationary head 50. However, in the case of scanning print systems, it is usually most convenient to move the head 50 along one axis (the sub-scanning direction) and the recording medium 51 along the orthogonal axis (the main scanning direction), in a relative raster motion. The microcontroller 315 may also control the ink pressure regulator 63 and the heater control circuits 71.

For printing using surface tension reduction, ink is contained in an ink reservoir 64 under pressure. In the quiescent state (with no ink drop ejected), the ink pressure is insufficient to overcome the ink surface tension and eject a drop. A constant ink pressure can be achieved by applying pressure to the ink reservoir 64 under the control of an ink pressure regulator 63. Alternatively, for larger printing systems, the ink pressure can be very accurately generated and controlled by situating the top surface of the ink in the reservoir 64 an appropriate distance above the head 50. This ink level can be regulated by a simple float valve (not shown).

For printing using viscosity reduction, ink is contained in an ink reservoir 64 under pressure, and the ink pressure is caused to oscillate. The means of producing this oscillation may be a piezoelectric actuator mounted in the ink channels (not shown).

When properly arranged with the drop separation means, selected drops proceed to form spots on the recording medium 51, while unselected drops remain part of the body of ink.

The ink is distributed to the back surface of the head 50 by an ink channel device 75. The ink preferably flows through slots and/or holes etched through the silicon substrate of the head 50 to the front surface, where the nozzles and actuators are situated. In the case of thermal selection, the nozzle actuators are electrothermal heaters.

In some types of printers according to the invention, an external field 74 is required to ensure that the selected drop separates from the body of the ink and moves towards the recording medium 51. A convenient external field 74 is a constant electric field, as the ink is easily made to be electrically conductive. In this case, the paper guide or platen 67 can be made of electrically conductive material and used as one electrode generating the electric field. The other electrode can be the head 50 itself. Another embodiment uses proximity of the print medium as a means of discriminating between selected drops and unselected drops.

For small drop sizes gravitational force on the ink drop is very small; approximately $10^{-4}$ of the surface tension forces, so gravity can be ignored in most cases. This allows the print head 50 and recording medium 51 to be oriented in any direction in relation to the local gravitational field. This is an important requirement for portable printers.

Figure 1B:
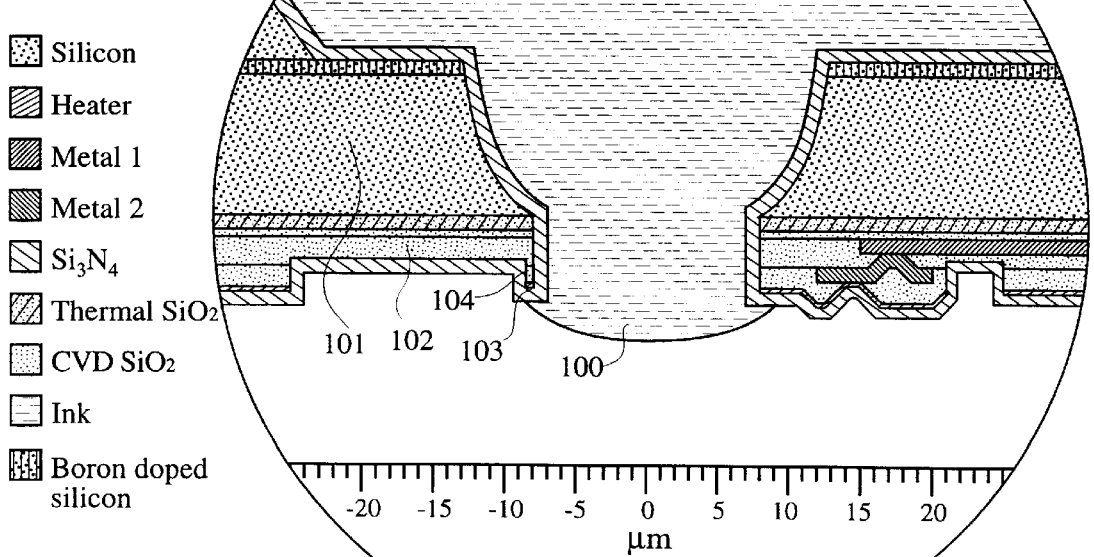
FIG. 1(b) shows a cross section of one variety of nozzle tip in accordance with the invention.

FIG. 1(*b*) is a detail enlargement of a cross section of a single microscopic nozzle tip embodiment of the invention, fabricated using a modified CMOS process. The nozzle is etched in a substrate 101, which may be silicon, glass, metal, or any other suitable material. If substrates which are not semiconductor materials are used, a semiconducting material (such as amorphous silicon) may be deposited on the substrate, and integrated drive transistors and data distribution circuitry may be formed in the surface semiconducting layer. Single crystal silicon (SCS) substrates have several advantages, including:

1) High performance drive transistors and other circuitry can be fabricated in SCS;
2) Print heads can be fabricated in existing facilities (fabs) using standard VLSI processing equipment;
3) SCS has high mechanical strength and rigidity; and
4) SCS has a high thermal conductivity.

In this example, the nozzle is of cylindrical form, with the heater 103 forming an annulus. The nozzle tip 104 is formed from silicon dioxide layers 102 deposited during the fabrication of the CMOS drive circuitry. The nozzle tip is passivated with silicon nitride. The protruding nozzle tip controls the contact point of the pressurized ink 100 on the print head surface. The print head surface is also hydrophobized to prevent accidental spread of ink across the front of the print head.

Many other configurations of nozzles are possible, and nozzle embodiments of the invention may vary in shape, dimensions, and materials used. Monolithic nozzles etched from the substrate upon which the heater and drive electronics are formed have the advantage of not requiring an orifice plate. The elimination of the orifice plate has significant cost savings in manufacture and assembly. Recent methods for eliminating orifice plates include the use of 'vortex' actuators such as those described in Domoto et al U.S. Pat. No. 4,580,158, 1986, assigned to Xerox, and Miller et al U.S. Pat. No. 5,371,527, 1994 assigned to Hewlett-Packard. These, however are complex to actuate, and difficult to fabricate. The preferred method for elimination of orifice plates for print heads of the invention is incorporation of the orifice into the actuator substrate.

This type of nozzle may be used for print heads using various techniques for drop separation.

Operation with Electrostatic Drop Separation

As a first example, operation using thermal reduction of surface tension and electrostatic drop separation is shown in FIG. 2.

FIG. 2 shows the results of energy transport and fluid dynamic simulations performed using FIDAP, a commercial fluid dynamic simulation software package available from Fluid Dynamics Inc., of Illinois, USA. This simulation is of a thermal drop selection nozzle embodiment with a diameter of 8 $\mu$m, at an ambient temperature of 30° C. The total energy applied to the heater is 276 nJ, applied as 69 pulses of 4 nJ each. The ink pressure is 10 kPa above ambient air pressure, and the ink viscosity at 30° C. is 1.84 cPs. The ink is water based, and includes a sol of 0.1% palmitic acid to achieve an enhanced decrease in surface tension with increasing temperature. A cross section of the nozzle tip from the central axis of the nozzle to a radial distance of 40 $\mu$m is shown. Heat flow in the various materials of the nozzle, including silicon, silicon nitride, amorphous silicon dioxide, crystalline silicon dioxide, and water based ink are simulated using the respective densities, heat capacities, and thermal conductivities of the materials. The time step of the simulation is 0.1 $\mu$s.

FIG. 2(*a*) shows a quiescent state, just before the heater is actuated. An equilibrium is created whereby no ink escapes the nozzle in the quiescent state by ensuring that the ink pressure plus external electrostatic field is insufficient to overcome the surface tension of the ink at the ambient temperature. In the quiescent state, the meniscus of the ink does not protrude significantly from the print head surface, so the electrostatic field is not significantly concentrated at the meniscus.

Figure 2A:
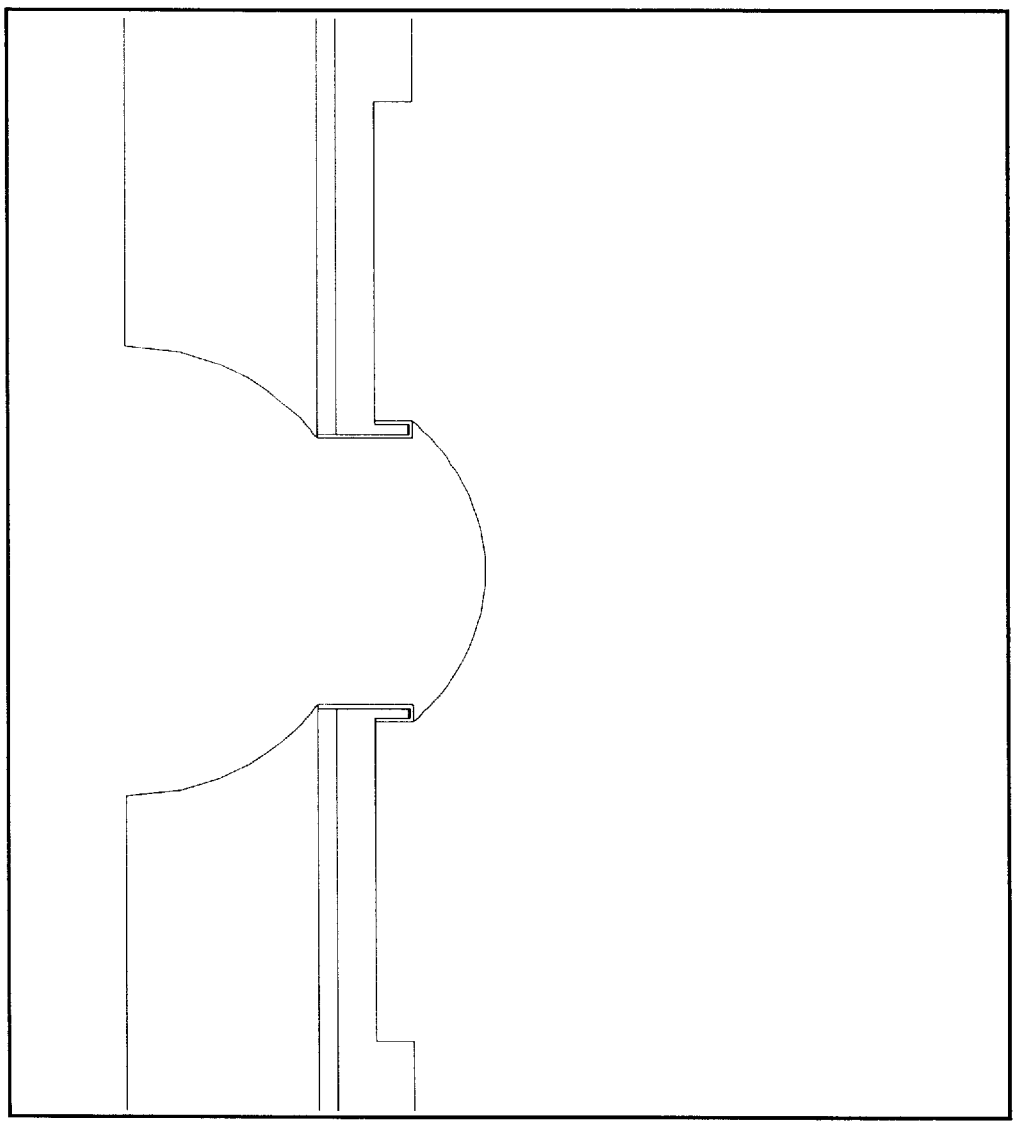
FIGS. 2(a) to 2(f) show fluid dynamic simulations of drop selection.
Figure 2B:
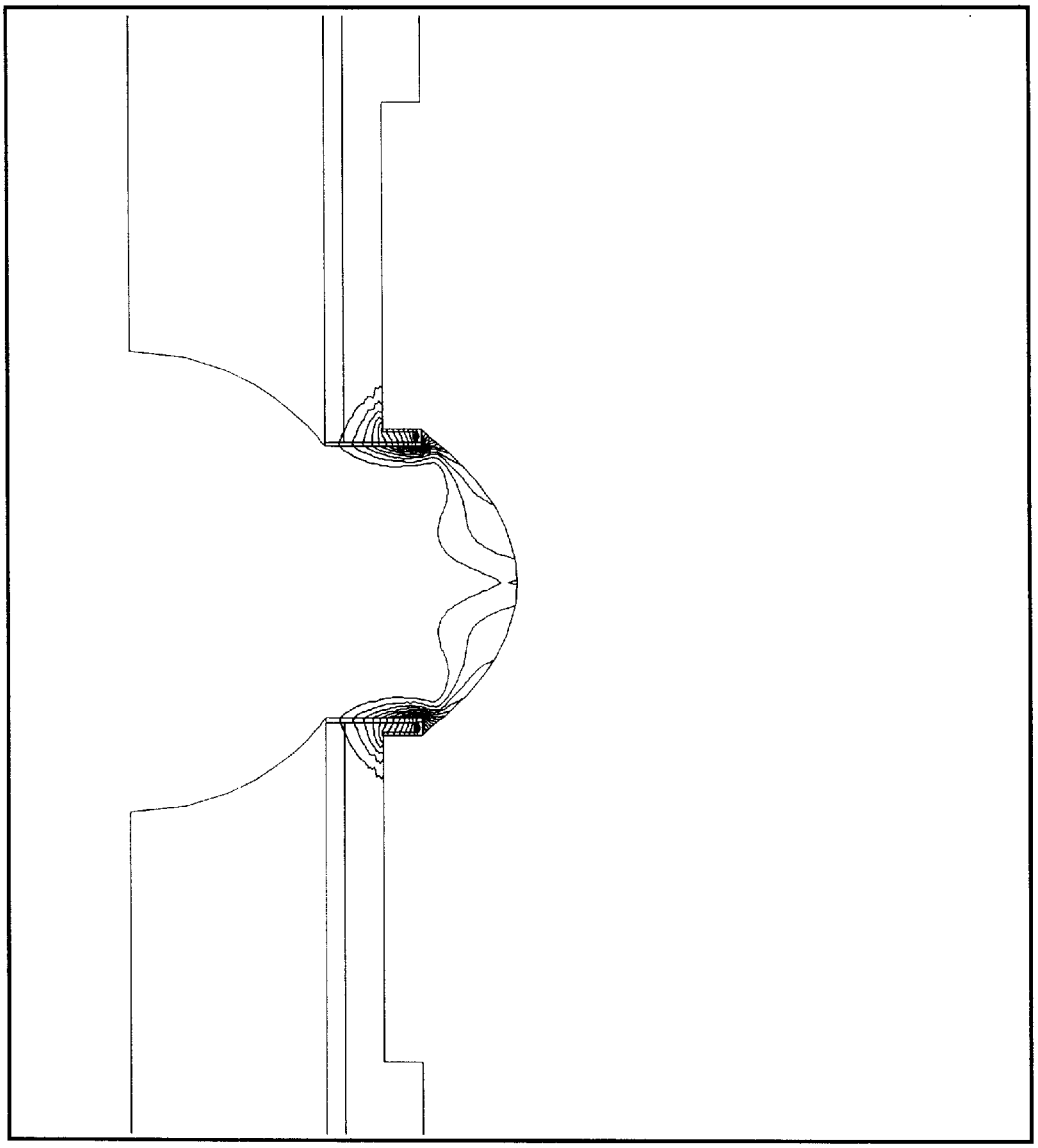

FIG. 2(b) shows thermal contours at 5° C. intervals 5 μs after the start of the heater energizing pulse. When the heater is energized, the ink in contact with the nozzle tip is rapidly heated. The reduction in surface tension causes the heated portion of the meniscus to rapidly expand relative to the cool ink meniscus. This drives a convective flow which rapidly transports this heat over part of the free surface of the ink at the nozzle tip. It is necessary for the heat to be distributed over the ink surface, and not just where the ink is in contact with the heater. This is because viscous drag against the solid heater prevents the ink directly in contact with the heater from moving.

Figure 2C:
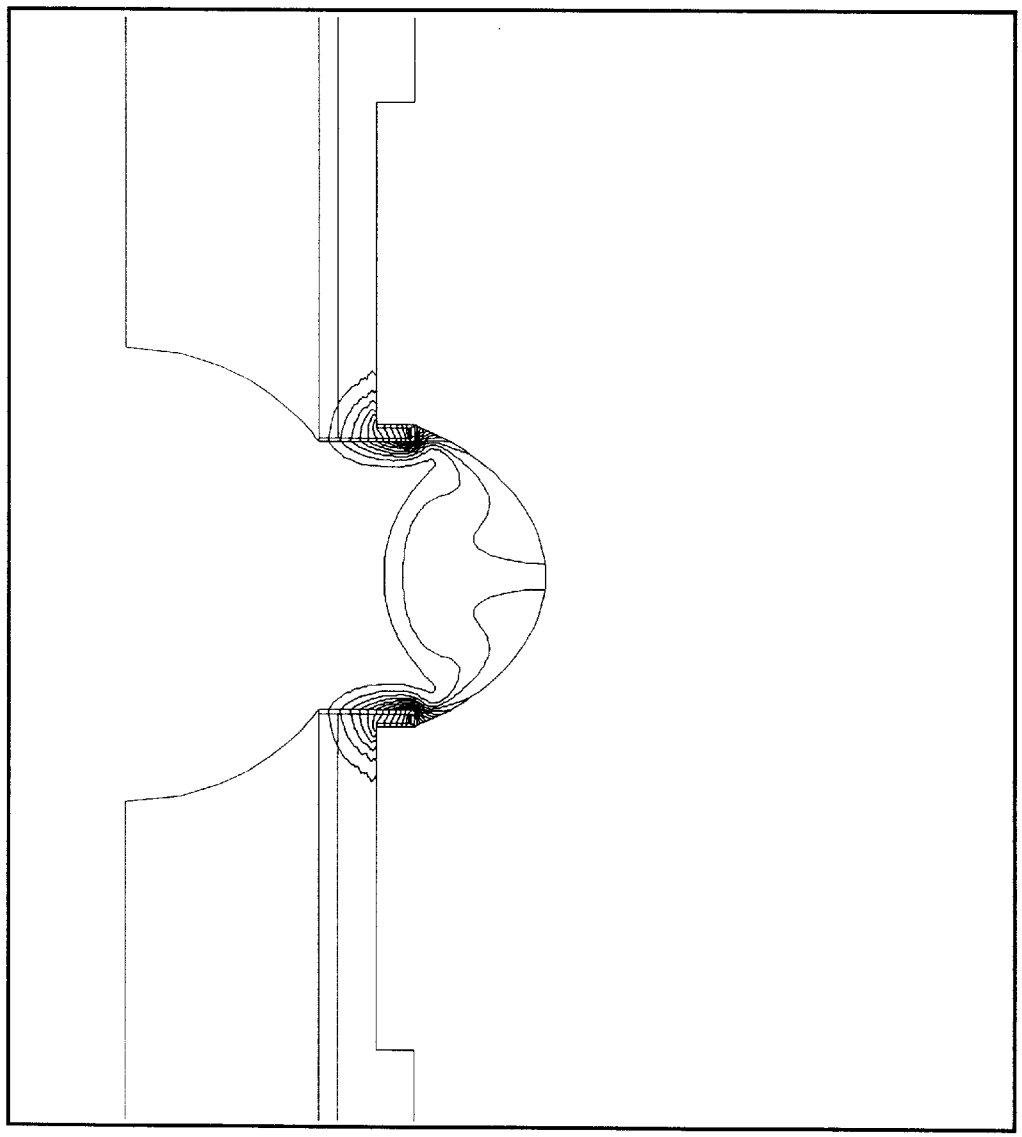

FIG. 2(c) shows thermal contours at 5° C. intervals 10 μs after the start of the heater energizing pulse. The increase in temperature causes a decrease in surface tension, disturbing the equilibrium of forces. As the entire meniscus has been heated, the ink begins to flow.

Figure 2D:
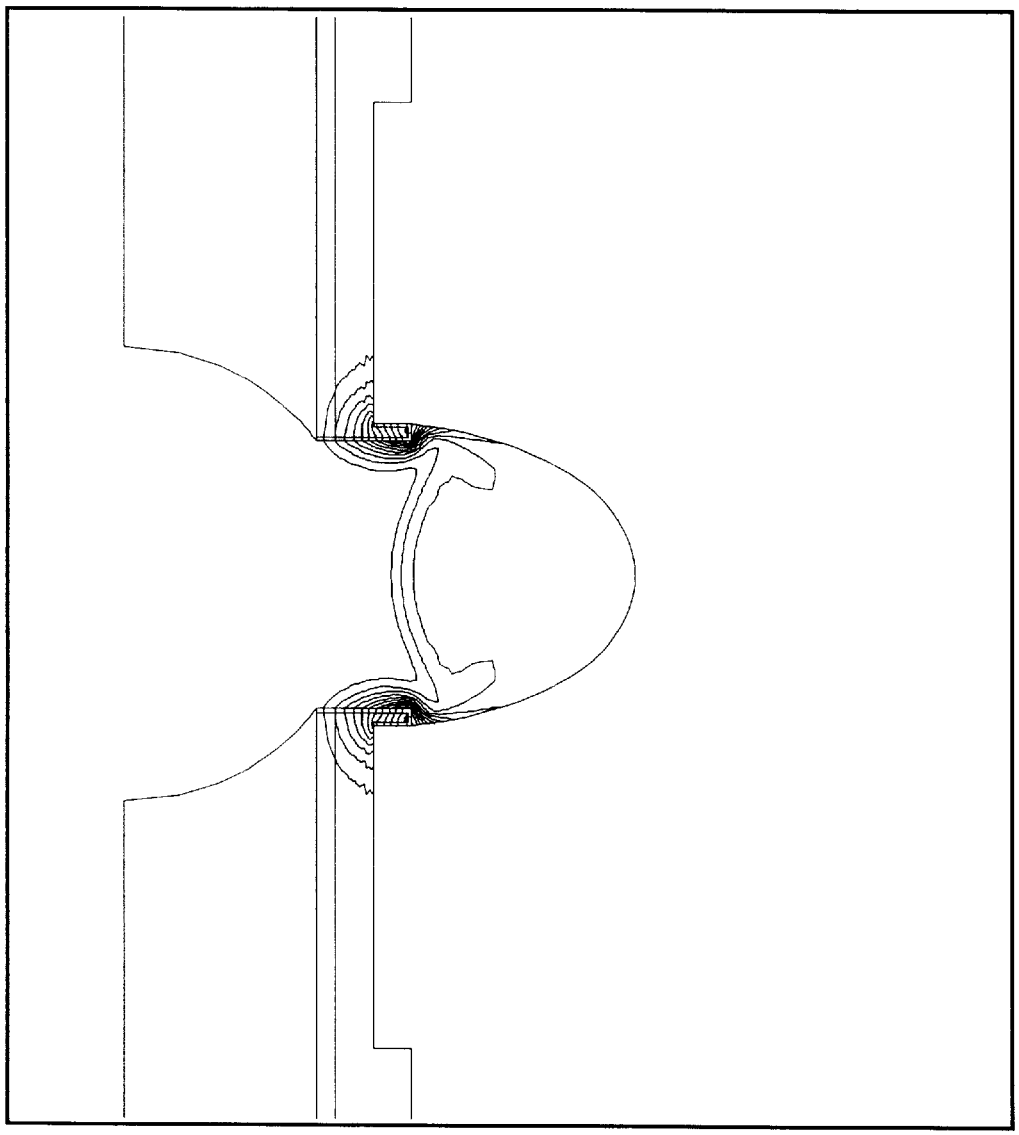

FIG. 2(d) shows thermal contours at 5° C. intervals 20 μs after the start of the heater energizing pulse. The ink pressure has caused the ink to flow to a new meniscus position, which protrudes from the print head. The electrostatic field becomes concentrated by the protruding conductive ink drop.

Figure 2E:
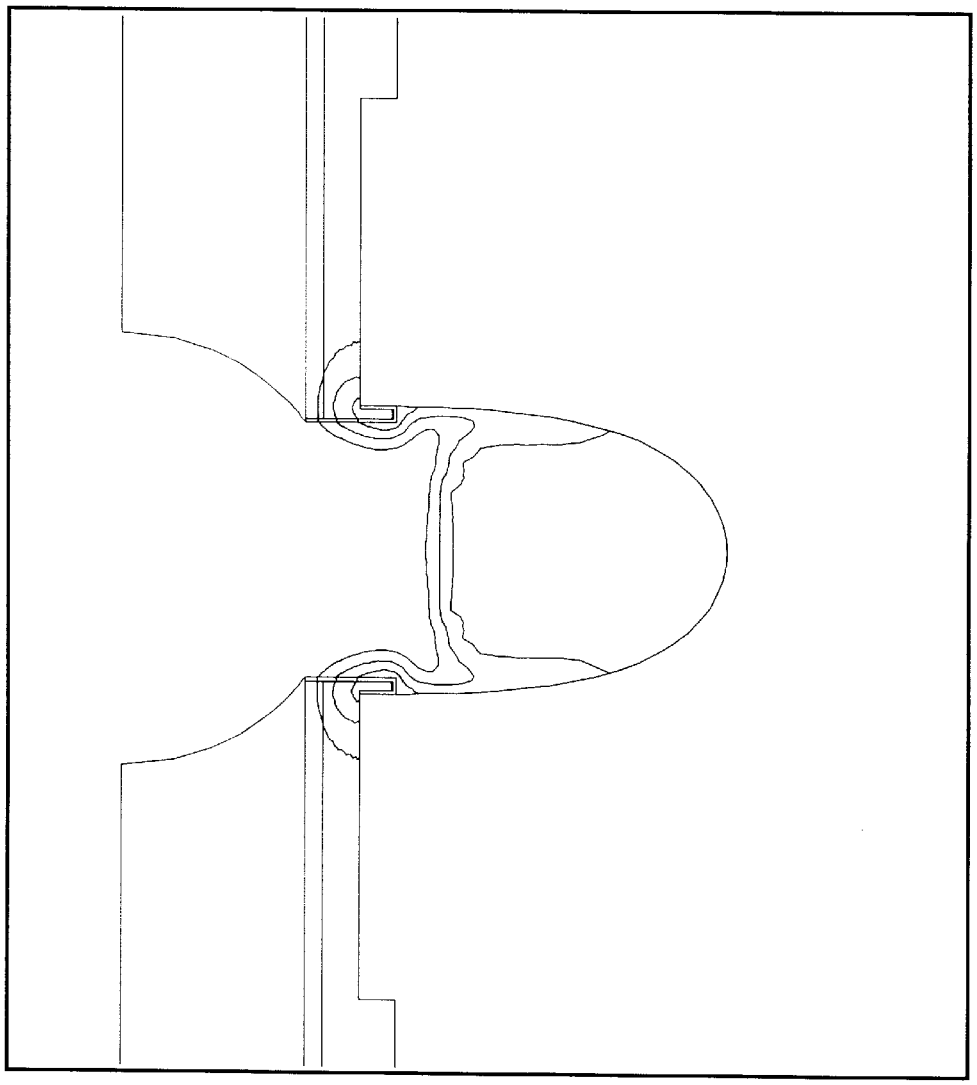

FIG. 2(e) shows thermal contours at 5° C. intervals 30 μs after the start of the heater energizing pulse, which is also 6 μs after the end of the heater pulse, as the heater pulse duration is 24 μs. The nozzle tip has rapidly cooled due to conduction through the oxide layers, and conduction into the flowing ink. The nozzle tip is effectively 'water cooled' by the ink. Electrostatic attraction causes the ink drop to begin to accelerate towards the recording medium. Were the heater pulse significantly shorter (less than 16 μs in this case) the ink would not accelerate towards the print medium, but would instead return to the nozzle.

Figure 2F:
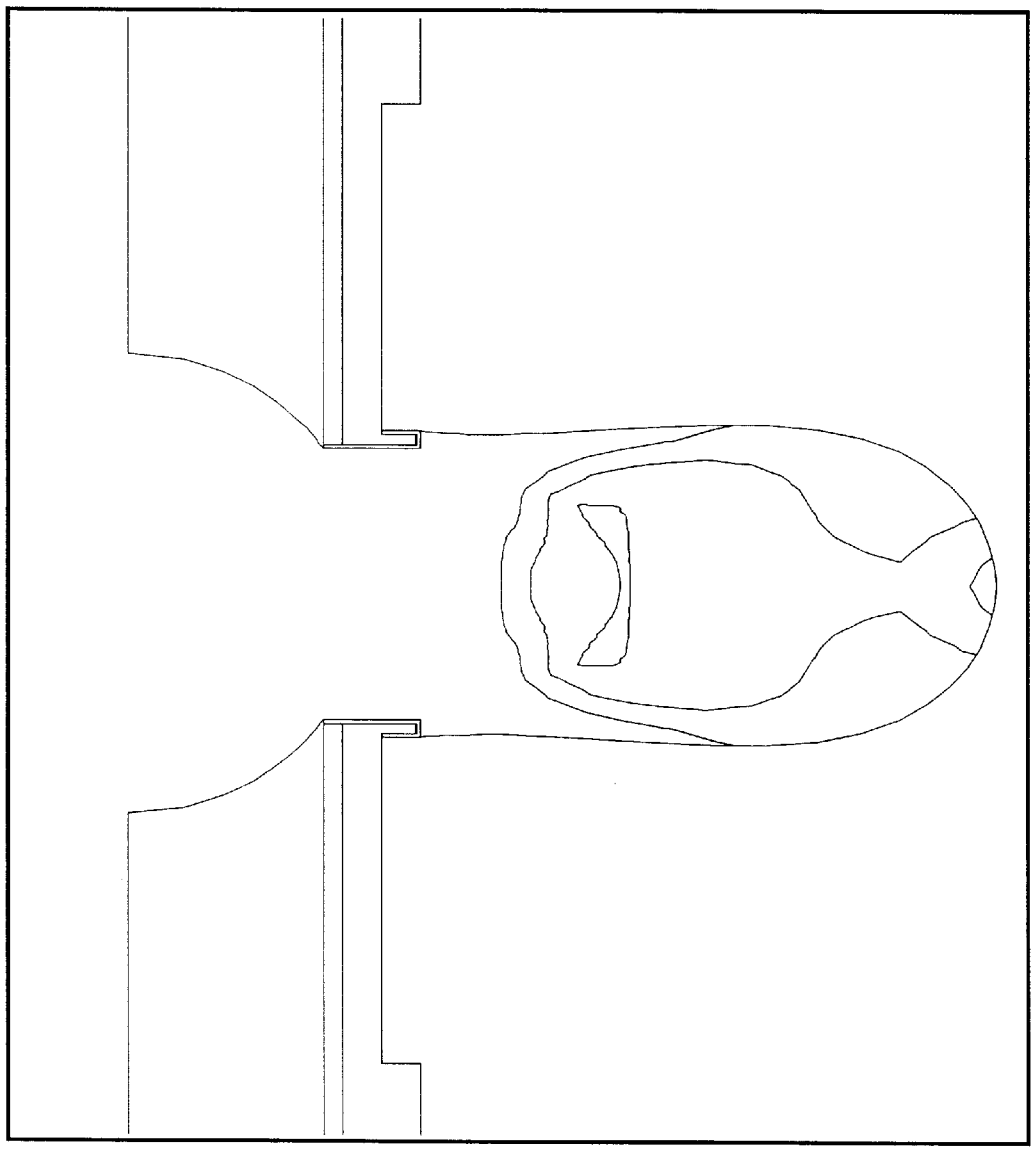

FIG. 2(f) shows thermal contours at 5° C. intervals 26 μs after the end of the heater pulse. The temperature at the nozzle tip is now less than 5° C. above ambient temperature. This causes an increase in surface tension around the nozzle tip. When the rate at which the ink is drawn from the nozzle exceeds the viscously limited rate of ink flow through the nozzle, the ink in the region of the nozzle tip 'necks', and the selected drop separates from the body of ink. The selected drop then travels to the recording medium under the influence of the external electrostatic field. The meniscus of the ink at the nozzle tip then returns to its quiescent position, ready for the next heat pulse to select the next ink drop. One ink drop is selected, separated and forms a spot on the recording medium for each heat pulse. As the heat pulses are electrically controlled, drop on demand ink jet operation can be achieved.

Figure 3A:
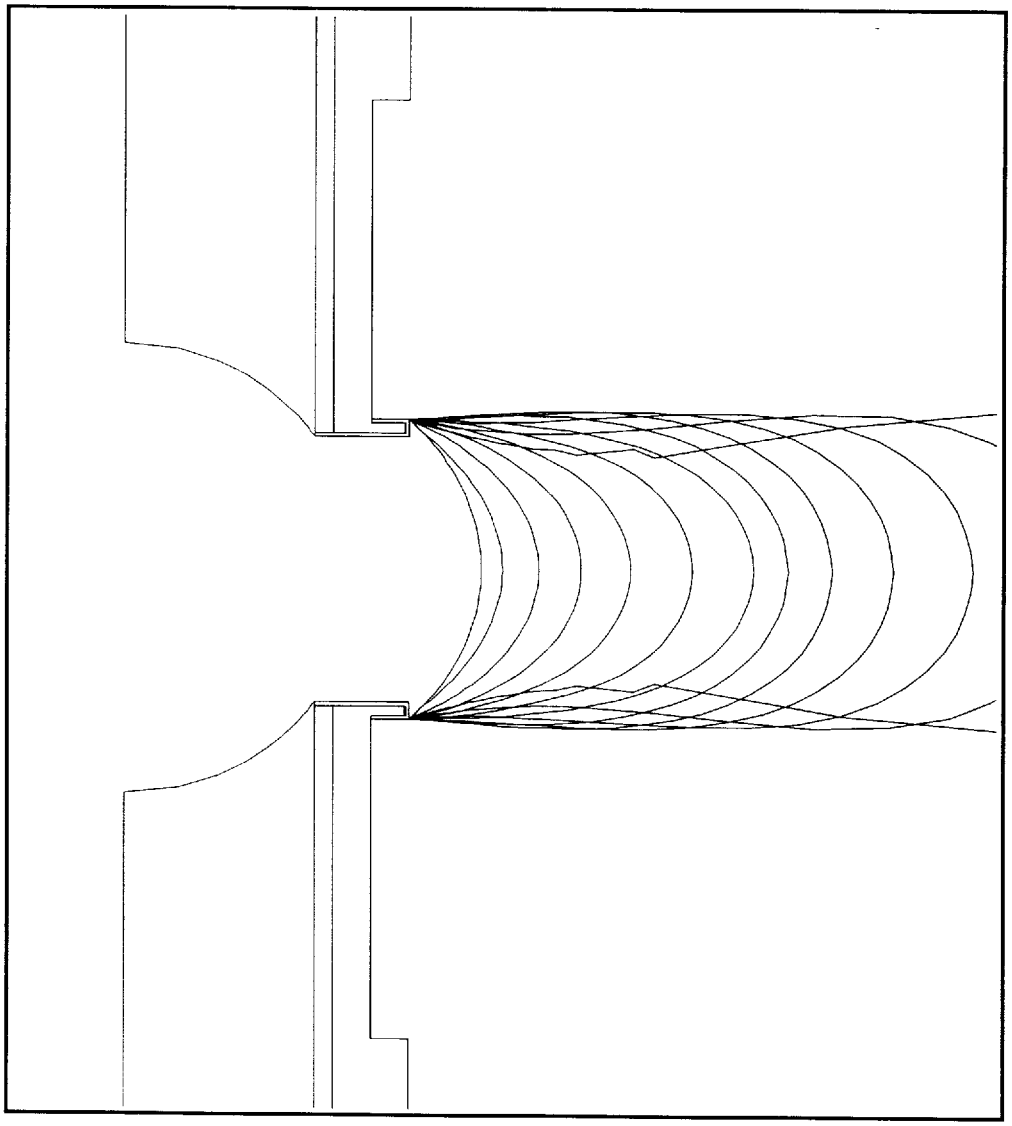
FIG. 3(a) shows a finite element fluid dynamic simulation of a nozzle in operation according to an embodiment of the invention.

FIG. 3(a) shows successive meniscus positions during the drop selection cycle at 5 μs intervals, starting at the beginning of the heater energizing pulse.

Figure 3B:
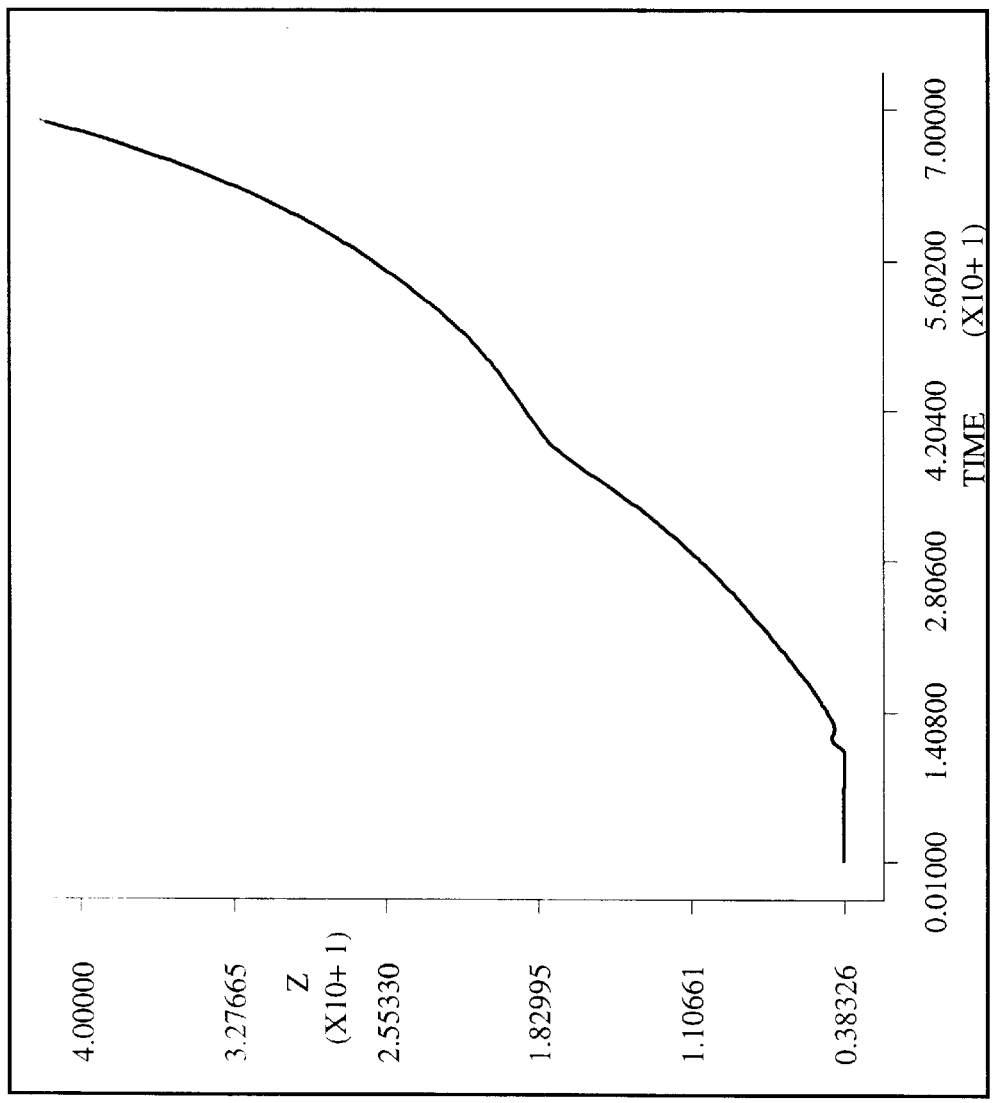
FIG. 3(b) shows successive meniscus positions during drop selection and separation.

FIG. 3(b) is a graph of meniscus position versus time, showing the movement of the point at the centre of the meniscus. The heater pulse starts 10 μs into the simulation.

Figure 3C:
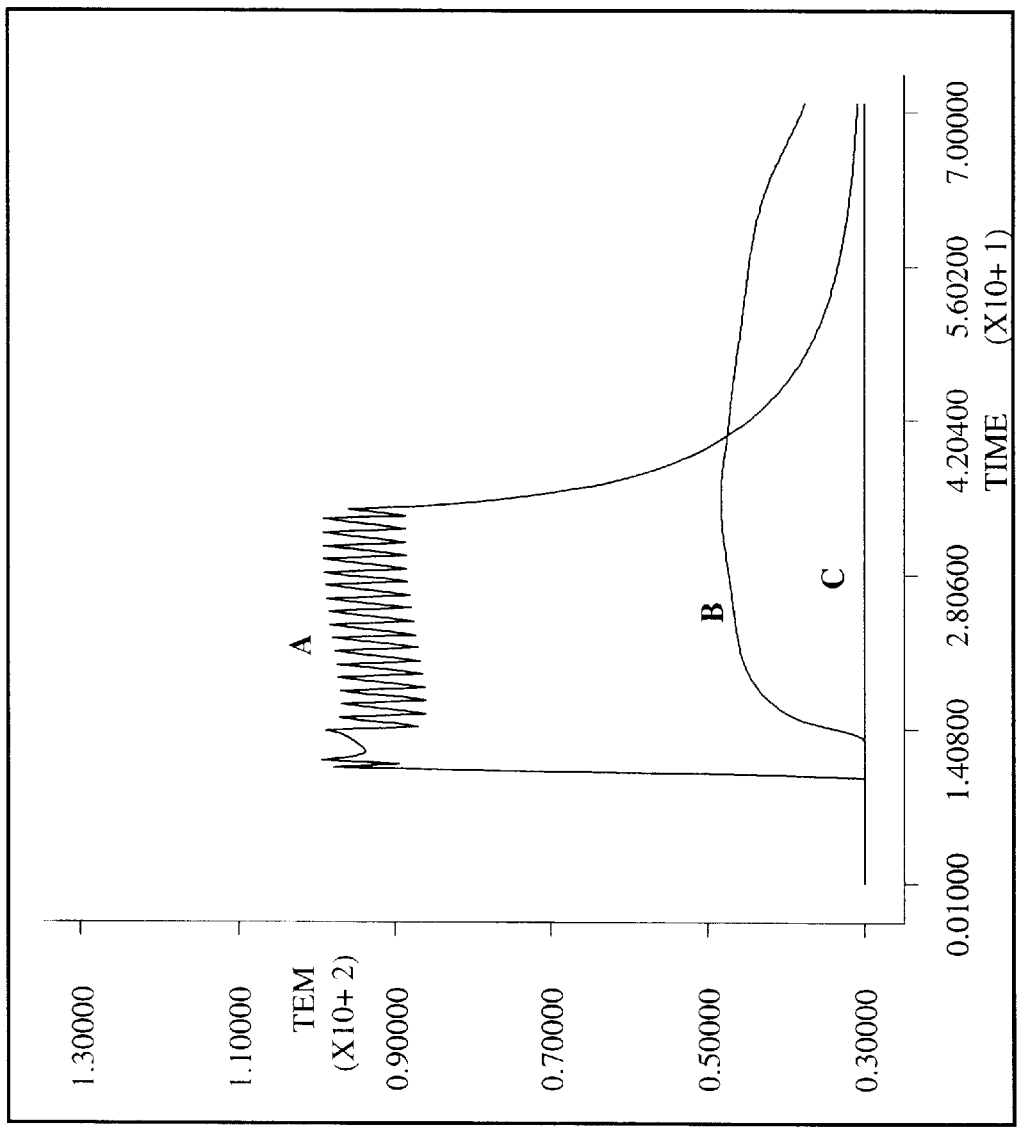
FIG. 3(c) shows the temperatures at various points during a drop selection cycle.

FIG. 3(c) shows the resultant curve of temperature with respect to time at various points in the nozzle. The vertical axis of the graph is temperature, in units of 100° C. The horizontal axis of the graph is time, in units of 10 μs. The temperature curve shown in FIG. 3(b) was calculated by FIDAP, using 0.1 μs time steps. The local ambient temperature is 30 degrees C. Temperature histories at three points are shown:

A—Nozzle tip: This shows the temperature history at the circle of contact between the passivation layer, the ink, and air.

B—Meniscus midpoint: This is at a circle on the ink meniscus midway between the nozzle tip and the centre of the meniscus.

C—Chip surface: This is at a point on the print head surface 20 μm from the centre of the nozzle. The temperature only rises a few degrees. This indicates that active circuitry can be located very close to the nozzles without experiencing performance or lifetime degradation due to elevated temperatures.

Figure 3D:
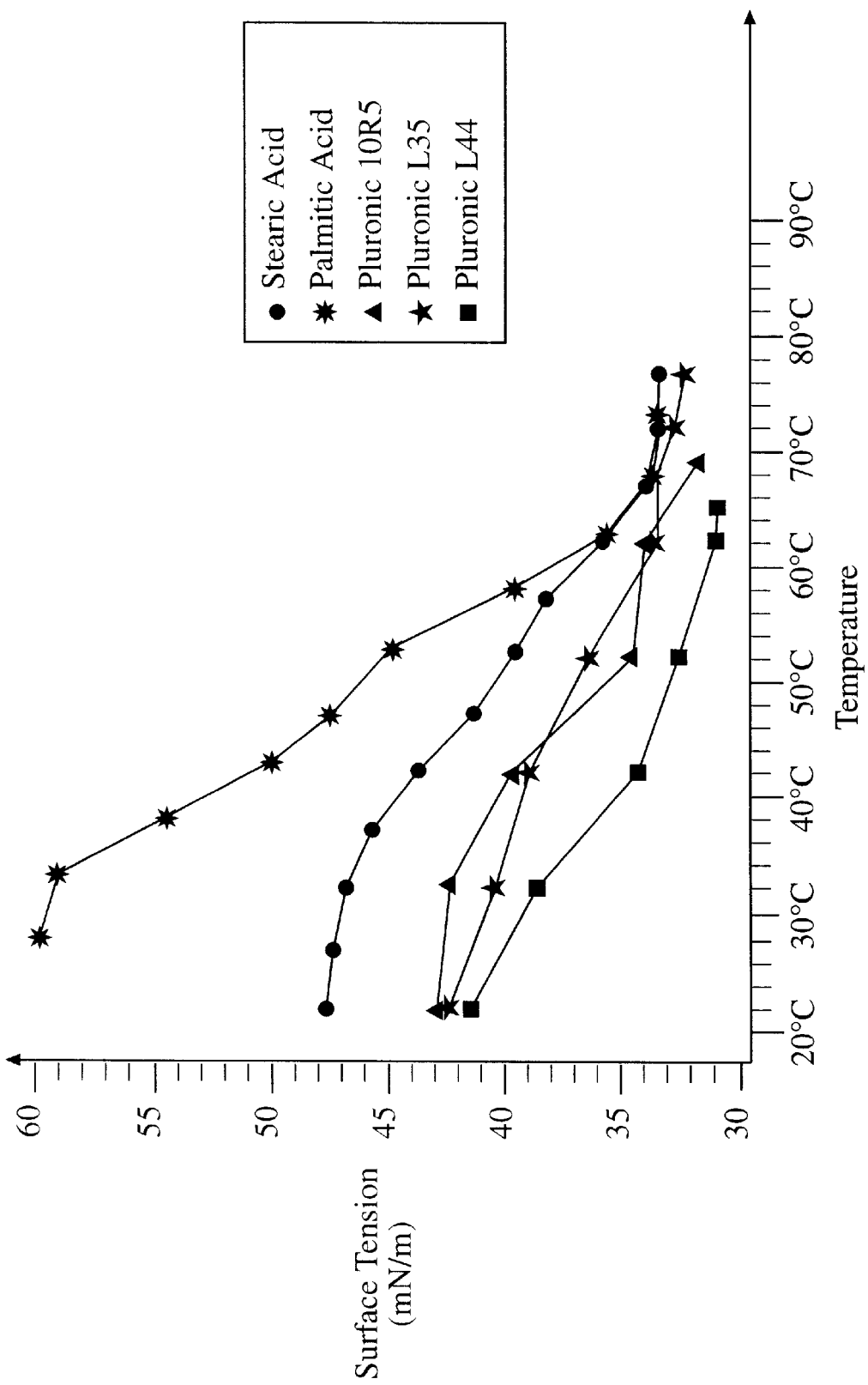
FIG. 3(d) shows measured surface tension versus temperature curves for various ink additives.
Figure 3E:
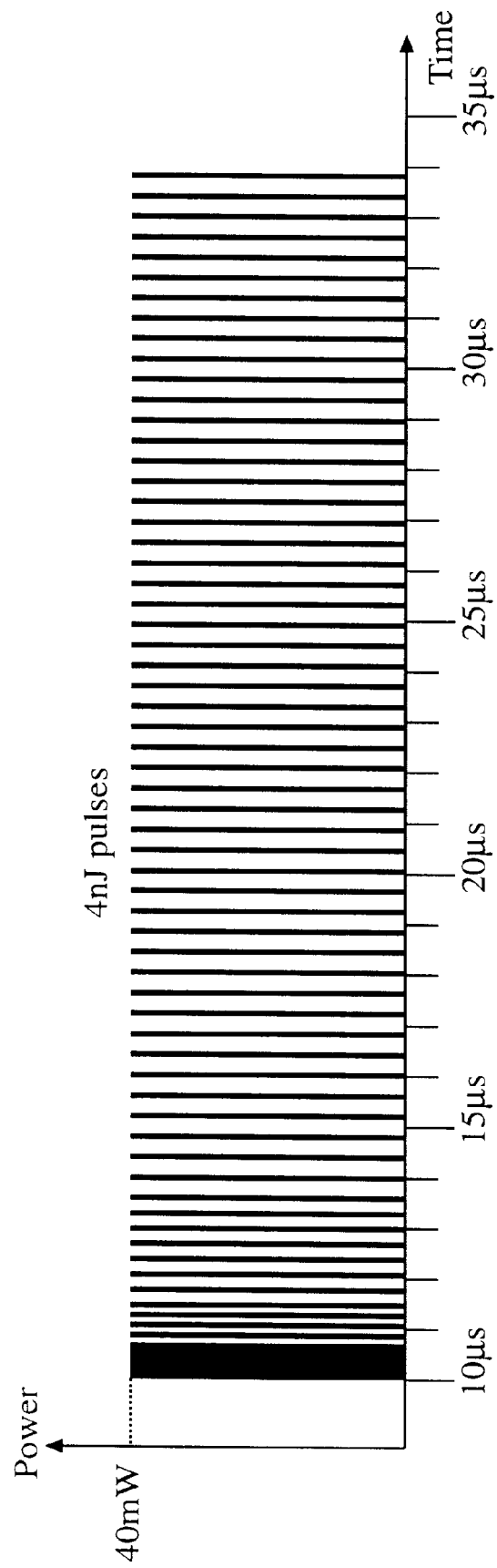
FIG. 3(e) shows the power pulses which are applied to the nozzle heater to generate the temperature curves of FIG. 3(c)

FIG. 3(e) shows the power applied to the heater. Optimum operation requires a sharp rise in temperature at the start of the heater pulse, a maintenance of the temperature a little below the boiling point of the ink for the duration of the pulse, and a rapid fall in temperature at the end of the pulse. To achieve this, the average energy applied to the heater is varied over the duration of the pulse. In this case, the variation is achieved by pulse frequency modulation of 0.1 μs sub-pulses, each with an energy of 4 nJ. The peak power applied to the heater is 40 mW, and the average power over the duration of the heater pulse is 11.5 mW. The sub-pulse frequency in this case is 5 Mhz. This can readily be varied without significantly affecting the operation of the print head. A higher sub-pulse frequency allows finer control over the power applied to the heater. A sub-pulse frequency of 13.5 Mhz is suitable, as this frequency is also suitable for minimizing the effect of radio frequency interference (RFI).

Inks With a Negative Temperature Coefficient of Surface Tension

The requirement for the surface tension of the ink to decrease with increasing temperature is not a major restriction, as most pure liquids and many mixtures have this property. Exact equations relating surface tension to temperature for arbitrary liquids are not available. However, the following empirical equation derived by Ramsay and Shields is satisfactory for many liquids:

$$\gamma_T = k \frac{(T_c - T - 6)}{\sqrt[3]{\left(\frac{Mx}{\rho}\right)^2}}$$

Where $\gamma_T$ is the surface tension at temperature T, k is a constant, $T_c$ is the critical temperature of the liquid, M is the molar mass of the liquid, x is the degree of association of the liquid, and $\rho$ is the density of the liquid. This equation indicates that the surface tension of most liquids falls to zero as the temperature reaches the critical temperature of the liquid. For most liquids, the critical temperature is substantially above the boiling point at atmospheric pressure, so to achieve an ink with a large change in surface tension with a small change in temperature around a practical ejection temperature, the admixture of surfactants is recommended.

The choice of surfactant is important. For example, water based ink for thermal ink jet printers often contains isopropyl alcohol (2-propanol) to reduce the surface tension and promote rapid drying. Isopropyl alcohol has a boiling point of 82.4° C., lower than that of water. As the temperature rises, the alcohol evaporates faster than the water, decreasing the alcohol concentration and causing an increase in surface tension. A surfactant such as 1-Hexanol (b.p. 158° C.) can be used to reverse this effect, and achieve a surface tension which decreases slightly with temperature. However, a relatively large decrease in surface tension with temperature is desirable to maximize operating latitude. A surface tension decrease of 20 mN/m over a 30° C. temperature range is preferred to achieve large operating margins, while as little as 10 mN/m can be used to achieve operation of the print head according to the present invention.

Inks With Large $-\Delta\gamma_T$

Several methods may be used to achieve a large negative change in surface tension with increasing temperature. Two such methods are:
1) The ink may contain a low concentration sol of a surfactant which is solid at ambient temperatures, but melts at a threshold temperature. Particle sizes less than 1,000 Å are desirable. Suitable surfactant melting points for a water based ink are between 50° C. and 90° C., and preferably between 60° C. and 80° C.
2) The ink may contain an oilwater microemulsion with a phase inversion temperature (PIT) which is above the maximum ambient temperature, but below the boiling point of the ink. For stability, the PIT of the microemulsion is preferably 20° C. or more above the maximum non-operating temperature encountered by the ink. A PIT of approximately 80° C. is suitable.

Inks with Surfactant Sols

Inks can be prepared as a sol of small particles of a surfactant which melts in the desired operating temperature range. Examples of such surfactants include carboxylic acids with between 14 and 30 carbon atoms, such as:

| Name | Formula | m.p. | Synonym |
| --- | --- | --- | --- |
| Tetradecanoic acid | $CH_3(CH_2)_{12}COOH$ | 58° C. | Myristic acid |
| Hexadecanoic acid | $CH_3(CH_2)_{14}COOH$ | 63° C. | Palmitic acid |
| Octadecanoic acid | $CH_3(CH_2)_{15}COOH$ | 71° C. | Stearic acid |
| Eicosanoic acid | $CH_3(CH_2)_{16}COOH$ | 77° C. | Arachidic acid |
| Docosanoic acid | $CH_3(CH_2)_{20}COOH$ | 80° C. | Behenic acid |

As the melting point of sols with a small particle size is usually slightly less than of the bulk material, it is preferable to choose a carboxylic acid with a melting point slightly above the desired drop selection temperature. A good example is Arachidic acid.

These carboxylic acids are available in high purity and at low cost. The amount of surfactant required is very small, so the cost of adding them to the ink is insignificant. A mixture of carboxylic acids with slightly varying chain lengths can be used to spread the melting points over a range of temperatures. Such mixtures will typically cost less than the pure acid.

It is not necessary to restrict the choice of surfactant to simple unbranched carboxylic acids. Surfactants with branched chains or phenyl groups, or other hydrophobic moieties can be used. It is also not necessary to use a carboxylic acid. Many highly polar moieties are suitable for the hydrophilic end of the surfactant. It is desirable that the polar end be ionizable in water, so that the surface of the surfactant particles can be charged to aid dispersion and prevent flocculation. In the case of carboxylic acids, this can be achieved by adding an alkali such as sodium hydroxide or potassium hydroxide.

Preparation of Inks with Surfactant Sols

The surfactant sol can be prepared separately at high concentration, and added to the ink in the required concentration.

An example process for creating the surfactant sol is as follows:
1) Add the carboxylic acid to purified water in an oxygen free atmosphere.
2) Heat the mixture to above the melting point of the carboxylic acid. The water can be brought to a boil.
3) Ultrasonicate the mixture, until the typical size of the carboxylic acid droplets is between 100 Å and 1,000 Å.
4) Allow the mixture to cool.
5) Decant the larger particles from the top of the mixture.
6) Add an alkali such as NaOH to ionize the carboxylic acid molecules on the surface of the particles. A pH of approximately 8 is suitable. This step is not absolutely necessary, but helps stabilize the sol.
7) Centrifuge the sol. As the density of the carboxylic acid is lower than water, smaller particles will accumulate at the outside of the centrifuge, and larger particles in the centre.
8) Filter the sol using a microporous filter to eliminate any particles above 5000 Å.
9) Add the surfactant sol to the ink preparation. The sol is required only in very dilute concentration.

The ink preparation will also contain either dye(s) or pigment(s), bactericidal agents, agents to enhance the electrical conductivity of the ink if electrostatic drop separation is used, humectants, and other agents as required.

Anti-foaming agents will generally not be required, as there is no bubble formation during the drop ejection process.

Cationic Surfactant Sols

Inks made with anionic surfactant sols are generally unsuitable for use with cationic dyes or pigments. This is because the cationic dye or pigment may precipitate or flocculate with the anionic surfactant. To allow the use of cationic dyes and pigments, a cationic surfactant sol is required. The family of alkylamines is suitable for this purpose.

Various suitable alkylamines are shown in the following table:

| Name | Formula | Synonym |
| --- | --- | --- |
| Hexadecylamine | $CH_3(CH_2)_{14}CH_2NH_2$ | Palmityl amine |
| Octadecylamine | $CH_3(CH_2)_{16}CH_2NH_2$ | Stearyl amine |
| Eicosylamine | $CH_3(CH_2)_{18}CH_2NH_2$ | Arachidyl amine |
| Docosylamine | $CH_3(CH_2)_{20}CH_2NH_2$ | Behenyl amine |

The method of preparation of cationic surfactant sols is essentially similar to that of anionic surfactant sols, except that an acid instead of an alkali is used to adjust the pH balance and increase the charge on the surfactant particles. A pH of 6 using HCl is suitable.

Microemulsion Based Inks

An alternative means of achieving a large reduction in surface tension as some temperature threshold is to base the ink on a microemulsion. A microemulsion is chosen with a phase inversion temperature (PIT) around the desired ejection threshold temperature. Below the PIT, the microemulsion is oil in water (O/W), and above the PIT the microemulsion is water in oil (W/O). At low temperatures, the surfactant forming the microemulsion prefers a high curvature surface around oil, and at temperatures significantly above the PIT, the surfactant prefers a high curvature surface around water. At temperatures close to the PIT, the microemulsion forms a continuous 'sponge' of topologically connected water and oil.

There are two mechanisms whereby this reduces the surface tension. Around the PIT, the surfactant prefers surfaces with very low curvature. As a result, surfactant molecules migrate to the ink/air interface, which has a curvature which is much less than the curvature of the oil emulsion. This lowers the surface tension of the water. Above the phase inversion temperature, the microemulsion changes from O/W to W/O, and therefore the ink/air interface changes from water/air to oil/air. The oil/air interface has a lower surface tension.

There is a wide range of possibilities for the preparation of microemulsion based inks.

For fast drop ejection, it is preferable to chose a low viscosity oil.

In many instances, water is a suitable polar solvent. However, in some cases different polar solvents may be required. In these cases, polar solvents with a high surface tension should be chosen, so that a large decrease in surface tension is achievable.

The surfactant can be chosen to result in a phase inversion temperature in the desired range. For example, surfactants of the group poly(oxyethylene)alkylphenyl ether (ethoxylated alkyl phenols, general formula: $C_nH_{2n+1}C_4H_6(CH_2CH_2O)_mOH$) can be used. The hydrophilicity of the surfactant can be increased by increasing m, and the hydrophobicity can be increased by increasing n. Values of m of approximately 10, and n of approximately 8 are suitable.

Low cost commercial preparations are the result of a polymerization of various molar ratios of ethylene oxide and alkyl phenols, and the exact number of oxyethylene groups varies around the chosen mean. These commercial preparations are adequate, and highly pure surfactants with a specific number of oxyethylene groups are not required.

The formula for this surfactant is $C_8H_{17}C_4H_6(CH_2CH_2O)_nOH$ (average n=10).

Synonyms include Octoxynol-10, PEG-10 octyl phenyl ether and POE (10) octyl phenyl ether The HLB is 13.6, the melting point is 7° C., and the cloud point is 65° C.

Commercial preparations of this surfactant are available under various brand names. Suppliers and brand names are listed in the following table:

| Trade name | Supplier |
| --- | --- |
| Akyporox OP100 | Chem-Y GmbH |
| Alkasurf OP-10 | Rhone-Poulenc Surfactants and Specialties |
| Dehydrophen POP 10 | Pulcra SA |
| Hyonic OP-10 | Henkel Corp. |
| Iconol OP-10 | BASF Corp. |
| Igepal O | Rhone-Poulenc France |
| Macol OP-10 | PPG Industries |
| Malorphen 810 | Huls AG |
| Nikkol OP-10 | Nikko Chem. Co. Ltd. |
| Renex 750 | ICI Americas Inc. |
| Rexol 45/10 | Hart Chemical Ltd. |
| Synperonic OP10 | ICI PLC |
| Teric X10 | ICI Australia |

These are available in large volumes at low cost (less than one dollar per pound in quantity), and so contribute less than 10 cents per liter to prepared microemulsion ink with a 5% surfactant concentration.

Other suitable ethoxylated alkyl phenols include those listed in the following table:

| Trivial name | Formula | HLB | Cloud point |
| --- | --- | --- | --- |
| Nonoxynol-9 | $C_9H_{19}C_4H_6(CH_2CH_2O)_9OH$ | 13 | 54° C. |
| Nonoxynol-10 | $C_9H_{19}C_4H_6(CH_2CH_2O)_{10}OH$ | 13.2 | 62° C. |
| Nonoxynol-11 | $C_9H_{19}C_4H_6(CH_2CH_2O)_{11}OH$ | 13.8 | 72° C. |
| Nonoxynol-12 | $C_9H_{19}C_4H_6(CH_2CH_2O)_{12}OH$ | 14.5 | 81° C. |
| Octoxynol-9 | $C_8H_{17}C_4H_6(CH_2CH_2O)_9OH$ | 12.1 | 61° C. |
| Octoxynol-10 | $C_8H_{17}C_4H_6(CH_2CH_2O)_{10}OH$ | 13.6 | 65° C. |
| Octoxynol-12 | $C_8H_{17}C_4H_6(CH_2CH_2O)_{12}OH$ | 14.6 | 88° C. |
| Dodoxynol-10 | $C_{12}H_{25}C_4H_6(CH_2CH_2O)_{10}OH$ | 12.6 | 42° C. |
| Dodoxynol-11 | $C_{12}H_{25}C_4H_6(CH_2CH_2O)_{11}OH$ | 13.5 | 56° C. |
| Dodoxynol-14 | $C_{12}H_{25}C_4H_6(CH_2CH_2O)_{14}OH$ | 14.5 | 87° C. |

Microemulsion based inks have advantages other than surface tension control:
1) Microemulsions are thermodynamically stable, and will not separate. Therefore, the storage time can be very long. This is especially significant for office and portable printers, which may be used sporadically.
2) The microemulsion will form spontaneously with a particular drop size, and does not require extensive stirring, centrifuging, or filtering to ensure a particular range of emulsified oil drop sizes.
3) The amount of oil contained in the ink can be quite high, so dyes which are soluble in oil or soluble in water, or both, can be used. It is also possible to use a mixture of dyes, one soluble in water, and the other soluble in oil, to obtain specific colors.
4) Oil miscible pigments are prevented from flocculating, as they are trapped in the oil microdroplets.
5) The use of a microemulsion can reduce the mixing of different dye colors on the surface of the print medium.
6) The viscosity of microemulsions is very low.
7) The requirement for humectants can be reduced or eliminated.

Dyes and Pigments in Microemulsion Based Inks

Oil in water mixtures can have high oil contents—as high as 40%—and still form O/W microemulsions. This allows a high dye or pigment loading.

Mixtures of dyes and pigments can be used. An example of a microemulsion based ink mixture with both dye and pigment is as follows:
1) 70% water
2) 5% water soluble dye
3) 5% surfactant
4) 10% oil
5) 10% oil miscible pigment The following table shows the nine basic combinations of colorants in the oil and water phases of the microemulsion that may be used.

| Combination | Colorant in water phase | Colorant in oil phase |
| --- | --- | --- |
| 1 | none | oil miscible pigment |
| 2 | none | oil soluble dye |
| 3 | water soluble dye | none |
| 4 | water soluble dye | oil miscible pigment |
| 5 | water soluble dye | oil soluble dye |
| 6 | pigment dispersed in water | none |
| 7 | pigment dispersed in water | oil miscible pigment |
| 8 | pigment dispersed in water | oil soluble dye |
| 9 | none | none |

The ninth combination, with no colorants, is useful for printing transparent coatings, UV ink, and selective gloss highlights.

As many dyes are amphiphilic, large quantities of dyes can also be solubilized in the oil-water boundary layer as this layer has a very large surface area.

It is also possible to have multiple dyes or pigments in each phase, and to have a mixture of dyes and pigments in each phase.

When using multiple dyes or pigments the absorption spectrum of the resultant ink will be the weighted average of the absorption spectra of the different colorants used. This presents two problems:
1) The absorption spectrum will tend to become broader, as the absorption peaks of both colorants are averaged. This has a tendency to 'muddy' the colors. To obtain brilliant color, careful choice of dyes and pigments based on their absorption spectra, not just their human-perceptible color, needs to be made.
2) The color of the ink may be different on different substrates. If a dye and a pigment are used in combination, the color of the dye will tend to have a smaller contribution to the printed ink color on more absorptive papers, as the dye will be absorbed into the paper, while the pigment will tend to 'sit on top' of the paper. This may be used as an advantage in some circumstances.

Surfactants with a Krafft Point in the Drop Selection Temperature Range

For ionic surfactants there is a temperature (the Krafft point) below which the solubility is quite low, and the solution contains essentially no micelles. Above the Krafft temperature micelle formation becomes possible and there is a rapid increase in solubility of the surfactant. If the critical micelle concentration (CMC) exceeds the solubility of a surfactant at a particular temperature, then the minimum surface tension will be achieved at the point of maximum solubility, rather than at the CMC. Surfactants are usually much less effective below the Krafft point.

This factor can be used to achieve an increased reduction in surface tension with increasing temperature. At ambient temperatures, only a portion of the surfactant is in solution. When the nozzle heater is turned on, the temperature rises, and more of the surfactant goes into solution, decreasing the surface tension.

A surfactant should be chosen with a Krafft point which is near the top of the range of temperatures to which the ink is raised. This gives a maximum margin between the concentration of surfactant in solution at ambient temperatures, and the concentration of surfactant in solution at the drop selection temperature.

The concentration of surfactant should be approximately equal to the CMC at the Krafft point. In this manner, the surface tension is reduced to the maximum amount at elevated temperatures, and is reduced to a minimum amount at ambient temperatures.

The following table shows some commercially available surfactants with Krafft points in the desired range.

| Formula | Krafft point |
|---|---|
| $C_{16}H_{33}SO_3^- Na^+$ | 57° C. |
| $C_{18}H_{37}SO_3^- Na^+$ | 70° C. |
| $C_{16}H_{33}SO_4^- Na^+$ | 45° C. |
| $Na^+ {}^-O_4S(CH_2)_{16}SO_4^- Na^+$ | 44.9° C. |
| $K^+ {}^-O_4S(CH_2)_{16}SO_4^- K^+$ | 55° C. |
| $C_{16}H_{33}CH(CH_3)C_4H_6SO_3^- Na^+$ | 60.8° C. |

Surfactants with a Cloud Point in the Drop Selection Temperature Range

Non-ionic surfactants using polyoxyethylene (POE) chains can be used to create an ink where the surface tension falls with increasing temperature. At low temperatures, the POE chain is hydrophilic, and maintains the surfactant in solution. As the temperature increases, the structured water around the POE section of the molecule is disrupted, and the POE section becomes hydrophobic. The surfactant is increasingly rejected by the water at higher temperatures, resulting in increasing concentration of surfactant at the air/ink interface, thereby lowering surface tension. The temperature at which the POE section of a nonionic surfactant becomes hydrophilic is related to the cloud point of that surfactant. POE chains by themselves are not particularly suitable, as the cloud point is generally above 100° C.

Polyoxypropylene (POP) can be combined with POE in POE/POP block copolymers to lower the cloud point of POE chains without introducing a strong hydrophobicity at low temperatures.

Two main configurations of symmetrical POE/POP block copolymers are available. These are:

1) Surfactants with POE segments at the ends of the molecules, and a POP segment in the centre, such as the poloxamer class of surfactants (generically CAS 9003-11-6)
2) Surfactants with POP segments at the ends of the molecules, and a POE segment in the centre, such as the meroxapol class of surfactants (generically also CAS 9003-11-6)

Some commercially available varieties of poloxamer and meroxapol with a high surface tension at room temperature, combined with a cloud point above 40° C. and below 100° C. are shown in the following table:

| Trivial name | BASF Trade name | Formula | Surface Tension (mN/m) | Cloud point |
|---|---|---|---|---|
| Meroxapol 105 | Pluronic 10R5 | $HO(CHCH_3CH_2O)_{-7}(CH_2CH_2O)_{-22}(CHCH_3CH_2O)_{-7}OH$ | 50.9 | 69° C. |
| Meroxapol 108 | Pluronic 10R8 | $HO(CHCH_3CH_2O)_{-7}(CH_2CH_2O)_{-91}(CHCH_3CH_2O)_{-7}OH$ | 54.1 | 99° C. |
| Meroxapol 178 | Pluronic 17R8 | $HO(CHCH_3CH_2O)_{-12}(CH_2CH_2O)_{-136}(CHCH_3CH_2O)_{-12}OH$ | 47.3 | 81° C. |
| Meroxapol 258 | Pluronic 25R8 | $HO(CHCH_3CH_2O)_{-18}(CH_2CH_2O)_{-163}(CHCH_3CH_2O)_{-18}OH$ | 46.1 | 80° C. |
| Poloxamer 105 | Pluronic L35 | $HO(CH_2CH_2O)_{-11}(CHCH_3CH_2O)_{-16}(CH_2CH_2O)_{-11}OH$ | 48.8 | 77° C. |
| Poloxamer 124 | Pluronic LM | $HO(CH_2CH_2O)_{-11}(CHCH_3CH_2O)_{-21}(CH_2CH_2O)_{-11}OH$ | 45.3 | 65° C. |

Other varieties of poloxamer and meroxapol can readily be synthesized using well known techniques. Desirable characteristics are a room temperature surface tension which is as high as possible, and a cloud point between 40° C. and 100° C., and preferably between 60° C. and 80° C.

Meroxapol [$HO(CHCH_3CH_2O)_x(CH_2CH_2O)_y(CHCH_3CH_2O)_zOH$] varieties where the average x and z are approximately 4, and the average y is approximately 15 may be suitable.

If salts are used to increase the electrical conductivity of the ink, then the effect of this salt on the cloud point of the surfactant should be considered.

The cloud point of POE surfactants is increased by ions that disrupt water structure (such as I⁻), as this makes more water molecules available to form hydrogen bonds with the POE oxygen lone pairs. The cloud point of POE surfactants is decreased by ions that form water structure (such as Cl⁻, OH⁻), as fewer water molecules are available to form hydrogen bonds. Bromide ions have relatively little effect. The ink composition can be 'tuned' for a desired temperature range by altering the lengths of POE and POP chains in a block copolymer surfactant, and by changing the choice of salts (e.g Cl⁻ to Br⁻ to I⁻) that are added to increase electrical conductivity. NaCl is likely to be the best choice of salts to increase ink conductivity, due to low cost and non-toxicity. NaCl slightly lowers the cloud point of nonionic surfactants.

Hot Melt Inks

The ink need not be in a liquid state at room temperature. Solid 'hot melt' inks can be used by heating the printing head and ink reservoir above the melting point of the ink. The hot melt ink must be formulated so that the surface tension of the molten ink decreases with temperature. A decrease of approximately 2 mN/m will be typical of many such preparations using waxes and other substances. However, a reduction in surface tension of approximately 20 mN/m is desirable in order to achieve good operating margins when relying on a reduction in surface tension rather than a reduction in viscosity.

The temperature difference between quiescent temperature and drop selection temperature may be greater for a hot melt ink than for a water based ink, as water based inks are constrained by the boiling point of the water.

The ink must be liquid at the quiescent temperature. The quiescent temperature should be higher than the highest ambient temperature likely to be encountered by the printed page. The quiescent temperature should also be as low as practical, to reduce the power needed to heat the print head, and to provide a maximum margin between the quiescent and the drop ejection temperatures. A quiescent temperature between 60° C. and 90° C. is generally suitable, though other temperatures may be used. A drop ejection temperature of between 160° C. and 200° C. is generally suitable.

There are several methods of achieving an enhanced reduction in surface tension with increasing temperature.
1) A dispersion of microfine particles of a surfactant with a melting point substantially above the quiescent temperature, but substantially below the drop ejection temperature, can be added to the hot melt ink while in the liquid phase.
2) A polar/non-polar microemulsion with a PIT which is preferably at least 20° C. above the melting points of both the polar and non-polar compounds.

To achieve a large reduction in surface tension with temperature, it is desirable that the hot melt ink carrier have a relatively large surface tension (above 30 mN/m) when at the quiescent temperature. This generally excludes alkanes such as waxes. Suitable materials will generally have a strong intermolecular attraction, which may be achieved by multiple hydrogen bonds, for example, polyols, such as Hexanetetrol, which has a melting point of 88° C.

Surface Tension Reduction of Various Solutions

FIG. 3(d) shows the measured effect of temperature on the surface tension of various aqueous preparations containing the following additives:
1) 0.1% sol of Stearic Acid
2) 0.1% sol of Palmitic acid
3) 0.1% solution of Pluronic 10R5 (trade mark of BASF)
4) 0.1% solution of Pluronic L35 (trade mark of BASF)
5) 0.1% solution of Pluronic L44 (trade mark of BASF)

Inks suitable for printing systems of the present invention are described in the following Australian patent specifications, the disclosure of which are hereby incorporated by reference:

'Ink composition based on a microemulsion' (Filing no.: PN5223, filed on Sep. 6, 1995);
'Ink composition containing surfactant sol' (Filing no.: PN5224, filed on Sep. 6, 1995);
'Ink composition for DOD printers with Krafft point near the drop selection temperature sol' (Filing no.: PN6240, filed on Oct. 30, 1995); and
'Dye and pigment in a microemulsion based ink' (Filing no.: PN6241, filed on Oct. 30, 1995).

Operation Using Reduction of Viscosity

As a second example, operation of an embodiment using thermal reduction of viscosity and proximity drop separation, in combination with hot melt ink, is as follows. Prior to operation of the printer, solid ink is melted in the reservoir 64. The reservoir, ink passage to the print head, ink channels 75, and print head 50 are maintained at a temperature at which the ink 100 is liquid, but exhibits a relatively high viscosity (for example, approximately 100 cP). The Ink 100 is retained in the nozzle by the surface tension of the ink. The ink 100 is formulated so that the viscosity of the ink reduces with increasing temperature. The ink pressure oscillates at a frequency which is an integral multiple of the drop ejection frequency from the nozzle. The ink pressure oscillation causes oscillations of the ink meniscus at the nozzle tips, but this oscillation is small due to the high ink viscosity. At the normal operating temperature, these oscillations are of insufficient amplitude to result in drop separation. When the heater 103 is energized, the ink forming the selected drop is heated, causing a reduction in viscosity to a value which is preferably less than 5 cP. The reduced viscosity results in the ink meniscus moving further during the high pressure part of the ink pressure cycle. The recording medium 51 is arranged sufficiently close to the print head 50 so that the selected drops contact the recording medium 51, but sufficiently far away that the unselected drops do not contact the recording medium 51. Upon contact with the recording medium 51, part of the selected drop freezes, and attaches to the recording medium. As the ink pressure falls, ink begins to move back into the nozzle. The body of ink separates from the ink which is frozen onto the recording medium. The meniscus of the ink 100 at the nozzle tip then returns to low amplitude oscillation. The viscosity of the ink increases to its quiescent level as remaining heat is dissipated to the bulk ink and print head. One ink drop is selected, separated and forms a spot on the recording medium 51 for each heat pulse. As the heat pulses are electrically controlled, drop on demand ink jet operation can be achieved.

Manufacturing of Print Heads

Manufacturing processes for monolithic print heads in accordance with the present invention are described in the following Australian patent specifications filed on Apr. 12, 1995, the disclosure of which are hereby incorporated by reference:

'A monolithic LIFT printing head' (Filing no.: PN2301);
'A manufacturing process for monolithic LIFT printing heads' (Filing no.: PN2302);
'A self-aligned heater design for LIFT print heads' (Filing no.: PN2303);
'Integrated four color LIFT print heads' (Filing no.: PN2304);
'Power requirement reduction in monolithic LIFT printing heads' (Filing no.: PN2305);
'A manufacturing process for monolithic LIFT print heads using anisotropic wet etching' (Filing no.: PN2306);
'Nozzle placement in monolithic drop-on-demand print heads' (Filing no.: PN2307);

'Heater structure for monolithic LIFT print heads' (Filing no.: PN2346);

'Power supply connection for monolithic LIFT print heads' (Filing no.: PN2347);

'External connections for Proximity LIFT print heads' (Filing no.: PN2348); and

'A self-aligned manufacturing process for monolithic LIFT print heads' (Filing no.: PN2349); and 'CMOS process compatible fabrication of LIFT print heads' (Filing no.: PN5222, Sep. 6, 1995).

'A manufacturing process for LIFT print heads with nozzle rim heaters' (Filing no.: PN6238, Oct. 30, 1995);

'A modular LIFT print head' (Filing no.: PN6237, Oct. 30, 1995);

'Method of increasing packing density of printing nozzles' (Filing no.: PN6236, Oct. 30, 1995); and 'Nozzle dispersion for reduced electrostatic interaction between simultaneously printed droplets' (Filing no.: PN6239, Oct. 30, 1995).

Control of Print Heads

Means of providing page image data and controlling heater temperature in print heads of the present invention is described in the following Australian patent specifications filed on Apr. 12, 1995, the disclosure of which are hereby incorporated by reference:

'Integrated drive circuitry in LIFT print heads' (Filing no.: PN2295);

'A nozzle clearing procedure for Liquid Ink Fault Tolerant (LIFT) printing' (Filing no.: PN2294);

'Heater power compensation for temperature in LIFT printing systems' (Filing no.: PN2314);

'Heater power compensation for thermal lag in LIFT printing systems' (Filing no.: PN2315);

'Heater power compensation for print density in LIFT printing systems' (Filing no.: PN2316);

'Accurate control of temperature pulses in printing heads' (Filing no.: PN2317);

'Data distribution in monolithic LIFT print heads' (Filing no.: PN2318);

'Page image and fault tolerance routing device for LIFT printing systems' (Filing no.: PN2319); and 'A removable pressurized liquid ink cartridge for LIFT printers' (Filing no.: PN2320).

Image Processing for Print Heads

An objective of printing systems according to the invention is to attain a print quality which is equal to that which people are accustomed to in quality color publications printed using offset printing. This can be achieved using a print resolution of approximately 1,600 dpi. However, 1,600 dpi printing is difficult and expensive to achieve. Similar results can be achieved using 800 dpi printing, with 2 bits per pixel for cyan and magenta, and one bit per pixel for yellow and black. This color model is herein called CC'MM'YK. Where high quality monochrome image printing is also required, two bits per pixel can also be used for black. This color model is herein called CC'MM'YKK'. Color models, halftoning, data compression, and real-time expansion systems suitable for use in systems of this invention and other printing systems are described in the following Australian patent specifications filed on Apr. 12, 1995, the disclosure of which are hereby incorporated by reference:

'Four level ink set for bi-level color printing' (Filing no.: PN2339);

'Compression system for page images' (Filing no.: PN2340);

'Real-time expansion apparatus for compressed page images' (Filing no.: PN2341); and 'High capacity compressed document image storage for digital color printers' (Filing no.: PN2342);

'Improving JPEG compression in the presence of text' (Filing no.: PN2343);

'An expansion and halftoning device for compressed page images' (Filing no.: PN2344); and 'Improvements in image halftoning' (Filing no.: PN2345).

Applications Using Print Heads According to this Invention

Printing apparatus and methods of this invention are suitable for a wide range of applications, including (but not limited to) the following: color and monochrome office printing, short run digital printing, high speed digital printing, process color printing, spot color printing, offset press supplemental printing, low cost printers using scanning print heads, high speed printers using pagewidth print heads, portable color and monochrome printers, color and monochrome copiers, color and monochrome facsimile machines, combined printer, facsimile and copying machines, label printing, large format plotters, photographic duplication, printers for digital photographic processing, portable printers incorporated into digital 'instant' cameras, video printing, printing of PhotoCD images, portable printers for 'Personal Digital Assistants', wallpaper printing, indoor sign printing, billboard printing, and fabric printing.

Printing systems based on this invention are described in the following Australian patent specifications filed on Apr. 12, 1995, the disclosure of which are hereby incorporated by reference:

'A high speed color office printer with a high capacity digital page image store' (Filing no.: PN2329);

'A short run digital color printer with a high capacity digital page image store' (Filing no.: PN2330);

'A digital color printing press using LIFT printing technology' (Filing no.: PN2331);

'A modular digital printing press' (Filing no.: PN2332);

'A high speed digital fabric printer' (Filing no.: PN2333);

'A color photograph copying system' (Filing no.: PN2334);

'A high speed color photocopier using a LIFT printing system' (Filing no.: PN2335);

'A portable color photocopier using LIFT printing technology' (Filing no.: PN2336);

'A photograph processing system using LIFT printing technology' (Filing no.: PN2337);

'A plain paper facsimile machine using a LIFT printing system' (Filing no.: PN2338);

'A PhotoCD system with integrated printer' (Filing no.: PN2293);

'A color plotter using LIFT printing technology' (Filing no.: PN2291);

'A notebook computer with integrated LIFT color printing system' (Filing no.: PN2292);

'A portable printer using a LIFT printing system' (Filing no.: PN2300);

'Fax machine with on-line database interrogation and customized magazine printing' (Filing no.: PN2299);

'Miniature portable color printer' (Filing no.: PN2298);

'A color video printer using a LIFT printing system' (Filing no.: PN2296); and

'An integrated printer, copier, scanner, and facsimile using a LIFT printing system' (Filing no.: PN2297)

Comparison with Thermal Ink Jet Technology

The table "Comparison between Thermal ink jet and Present Invention" compares the aspects of printing in accordance with the present invention with thermal ink jet printing technology.

A direct comparison is made between the present invention and thermal ink jet technology because both are drop on demand systems which operate using thermal actuators and liquid ink. Although they may appear similar, the two technologies operate on different principles.

Thermal ink jet printers use the following fundamental operating principle. A thermal impulse caused by electrical resistance heating results in the explosive formation of a bubble in liquid ink. Rapid and consistent bubble formation can be achieved by superheating the ink, so that sufficient heat is transferred to the ink before bubble nucleation is complete. For water based ink, ink temperatures of approximately 280° C. to 400° C. are required. The bubble formation causes a pressure wave which forces a drop of ink from the aperture with high velocity. The bubble then collapses, drawing ink from the ink reservoir to re-fill the nozzle. Thermal ink jet printing has been highly successful commercially due to the high nozzle packing density and the use of well established integrated circuit manufacturing techniques. However, thermal ink jet printing technology faces significant technical problems including multi-part precision fabrication, device yield, image resolution, 'pepper' noise, printing speed, drive transistor power, waste power dissipation, satellite drop formation, thermal stress, differential thermal expansion, kogation, cavitation, rectified diffusion, and difficulties in ink formulation.

Printing in accordance with the present invention has many of the advantages of thermal ink jet printing, and completely or substantially eliminates many of the inherent problems of thermal ink jet technology.

Comparison between Thermal ink jet and Present Invention

| | Thermal Ink-Jet | Present Invention |
|---|---|---|
| Drop selection mechanism | Drop ejected by pressure wave caused by thermally induced bubble | Choice of surface tension or viscosity reduction mechanisms |
| Drop separation mechanism | Same as drop selection mechanism | Choice of proximity, electrostatic, magnetic, and other methods |
| Basic ink carrier | Water | Water, microemulsion, alcohol, glycol, or hot melt |
| Head construction | Precision assembly of nozzle plate, ink channel, and substrate | Monolithic |
| Per copy printing cost | Very high due to limited print head life and expensive inks | Can be low due to permanent print heads and wide range of possible inks |
| Satellite drop formation | Significant problem which degrades image quality | No satellite drop formation |
| Operating ink temperature | 280° C. to 400° C. (high temperature limits dye use and ink formulation) | Approx. 70° C. (depends upon ink formulation) |
| Peak heater temperature | 400° C. to 1,000° C. (high temperature reduces device life) | Approx. 130° C. |
| Cavitation heater erosion by bubble collapse) | Serious problem limiting head life | None (no bubbles are formed) |
| Kogation (coating of heater by ink ash) | Serious problem limiting head life and ink formulation | None (water based ink temperature does not exceed 100° C.) |
| Rectified diffusion (formation of ink bubbles due to pressure cycles) | Serious problem limiting ink formulation | Does not occur as the ink pressure does not go negative |
| Resonance | Serious problem limiting nozzle design and repetition rate | Very small effect as pressure waves are small |
| Practical resolution | Approx. 800 dpi max. | Approx. 1,600 dpi max. |
| Self-cooling operation | No (high energy required) | Yes: printed ink carries away drop selection energy |
| Drop ejection velocity | High (approx. 10 m/sec) | Low (approx. 1 m/sec) |
| Crosstalk | Serious problem requiring careful acoustic design, which limits nozzle refill rate. | Low velocities and pressures associated with drop ejection make crosstalk very small. |
| Operating thermal stress | Serious problem limiting print-head life. | Low: maxmum temperature increase approx. 90° C. at centre of heater. |
| Manufacturing thermal stress | Serious problem limiting print-head size. | Same as standard CMOS manufacturing process. |
| Drop selection | Approx. 20 µJ | Approx. 270 µJ |

Comparison between Thermal ink jet and Present Invention

| | Thermal Ink-Jet | Present Invention |
|---|---|---|
| energy | | |
| Heater pulse period | Approx. 2–3 $\mu$s | Approx. 15–30 $\mu$s |
| Average heater pulse power | Approx. 8 Watts per heater. | Approx. 12 mW per heater. This is more than 500 times less than Thermal Ink-Jet. |
| Heater pulse voltage | Typically approx. 40 V. | Approx. 5 to 10 V. |
| Heater peak pulse current | Typically approx. 200 mA per heater. This requires bipolar or very large MOS drive transistors. | Approx. 4 mA per heater. This allows the use of small MOS drive transistors. |
| Fault tolerance | Not implemented. Not practical for edge shooter type. | Simple implementation results in better yield and reliability |
| Constraints on ink composition | Many constraints including kogation, nucleation, etc. | Temperature coefficient of surface tension or viscosity must be negative. |
| Ink pressure | Atmospheric pressure or less | Approx. 1.1 atm |
| Integrated drive circuitry | Bipolar circuitry usually required due to high drive current | CMOS, nMOS, or bipolar |
| Differential thermal expansion | Significant problem for large print heads | Monolithic construction reduces problem |
| Pagewidth print heads | Major problems with yield, cost, precision construction, head life, and power dissipation | High yield, low cost and long life due to fault tolerance. Self cooling due to low power dissipation. |

Yield and Fault Tolerance

In most cases, monolithic integrated circuits cannot be repaired if they are not completely functional when manufactured. The percentage of operational devices which are produced from a wafer run is known as the yield. Yield has a direct influence on manufacturing cost. A device with a yield of 5% is effectively ten times more expensive to manufacture than an identical device with a yield of 50%.

There are three major yield measurements:
1) Fab yield
2) Wafer sort yield
3) Final test yield For large die, it is typically the wafer sort yield which is the most serious limitation on total yield. Full pagewidth color heads in accordance with this invention are very large in comparison with typical VLSI circuits. Good wafer sort yield is critical to the cost-effective manufacture of such heads.

Figure 5:
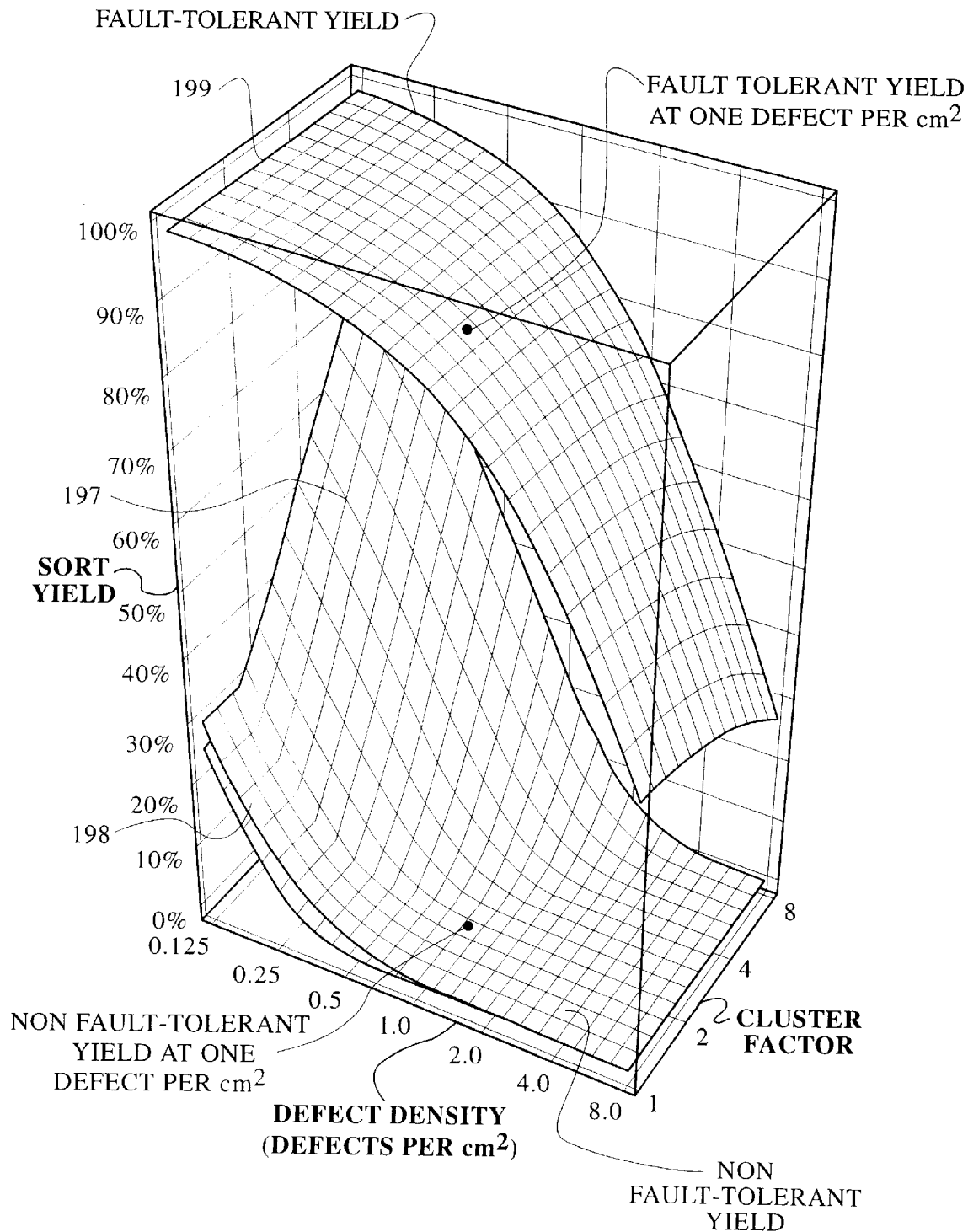
FIG. 5 shows projected manufacturing yields for an A4 page width color print head embodying features of the invention, with and without fault tolerance.

FIG. 5 is a graph of wafer sort yield versus defect density for a monolithic full width color A4 head embodiment of the invention. The head is 215 mm long by 5 mm wide. The non fault tolerant yield 198 is calculated according to Murphy's method, which is a widely used yield prediction method. With a defect density of one defect per square cm, Murphy's method predicts a yield less than 1%. This means that more than 99% of heads fabricated would have to be discarded. This low yield is highly undesirable, as the print head manufacturing cost becomes unacceptably high.

Murphy's method approximates the effect of an uneven distribution of defects. FIG. 5 also includes a graph of non fault tolerant yield 197 which explicitly models the clustering of defects by introducing a defect clustering factor. The defect clustering factor is not a controllable parameter in manufacturing, but is a characteristic of the manufacturing process. The defect clustering factor for manufacturing processes can be expected to be approximately 2, in which case yield projections closely match Murphy's method.

A solution to the problem of low yield is to incorporate fault tolerance by including redundant functional units on the chip which are used to replace faulty functional units.

In memory chips and most Wafer Scale Integration (WSI) devices, the physical location of redundant sub-units on the chip is not important. However, in printing heads the redundant sub-unit may contain one or more printing actuators. These must have a fixed spatial relationship to the page being printed. To be able to print a dot in the same position as a faulty actuator, redundant actuators must not be displaced in the non-scan direction. However, faulty actuators can be replaced with redundant actuators which are displaced in the scan direction. To ensure that the redundant actuator prints the dot in the same position as the faulty actuator, the data timing to the redundant actuator can be altered to compensate for the displacement in the scan direction.

To allow replacement of all nozzles, there must be a complete set of spare nozzles, which results in 100% redundancy. The requirement for 100% redundancy would normally more than double the chip area, dramatically reducing the primary yield before substituting redundant units, and thus eliminating most of the advantages of fault tolerance.

However, with print head embodiments according to this invention, the minimum physical dimensions of the head chip are determined by the width of the page being printed, the fragility of the head chip, and manufacturing constraints on fabrication of ink channels which supply ink to the back surface of the chip. The minimum practical size for a full width, full color head for printing A4 size paper is approximately 215 mm×5 mm. This size allows the inclusion of 100% redundancy without significantly increasing chip area, when using 1.5 $\mu$m CMOS fabrication technology. Therefore, a high level of fault tolerance can be included without significantly decreasing primary yield.

When fault tolerance is included in a device, standard yield equations cannot be used. Instead, the mechanisms and degree of fault tolerance must be specifically analyzed and included in the yield equation. FIG. 5 shows the fault tolerant sort yield 199 for a full width color A4 head which includes various forms of fault tolerance, the modeling of which has been included in the yield equation. This graph shows projected yield as a function of both defect density and defect clustering. The yield projection shown in FIG. 5 indicates that thoroughly implemented fault tolerance can increase wafer sort yield from under 1% to more than 90% under identical manufacturing conditions. This can reduce the manufacturing cost by a factor of 100.

Fault tolerance is highly recommended to improve yield and reliability of print heads containing thousands of printing nozzles, and thereby make pagewidth printing heads practical. However, fault tolerance is not to be taken as an essential part of the present invention.

Fault tolerance in drop-on-demand printing systems is described in the following Australian patent specifications filed on Apr. 12, 1995, the disclosure of which are hereby incorporated by reference:

'Integrated fault tolerance in printing mechanisms' (Filing no.: PN2324);

'Block fault tolerance in integrated printing heads' (Filing no.: PN2325);

'Nozzle duplication for fault tolerance in integrated printing heads' (Filing no.: PN2326);

'Detection of faulty nozzles in printing heads' (Filing no.: PN2327); and

'Fault tolerance in high volume printing presses' (Filing no.: PN2328).

Printing System Embodiments

Figure 6:
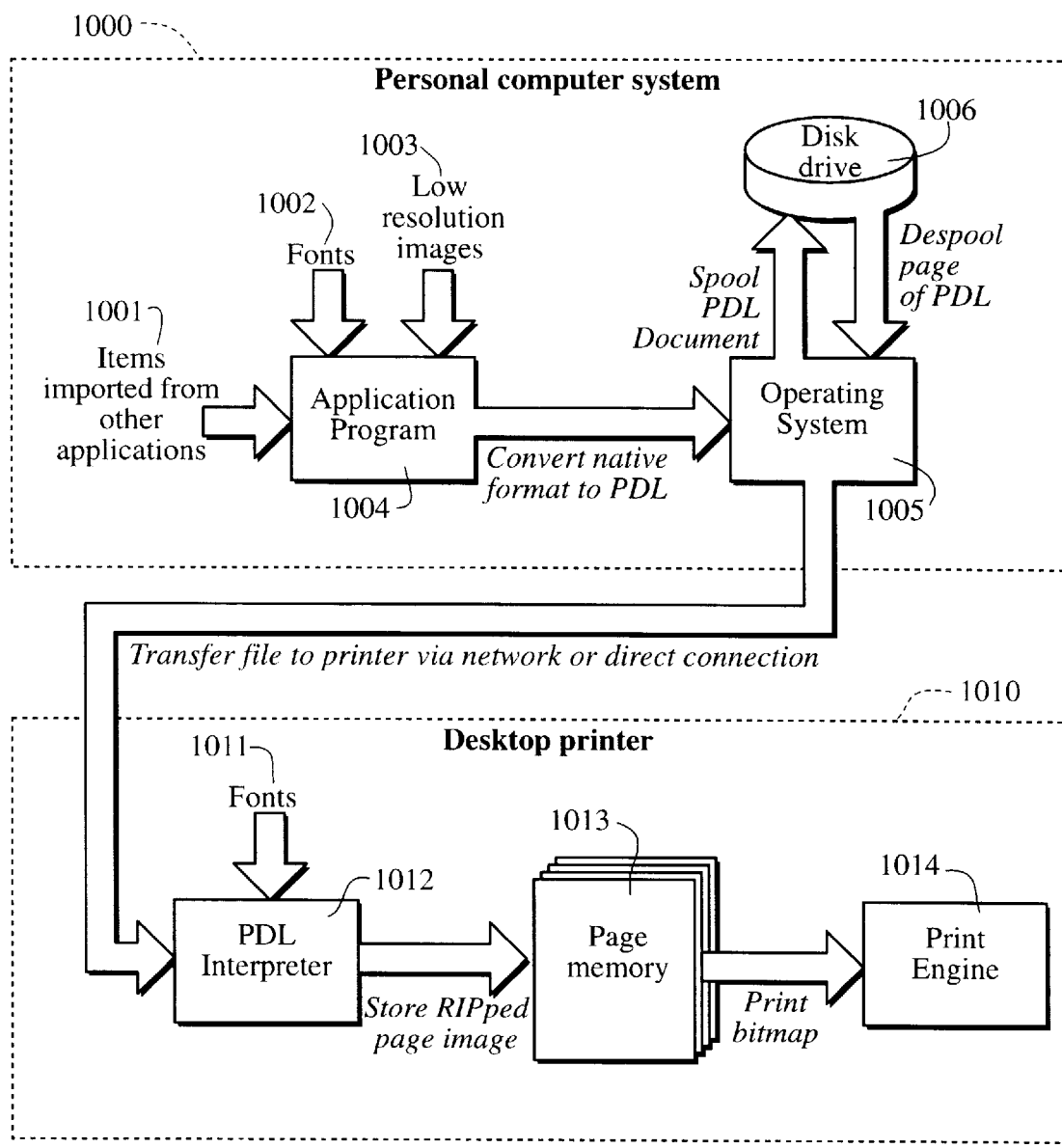
FIG. 6 is a block schematic diagram of a typical current office or home printing system.

A schematic diagram of a digital electronic printing system using a print head of this invention is shown in FIG. 6. This shows a monolithic printing head 50 printing an image 60 composed of a multitude of ink drops onto a recording medium 51. This medium will typically be paper, but can also be overhead transparency film, cloth, or many other substantially flat surfaces which will accept ink drops. The image to be printed is provided by an image source 52, which may be any image type which can be converted into a two dimensional array of pixels. Typical image sources are image scanners, digitally stored images, images encoded in a page description language (PDL) such as Adobe Postscript, Adobe Postscript level 2, or Hewlett-Packard PCL 5, page images generated by a procedure-call based rasterizer, such as Apple QuickDraw, Apple Quickdraw GX, or Microsoft GDI, or text in an electronic form such as ASCII. This image data is then converted by an image processing system 53 into a two dimensional array of pixels suitable for the particular printing system. This may be color or monochrome, and the data will typically have between 1 and 32 bits per pixel, depending upon the image source and the specifications of the printing system. The image processing system may be a raster image processor (RIP) if the source image is a page description, or may be a two dimensional image processing system if the source image is from a scanner.

If continuous tone images are required, then a halftoning system 54 is necessary. Suitable types of halftoning are based on dispersed dot ordered dither or error diffusion. Variations of these, commonly known as stochastic screening or frequency modulation screening are suitable. The halftoning system commonly used for offset printing—clustered dot ordered dither—is not recommended, as effective image resolution is unnecessarily wasted using this technique. The output of the halftoning system is a binary monochrome or color image at the resolution of the printing system according to the present invention.

Figure 4:
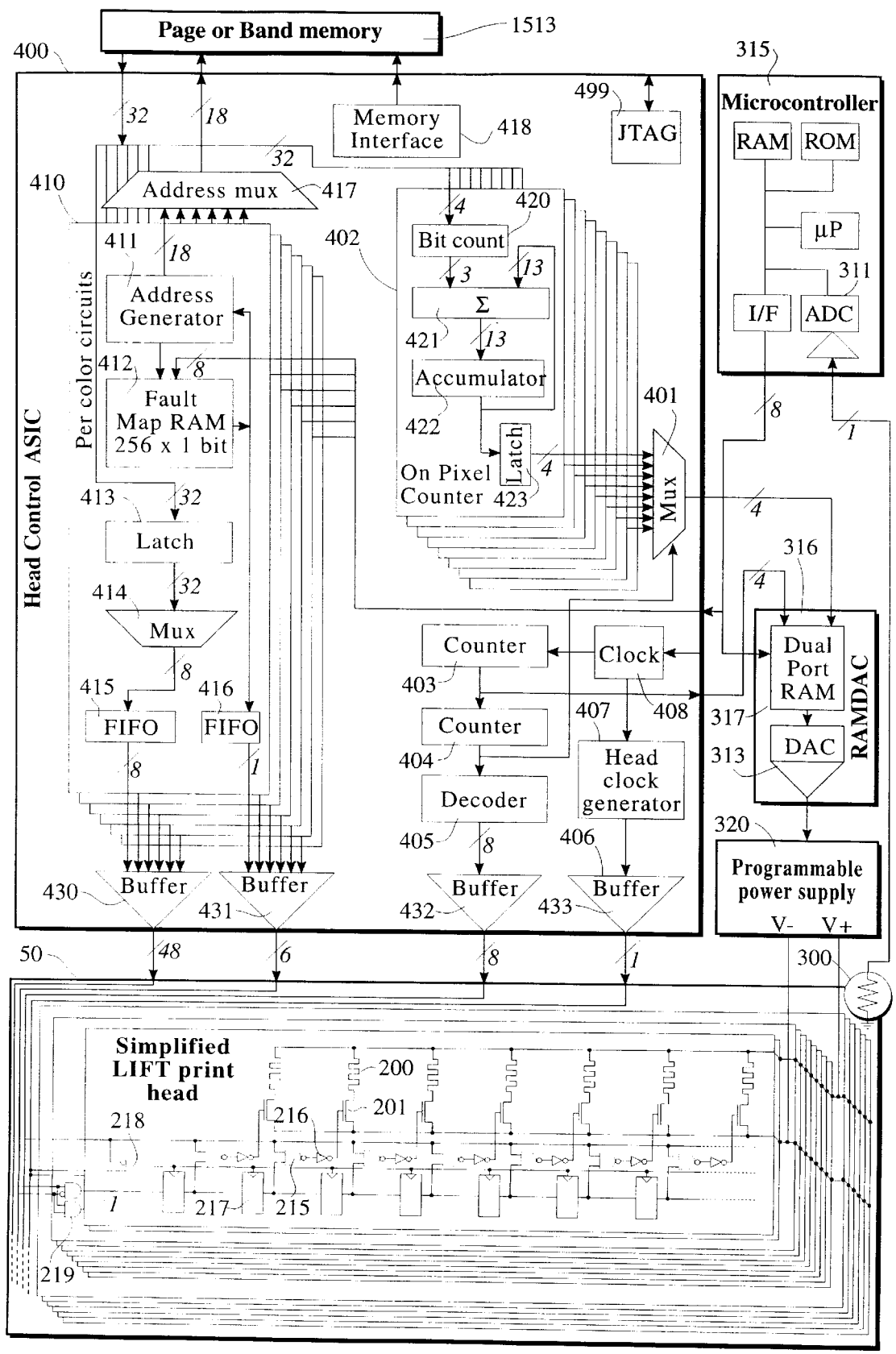
FIG. 4 shows a block schematic diagram of print head drive circuitry for practice of the invention.

The binary image is processed by a data phasing circuit 55 (which may be incorporated in a Head Control ASIC 400 as shown in FIG. 4) which provides the pixel data in the correct sequence to the data shift registers 56. Data sequencing is required to compensate for the nozzle arrangement and the movement of the paper. When the data has been loaded into the shift registers 56, it is presented in parallel to the heater driver circuits 57. At the correct time, the driver circuits 57 will electronically connect the corresponding heaters 58 with the voltage pulse generated by the pulse shaper circuit 61 and the voltage regulator 62. The heaters 58 heat the tip of the nozzles 59, affecting the physical characteristics of the ink. Ink drops 60 escape from the nozzles in a pattern which corresponds to the digital impulses which have been applied to the heater driver circuits. The pressure of the ink in the ink reservoir 64 is regulated by the pressure regulator 63. Selected drops of ink drops 60 are separated from the body of ink by the chosen drop separation means, and contact the recording medium 51. During printing, the recording medium 51 is continually moved relative to the print head 50 by the paper transport system 65. If the print head 50 is the full width of the print region of the recording medium 51, it is only necessary to move the recording medium 51 in one direction, and the print head 50 can remain fixed. If a smaller print head 50 is used, it is necessary to implement a raster scan system. This is typically achieved by scanning the print head 50 along the short dimension of the recording medium 51, while moving the recording medium 51 along its long dimension.

Digital High Speed Color Printing Systems

There are currently two major and widespread methods of printing on paper. For small quantities (typically less than 100 copies) digital printing using electrophotographic and drop-on-demand printing technologies are dominant in the home and office. For larger quantities of the same document (typically greater than 1,000 copies) commercial printing using offset and gravure printing presses are dominant.

Typical Current Home and Office Printing Systems

FIG. 6 shows a typical digital office or home printing system in use at the time of writing. The two major components of the system are a personal computer system 1000 and a desktop printer 1010. The information to be printed is usually created by one or more application programs. There are many application programs in common use, which fall into several categories, such as page layout programs, drawing programs, word processing programs, database programs, spreadsheet programs, CAD programs, image processing programs, and so on, most of which have differing internal representations (native formats) of the document to be printed. Most of these programs can use items imported from other applications 1001, and digital typefaces or fonts 1002. Many application programs 1004 on desktop computers can also import photographic images. In practice, the use of photographic images is usually limited to low resolution images 1003 with less than approximately one million pixels. This is because high resolution images (of image quality equal to or greater than 35 mm film) typically require 18 MBytes to 100 MBytes of data to store each image. In most circumstances this data must be stored on the disk drive of the personal computer, and in many applications the full image data must reside at least temporarily in the main memory of the computer. Most desktop computers at the time of writing are not well equipped to efficiently manipulate high resolution photographic images, and so such images are not commonly used in office and home printing. Currently, documents printed in the home and office environments are composed primarily of text, graphics, bitmapped or vector 'clip-art' and low resolution images. Most of the application programs 1004 have the ability to print documents generated in the application. To do this, the internal native format is typically converted to a page description language (PDL) such as Adobe 'Postscript™', Adobe 'Postscript Level 2™', or Hewlett-Packard 'PCL5™'. Alternatively, the internal representation may be converted to a series of procedure calls to a graphics library, such as Microsoft 'GDI™' or Apple Computer 'Quickdraw™' or 'Quickdraw GX™'. (Product names market with the ™ symbol are trademarks of the corresponding companies preceding the product name.) The document description is provided to the operating system 1005 of the personal computer 1000, which may spool the document to the disk drive 1006. When the desktop printer 1010 is ready to print a page, the operating system 1005 despools the description of the next page from the disk drive. The page information is then transferred to the desktop printer 1010 via a direct serial or parallel connection, or a local area network. The desktop printer 1010 may contain a PDL interpreter 1012, which converts the page description to a bitmap page representation using digital fonts 1011. The bitmap page representation is stored in a page memory 1013 and printed by the print engine 1014. The page memory 1013 is typically only large enough to store one page image, though in some desktop printers the page memory can store two page images to allow one page to be printed while a subsequent page is being calculated. In most cases, documents are not stored on the printer, so both the personal computer 1000 and the desktop printer 1010 are required to calculate and print any document, even if there has been no change to the document since the last time it was printed.

Typical Current Commercial Printing Systems

Figure 7:
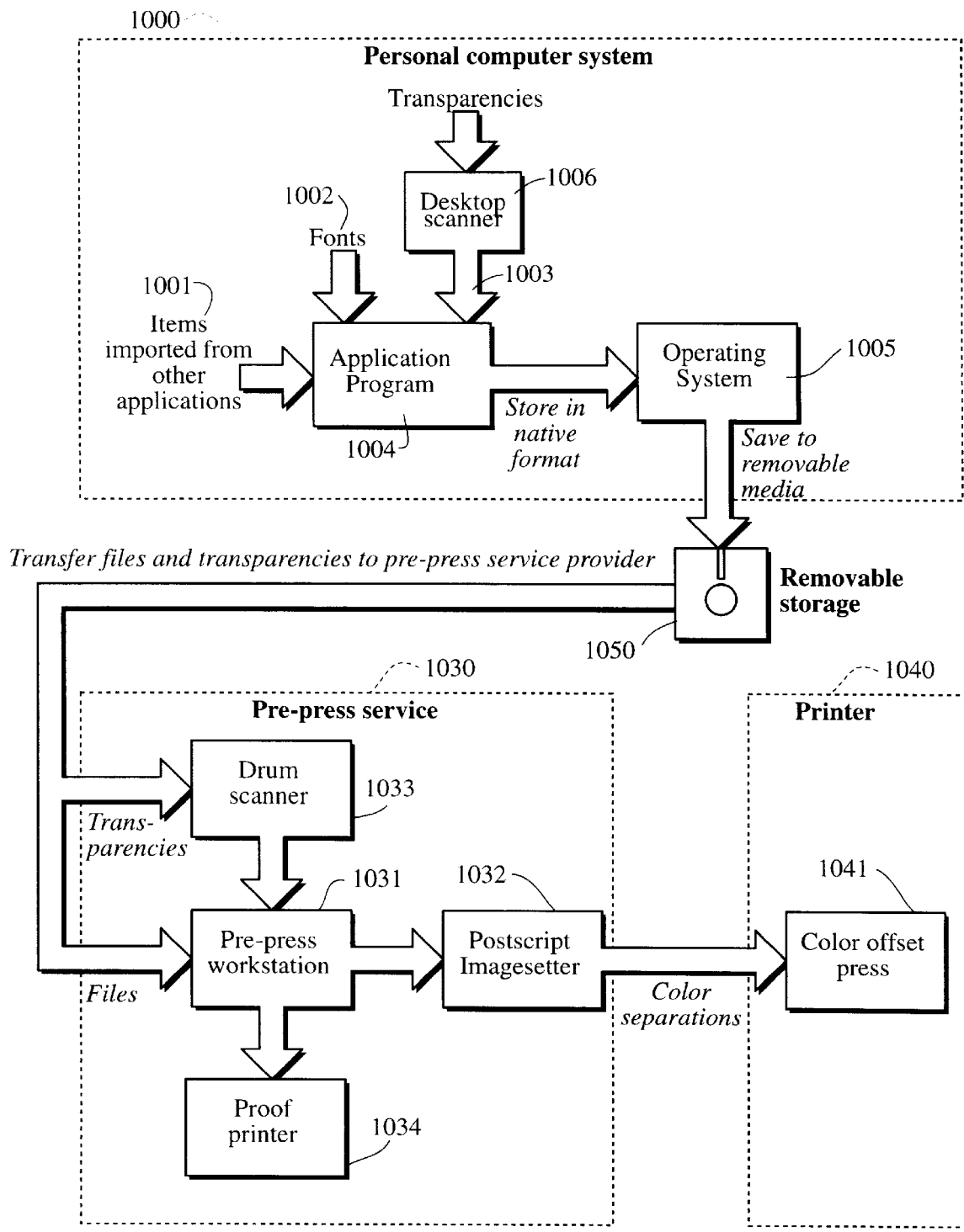
FIG. 7 is a block schematic diagram of a typical current commercial printing system.

FIG. 7 shows a typical commercial printing system in use at the time of writing. Three major components are used, typically at three separate sites. These are the personal computer systems 1000 used for desktop publishing, a prepress service 1030, which converts the electronic page descriptions produced using the personal computer systems 1000 into color separations, and the printer 1040, which makes printing plates using the color separations, and prints the documents typically using an offset press, a color offset press 1041, or, for very high volume printing, a gravure press. FIG. 7 specifically shows the systems typically used for color document printing when between 2,000 and 100,000 copies of each document are required. There are many variations in the specific use of equipment, and FIG. 7 is intended as an approximate guide only.

The information to be printed is usually created by one or more application programs. There are many application programs which may be used to create parts of the final document, such as drawing programs, word processing programs, database programs, spreadsheet programs, CAD programs, image processing programs, and so on. However, the final document is usually composed using a page layout application program 1004, such as Quark 'Express™' or Aldus 'Pagemaker™'. Page layout programs can use items imported from other applications 1001, digital typefaces or fonts 1002, and color images. Due to the memory, disk space and processing power constraints in desktop computers, high resolution photographic images are typically not used directly in the application programs 1004. Instead, low resolution images are used to mark the position that high resolution images are to take in the final document. These low resolution images 1003 may be imported into the application program 1004 using various means, including desktop scanners 1006 used to digitize film transparencies. The document description is normally stored in the native format for the application via the operating system 1005 to a removable storage medium. The removable medium is typically a removable hard disk, an optical disk, or magnetic tape. The document description is usually stored in the native format for the application instead of a page description language to make it easier to make minor changes (such as correcting typographical errors) before the document is printed. The removable media, plus the original transparencies, are then physically taken to the pre-press service company 1030. At the pre-press service company the transparencies are rescanned at high resolution, typically using a drum scanner 1033. The native document description files are converted to Adobe 'Postscript' page description language, and combined with the high resolution scans to produce the final page layout. This page layout may be printed by a digital proof printer 1034 to obtain customer approval to proceed with the print run. When finalized, the page layout in Postscript format is sent to a Postscript imagesetter 1032, which produces a set of color separation films. Normally four color separation films are produced, defining the regions where cyan, magenta, yellow, and black ink are to be printed. The color separation films are usually produced at a resolution between 1,800 dpi and 3,600 dpi (inclusive) and usually use clustered dot ordered dithering as the method of halftoning. The high resolution of the color separations is necessary to prevent color banding when using simple clustered dot ordered dithering. Recently, other halftoning techniques such as variations of error diffusion and dispersed dot ordered dithering have been used to decrease the resolution required of the imagesetter, and eliminate such screening problems as rosettes, Moire, and detail loss in the highlights. Once the color separations are made, a proof sheet is usually made. Once the proof is checked, the color separations are sent to the printer 1040. The printer uses the color separations to make a set of plates for a color offset press 1041. The plates are loaded on the press, and the document is printed.

At present, most high volume full color printing is performed by web fed and sheet fed offset color presses. These machines print color pages using four etched printing plates, one for each of the four color components used in process printing; cyan, magenta, yellow, and black (CMYK). While these machines are highly efficient in printing large volumes of color pages, it is difficult, time consuming, and expensive to change the image being printed. When a new image is to be printed, color separations of the image must be created. Then proof sheets are created, to verify the quality and color of the printed image. These are usually created by a photographic process using the color separations created for the printing press. When the proof sheets are approved, four printing plates must be etched with the color separation images. Offset presses are also large and expensive and required extensive technical knowledge to operate effectively. Many technical parameters, such as dot gain, registration, and screen angles must be carefully controlled to obtain acceptable results. If the print run is greater than 10,000 copies, the set-up costs of the press can be effectively amortized over the volume printed. However, the cost and time required to set up a color press mean that only rarely is fewer than 1,000 copies of a page printed. If fewer than one hundred copies of a page are to be printed, then digital color copiers are generally used.

Digital Color Printers for Commercial and Office Use

There is increasing recognition in the industry of the need for digital color printing systems which are capable of printing high quality color pages directly from computer data, without requiring photographic and platemaking processes. Desirable characteristics of a full color high speed digital printer for commercial and office use are:

1) >60 ppm for office printing, >240 ppm for commercial printing
2) at least 800 dpi print resolution using stochastic screening or error diffusion
3) reduced image noise, for example using CC'MM'YK printing
4) electronic collation and local page storage of at least 1,000 pages
5) automatically prints both sides of the paper (duplex)
6) uses standard PDLs such as Adobe 'Postscript'' and Hewlett-Packard 'PCL 5''
7) ability to customize print runs at the full print speed
8) low capital cost for office printing, low price per page for commercial printing
9) high reliability
10) low maintenance Currently, the cost, size, and maintenance requirements of systems approaching these specifications prohibits their use in the typical office environment. However, a low maintenance digital color printing system using the printing technology disclosed herein, and with specifications similar to those above may achieve considerable commercial success. However, while system cost is not a particularly important consideration for commercial printing, where large offset printing systems can cost as much as $25 million, cost is very important in the office market. To achieve widespread use in the office market, the cost of the printer system is preferably less than US $20,000, with a price of approximately US $10,000 being a highly desirable target.

One of the significant problems in achieving cost targets such as these is the cost of electronic collation. Electronic collation requires the digital storage images of all of the pages in the document. The page images can be stored in a variety of formats, such as full bitmaps, compressed bitmaps, or in a page description language (PDL). Storage of the pages in PDL format has the significant disadvantage that each page must be rasterized each time it is printed. For many pages (especially those containing images or complex graphics) rasterization takes much longer than the one second or so required to print the page. Therefore, storing page images in PDL format for electronic collation will typically make the printer operate at much less than full speed. Storing the page images as uncompressed bitmaps creates problems with storage capacities and data rates. For example, an A4 page at 800 dpi with six bits per pixel (using the CC'MM'YK color model) requires approximately 46 MBytes per page. To print one duplex page per second requires a data rate of approximately 92 MBytes per second. Electronic storage of 1,000 pages requires 46 GBytes of data storage. While both the storage requirements and the data rate are technically achievable, the cost of such equipment using currently available semiconductor memories and disk drives is well in excess of the targeted US $10,000 retail price of the entire printer system.

Electronic collation using compressed, pre rasterized bitmaps can provide a solution to this problem. Desirable characteristics of such a system are:
1) More than 1,000 pages stored in a low cost 1 GByte disk drive
2) Fast compression (comparable to, or less than, the raster image processing time)
3) Compression can operate on a band-by-band basis, so that a full page memory is not required
4) Sustained data rate required from disk of less than 1 MByte per second to allow the use of a single low cost disk drive
5) Real-time expansion of the compressed page images
6) Expansion can operate approximately synchronously to the print engine, so that a full page memory is not required
7) Negligible image quality loss To achieve these specifications, a compression rate of approximately 80:1 must be achieved with negligible image quality loss.

Figure 8:
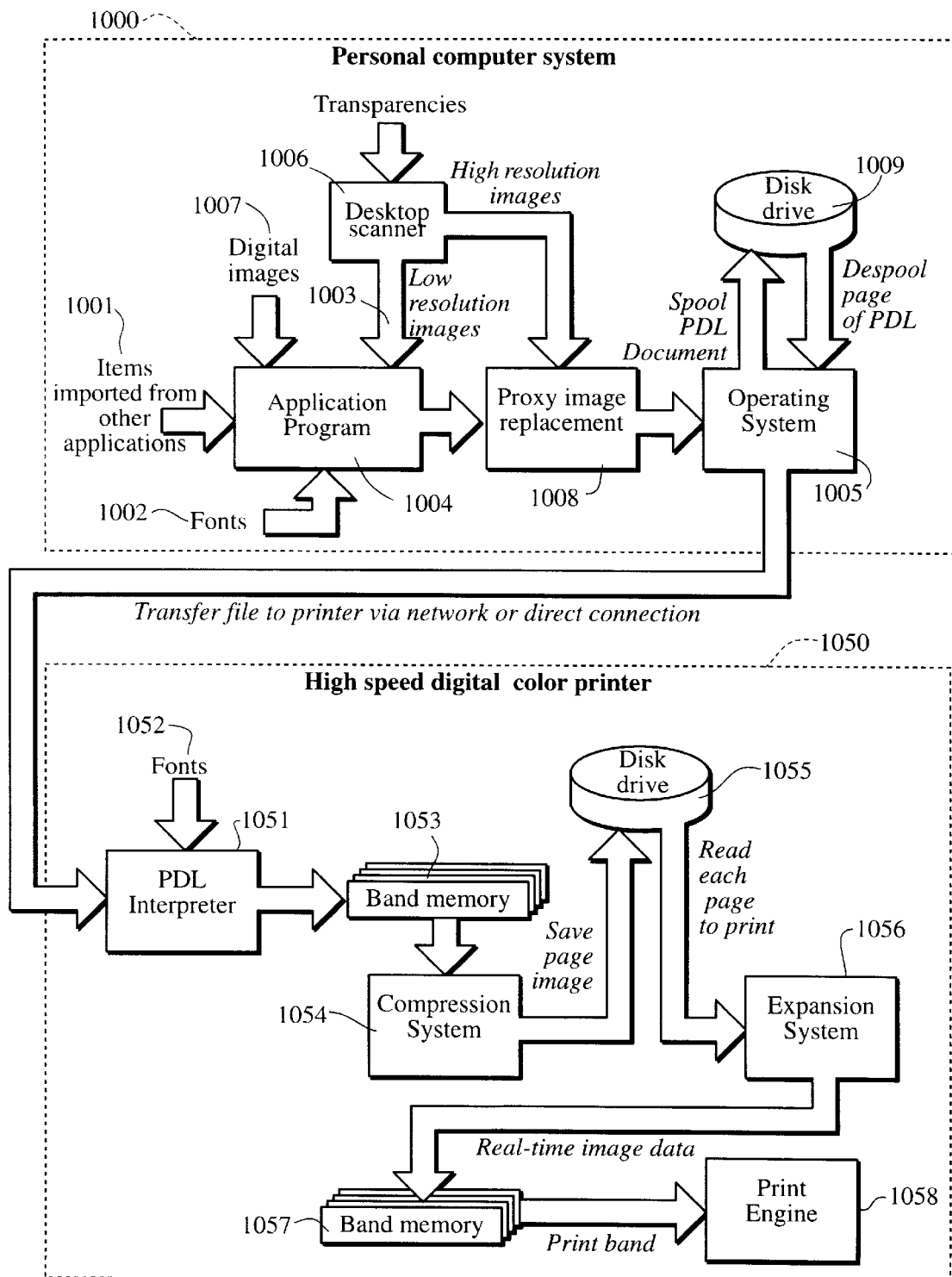
FIG. 8 is a block schematic diagram of a typical office printing system using page image compression for electronic collation and print on demand digital page storage.

FIG. 8 is a schematic block diagram of a digital office color printing system using compressed bitmap electronic collation and page storage. The two major components of the system are a personal computer system 1000 and a high speed digital color printer 1050. The document to be printed is created using application programs 1004, which may incorporate fonts 1002, digital images 1007 from various sources, items imported from other applications 1001, and low resolution images 1003 from a desktop scanner 1006. Application programs are becoming available which can manipulate low resolution images, and then automatically apply the same manipulations to a high resolution version of the same image. The low resolution images are often called proxy images. This type of application is well suited to producing high quality color documents within the limitations of currently available personal computer systems. When the document is to be printed, the page description containing proxy images is combined with the high resolution images in a process of proxy image replacement 1008. The document description may be in the form of a Page Description Language (PDL), which may be spooled by the operating system 1005 onto a disk drive 1009. As the printer 1050 becomes ready to accept each page representation, it is despooled from the disk drive 1009, and transferred to the printer via a network or direct connection. A PDL interpreter 1051 in the printer 1050 rasterizes the page descriptions using fonts 1052. If the PDL has a band rendering capability, then a band memory 1053 can be used instead of a page memory. The use of a band memory has a significant advantage in saving cost, as a full page memory for A4 CC'MM'YK printing at 800 dpi requires 46 MBytes of page memory. For rendering efficiency this would need to be implemented in semiconductor memory. This amount of semiconductor memory is currently expensive relative to the target price of the printer. The use of a band rendering PDL, such as some versions of Postscript™, or Canon 'OpenPage™', can reduce the memory requirement significantly. A 48 line band of an A4 CC'MM'YK page at 800 dpi requires only 240 KBytes of memory. This is a reduction of nearly 200 times the amount of memory required.

It is not necessary for the band rendering operation to proceed in real time, as compressed page images which can be expanded in real time are generated. Therefore, it is practical to use software implementations of the PDL interpreter/RIP process without requiring specific hardware acceleration.

After each band is rendered by the PDL interpreter, it is compressed by the compression system 1054 and saved to the disk drive 1055. After all of the bands in the page have been rendered, the disk drive 1055 contains a complete compressed page image. The page may be printed at this time, but it win often be preferable to rasterize and compress the entire document before printing any pages. This allows full electronic collation, and also ensures that the compressed page image for the reverse side of the page is also ready when printing the front of the page.

When a page is to be printed the compressed page image is read from the disk drive 1055 and expanded in real time by the expansion system 1056. Expanded page image data is stored in a band memory 1057 and printed on the print engine 1058.

Uses of Electronic Collation and Storage

There are two major uses of a high capacity digital page storage facility in a printer. These are electronic collation, and document printing on demand without involving the computer which created the document.

Electronic collation is the printing of pages in an order which is convenient for the user, rather than simple for the computer system. For example, most current desktop systems print documents in uncollated order: if multiple copies of a multi-page document are to be printed, then the print order is typically all copies of the first page, followed by all copies of the second page, and so forth. This requires that the user manually collate the documents after printing. When using electronic collation, each entire document is printed in the correct page order, eliminating the requirement for manual collation.

Print on demand for rarely changing documents is another significant application of a high capacity digital page storage system located in a printer.

It is possible to print single copies of unchanging documents without a digital page storage system, but the process can be complex and time consuming. The user must generally follow a complex procedure such as:

1) Locate the computer that the document is stored on
2) Locate the document on the computer
3) Open the document and the application program which created it
4) Select the 'print' function in the application
5) Wait for the application to translate the document to the PDL
6) Wait for the operating system to spool the document
7) Wait for the operating system to despool each page and send each page to the printer
8) Wait for the printer to rasterize each page
9) Wait for the printer to print each page
10) Walk to the printer
11) Collect the document from the out tray A fifty page full color document printed in this manner would typically take significantly more than an hour, and 'tie up' the computer, significant network bandwidth, and the printer for most of this time.

If the document is stored in a compressed bit-map form as shown in FIG. 8, then the process for printing an unchanged document can be much simpler and faster:

1) Walk to the printer
2) Press a button corresponding to the required document
3) Wait for document to print (approximately 25 seconds at 2 pages per second)
4) Collect the document from the out tray This process will typically take only a few minutes for a fifty page full color document. The required time and convenience is comparable to collecting a pre-printed document from a storeroom. There are major advantages of this system over storing pre-printed documents, including:

1) The elimination of waste resulting from disposal of out of date documents
2) Only those documents which are required are printed
3) A reduction in storage space required
4) Documents can be kept much more up-to-date, and can be changed simply and frequently.

Documents which may typically be stored on the disk drive and printed on demand include those shown in the table "Potential use of page storage":

| Number of documents | Potential use of page storage Description | Pages each | Total |
|---|---|---|---|
| 50 | Product brochures | 8 | 200 |
| 5 | Company and division brochures | 16 | 80 |
| 1 | Corporate newsletter | 16 | 16 |
| 2 | Product catalogues | 50 | 100 |
| 1 | Annual report | 50 | 50 |
| 1 | In-housemagazine | 64 | 64 |
| 50 | Various paper forms | 1 | 50 |
| 50 | Miscellaneous staff notices and posters | 1 | 50 |
| 1 | Collation buffer for current document | 200 | 206 |
| | Total | | 810 |

However, easy and instant access to color documents, combined with a significant cost reduction resulting from the ability to print single copies on demand, is likely to cause a significant proliferation in the types and quantity of color documents published by companies. Because the printing system is fast, longer documents such as user manuals and service manuals for the company's products may also be stored on the disk drive in the printer and printed on demand. It is easy to imagine the requirement for tens of thousands of pages to be stored on the printer. Fortunately, this is easy to achieve by adding disk drive capacity. It is also cost effective, as approximately 1,000 A4 color pages can be stored per GByte of disk storage. This means that the current retail cost of storage is approximately US $0.50 per page. This cost is decreasing rapidly as the cost of disk drive capacity fall.

Compression System for Electronic Collation and Page Storage

The compression scheme described herein is a specific example of page compression, based on certain constants. These constants can easily be parameterized to generalize the compression to be applicable to a wide range of circumstances. The specific constants assumed herein are:

1) Page size is 210 mm×293 mm (A4). This can be parameterized to accommodate different page sizes.
2) Print area: same as page size. This allows full bleed printing, but with no tolerance for paper misalignment. The print area can be parameterized to accommodate non-printing margins, and/or alignment error for full bleed printing.
3) The resolution is 800 dpi in both axes. This can be parameterized to match the printing resolution of the printer. The resolution in the scan direction need not be the same as the resolution in the non-scan direction.
4) The color space used is CMYK. The use of other color spaces such as RGB or device independent color spaces can be accommodated with obvious modifications to the compression scheme.
5) The contone color resolution supported is 266.6 dpi (800 dpi divided by three). This is the maximum color resolution supported by offset printing using a 133 line screen, and is generally considered to be 'magazine quality'. Greater or less color resolution can be supported, though it is convenient if the printer resolution is an integral multiple (in this case, 3) of the contone resolution.

The compression scheme is described in relation to these specific parameters to simplify description and to allow easy comparison with 800 dpi A4 color printing which does not use compression.

Figure 9:
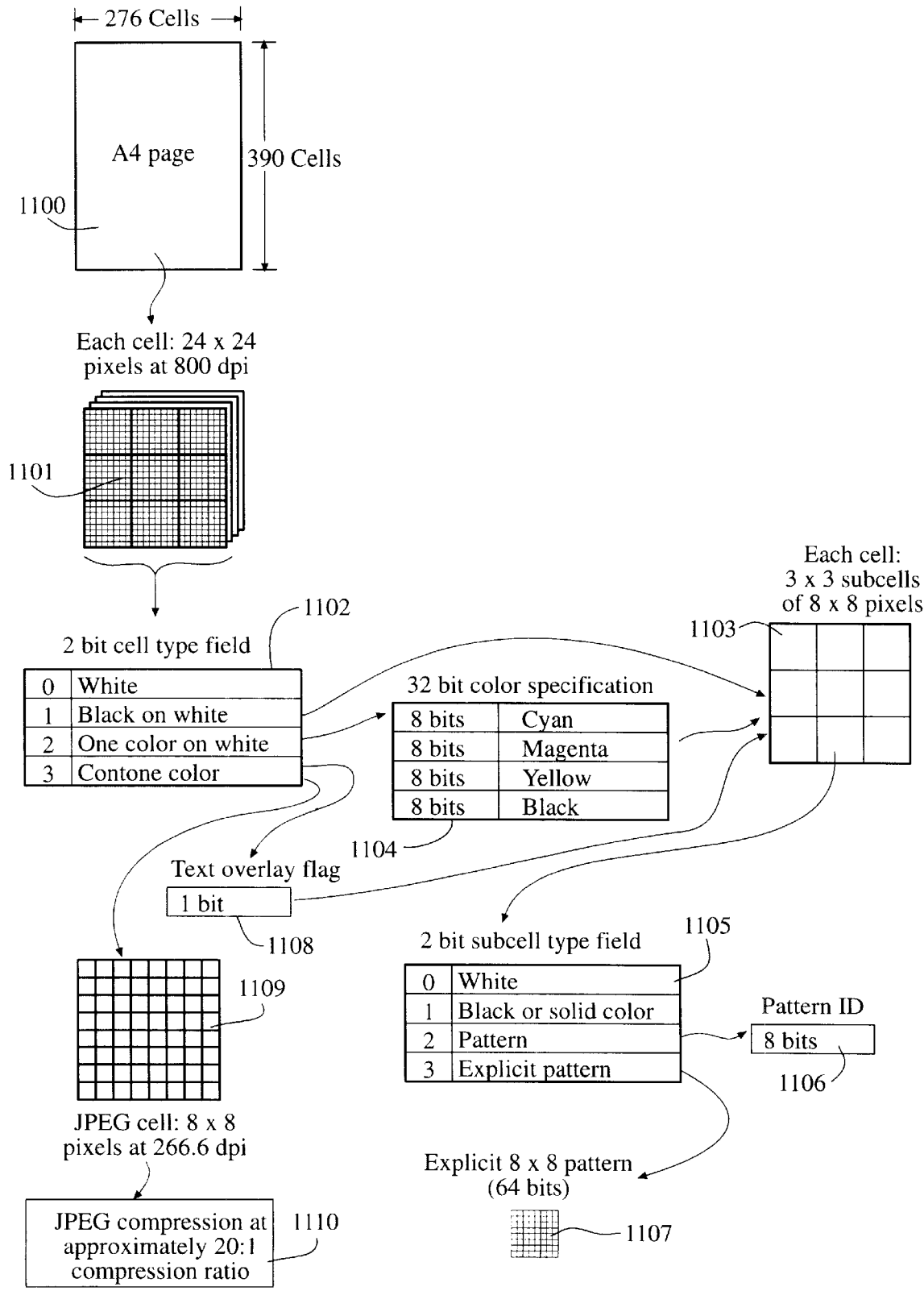
FIG. 9 is a diagram representing the data encoding scheme of the page image compression system.

FIG. 9 shows a data representation of the compression scheme. The A4 page 1100 is divided into a rectangular matrix of 276 cells by 390 cells 1101. Each cell 1101 is an array of 24×24 pixels (576 pixels) at the printer resolution (800 dpi). The size of each cell when printing at 800 dpi is 0.76 mm (0.03"). When fully expanded to a halftoned image, each cell 1101 requires 288 bytes if halftoned to CMYK, or 432 bytes if halftoned to CC'MM'YK.

Each cell 1101 has a two bit cell type field 1102 associated with it. The two bits of a cell type field 1102 define four states of a cell 1101:

1) White: all pixels in the cell 1101 are white. No further information is required. All white cells will occur frequently in borders, whitespace, space between lines, etc. Whitespace is compressed by 1728:1 when using the CC'MM'YK color model.
2) Black on white: all pixels in the cell 1101 are either black or white. The pattern of black and white pixels is defined by further information. This occurs frequently in text.
3) One color on white: all pixels in the cell 1101 are either white or a single other color. The color and pattern of colored pixels is defined by further information. This occurs mainly in colored text, charts, and outline graphics.
4) Contone color: all other conditions of the cell 1101 are considered to be continuous tone (contone) color. Contone color cells are subsampled and JPEG (Joint Photographic Experts Group) compressed. To prevent degradation of the edges of black text over contone images, black pixels are extracted before subsampling and JPEG compression, and are processed in a similar way to black on white cells. When the page image is expanded, the expanded black image is superimposed on the expanded JPEG contone image. The contone images are JPEG compressed at a compression ratio of approximately 20:1. When 266 dpi contone images are expanded after JPEG compression at a 20:1 compression ratio, image degradation is usually not noticeable.

The cell type field 1102 can be a rectangular array of two bit values, which may be packed into bytes or words. A simple array data structure simplifies the design of hardware which may be required in some applications to achieve real-time expansion of the compressed page images.

Cells 1101 in which the cell type field 1102 is 'black and white' are divided into a 3×3 array of 8 pixel×8 pixel subcells 1103. Each subcell 1103 has a two bit subcell type field 1105. The two bits of a subcell type field 1105 define four states of a subcell 1103:

1) White: all pixels in the subcell 1103 are white. No further information is required. All white cells will occur frequently in borders, whitespace, space between lines, etc. The lossless compression ratio for this data type is 173:1 for the CC'MM'YK color model.
2) Black or solid color: all pixels in the subcell 1103 are black. No further information is required. This occurs frequently inside the strokes of text characters. The width of the strokes of even body text (typically 10 point) is usually large enough to contain subcells which are all black. The lossless compression ratio for this data type is 173:1 for the CC'MM'YK color model.
3) Pattern: this occurs if the pattern of black pixels in a subcell is one of the common patterns shown in FIG. 10. The pattern is identified by an 8 bit pattern ID 1106, allowing up to 256 common patterns. The lossless compression ratio for this data type is 37.5:1 for the CC'MM'YK color model.
4) Explicit pattern: this is the degenerate case which occurs if the pixel pattern is not one of the common cases. The pattern of selected drops in the subcell is directly specified by an 8×8 bitmap 1107, requiring 64 bits. The lossless compression ratio for this data type is 5.8:1 for the CC'MM'YK color model.

Cells 1101 in which the cell type field 1102 is 'one color on white' have a color specification 1104 of the one color (the selected color) associated with them. The color specification 1104 is preferably in the same color space as the remainder of the image, as may be expressed using 8 bits per color component, for a total of 32 bits if the color space is CMYK, or 24 bits if the color space is RGB. The cells are also divided into a 3×3 array of 8 pixel×8 pixel subcells 1103. Each subcell 1103 has a two bit subcell type field 1105. The two bits of a subcell type field 1105 define four states of a subcell 1103:

1) White: all pixels in the subcell 1103 are white. No further information is required. These subcells will principally occur around and within colored text. The lossless compression ratio for this data type is 66.5:1 for the CC'MM'YK color model.
2) Black or solid color: all pixels in the subcell 1103 are the selected color. No further information is required. This occurs frequently inside the strokes of colored text characters. The lossless compression ratio for this data type is 66.5:1 for the CC'MM'YK color model.
3) Pattern: this occurs if the pattern of selected color in a subcell is one of the common patterns shown in FIG. 10. The pattern is identified by an 8 bit pattern ID 1106, allowing up to 256 common patterns. The lossless compression ratio for this data type is 27.9:1 for the CC'MM'YK color model.
4) Explicit pattern: this is the degenerate case which occurs if the pixel pattern is not one of the common cases. The pattern of selected drops in the subcell is directly specified by an 8×8 bitmap 1107, requiring 64 bits. The lossless compression ratio for this data type is 5.5:1 for the CC'MM'YK color model.

Cells 1101 in which the cell type field 1102 is 'contone color' are further divided into two categories: those cells 1101 which contain black and those cells 1101 which do not contain black. The black component is compressed losslessly, and the color component is reduced to a lower resolution and JPEG compressed. The reason for this is to preserve the readability of black text on colored or photographic backgrounds. Only black text is treated in this manner, as the use of colored text on colored background is rarely used, and when it is used, the text is usually in large point sizes. This aspect of the compression scheme matches expectations which derive from viewing color offset printed material, which reproduces black text on colored backgrounds well. Small point size colored text is typically not used in offset printing because it will usually be screened, and become difficult to read due to screening artifacts.

All pixels in the cell 1101 which are black are marked in a 24×24 bitmap. This bitmap is then compressed in the same manner as cells 1101 where the cell type field is 'black on white'. The black pixels in the cell 1101 are then replaced with a color which is representative of the color which that pixel would be if it were not covered with black text. The method of determining this color is not especially important. For example, it may be the average color of all non-black pixels in the cell, or it may be the color of the nearest non-black pixel found when following a search pattern, or it may be the average of the colors of neighboring non-black pixels, weighted by the inverse of the distance between the black pixel and the particular non-black pixel. The reason for replacing black pixels with a color which is closer to non-black colors in the cell is to reduce 'mosquito noise' that occurs when JPEG compressing high frequency patterns with a high luminance or chrominance difference. This mosquito noise affects the colors of other pixels in the cell. The exact choice of color is not important, as it is replaced with black when the cell is expanded. After black pixels have been replaced, the cell 1101 is reduced to a resolution of 266.6 dpi. This can be achieved decimating the cell by a factor of 3 (selecting every third pixel in every third row). However, a simple decimation can lead to aliasing artifacts. It is preferable to make the color of each pixel of the 8×8 JPEG cell 1109 equal to the average color of each corresponding 3×3 square of pixels in the 24×24 pixel cell 1101. For slightly higher image quality, the cell 1101 can be low-pass filtered before decimation. However, the very small improvement in image quality afforded by low pass filtering over simple averaging is unlikely to warrant the significant additional computational expense. JPEG (Joint Photographic Experts Group) encoding of the JPEG cell 1109 is chosen over other contone image compression methods such as fractal or wavelet compression due to its good image quality at moderate compression ratios, international standardization, symmetry in encoding and decoding, well defined operation on separate square blocks, and availability of high speed JPEG compression and expansion chips, which are useful in ensuring that expansion of page images can occur in real-time for high speed printing systems. JPEG compression of 20:1 at 266.6 dpi results in a lossy compression ratio of 42:1 over a CC'MM'YK bitmap, and a compression ratio of 225:1 over a contone image at 800 dpi. This is achieved with an image degradation which is usually not visible to the naked eye as the image quality benefits considerably from the removal of black text before compression.

Figure 10A:
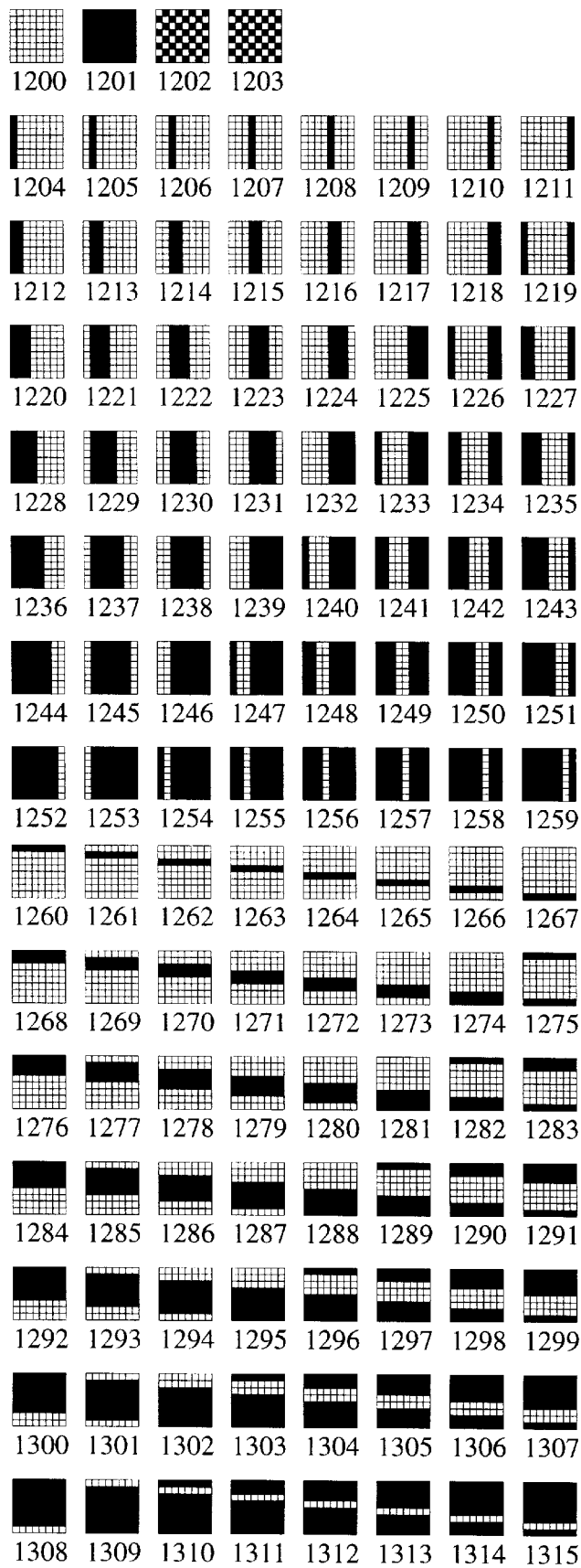
FIGS. 10(a) and 10(b) are an example set of patterns to which subcells may be matched for encoding.
Figure 10B:
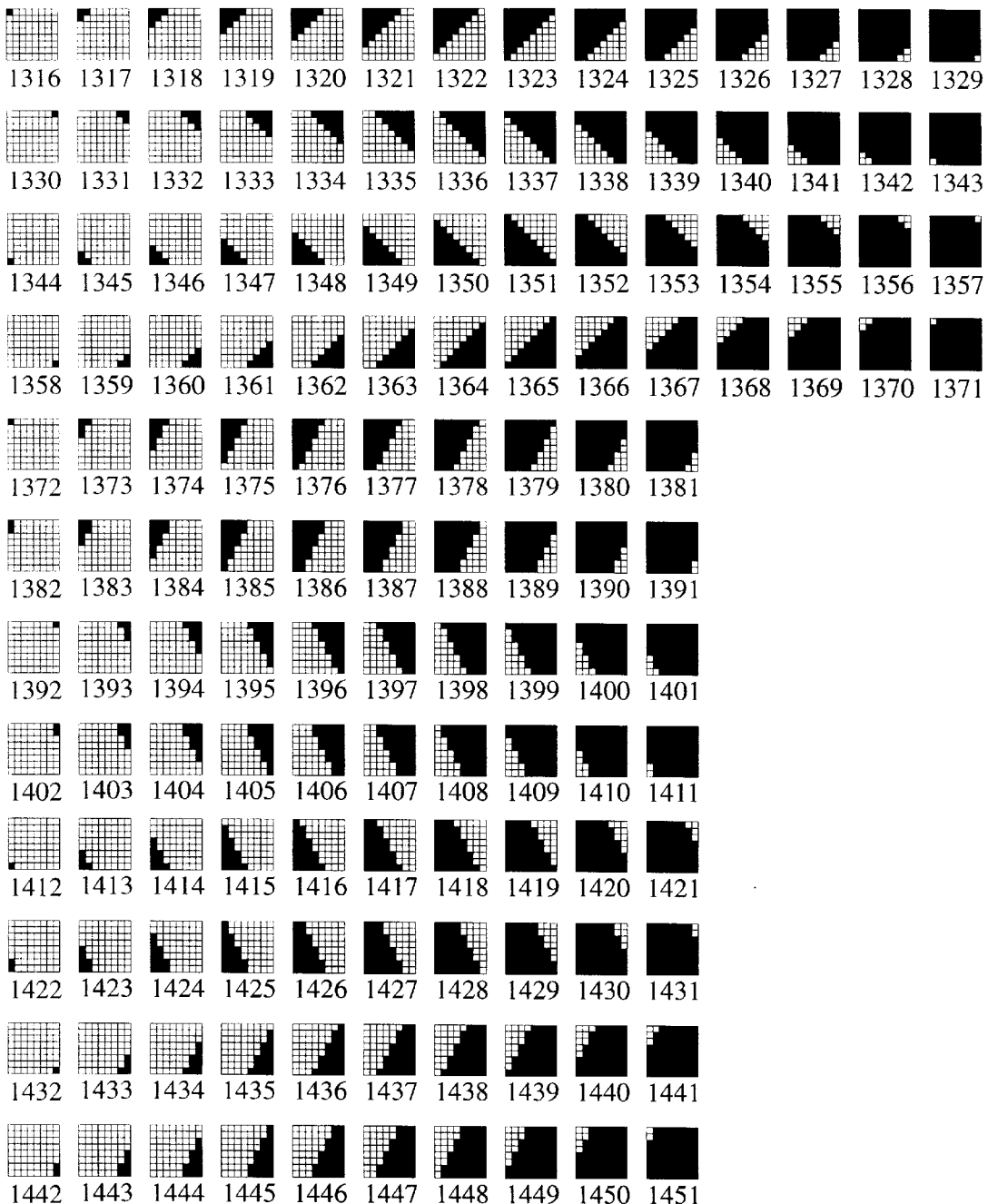

FIG. 10 shows a set of common patterns that may be encoded by the pattern ID 1106. An 8×8 pattern of bi-level pixels has $2^{64}=1.84\times10^{19}$ possible states. The use of pure frequency encoding is impractical, as the table would need to contain all of these states. In this scheme, pure black or white patterns encode to two bits, a set of up to 256 common patterns encodes to 10 bits, and all other patterns encode to 66 bits. In preference to the using the theoretical maximum compression which can be obtained using frequency encoding, an easily implemented system where the encoding can be defined by simple algorithms without requiring time consuming table comparisons and large tables is chosen.

At 800 dpi, each 8×8 pattern of pixels represents an area of only a quarter of a millimeter squared (0.01"×0.01"). Each character of text in 10 point Times font at normal line spacing covers an average area equal to approximately 100 of these patterns.

Pattern 1200 is white, and is encoded in two bits as the white state of the subcell field type. Pattern 1201 occurs when each pixel is the selected color or black.

Patterns 1202 and 1203 are two patterns which may occur when a 50% density is represented. Some programs produce this representation instead of specifying a 50% tone. Patterns 1204 to 1259 are all of the patterns produced by a vertical stripe of any width in either the selected color or white. The main occurrence of these patterns is on the vertical edges of text characters. Patterns 1260 to 1315 are all of the patterns produced by a horizontal stripe of any width in either the selected color or white. The main occurrence of these patterns is on the horizontal edges of text characters. Patterns 1316 to 1371 are patterns resulting from a diagonal division between the selected color and white. Patterns 1372 to 1451 are patterns resulting from a division between the selected color and white which occurs at a slope of 2. High compression ratios for text can be achieved by allowing small variations from the patterns shown in FIG. 10 to be encoded to those patterns. This reduces the incidence of the 'Explicit Pattern' subcell type, which has a low compression ratio. Variations of a few pixels on the black to white edges of the patterns will normally not be detected with the naked eye when printed at 800 dpi.

There are fourteen different combinations of cell types 1102, subcell types 1105 and text overlay flags 1108 which result in different 'encoding types'.

'Typical' Compression Ratios

The table "Compression ratio for a 'typical' page by encoding type" shows compression ratios for the different encoding types supported by this compression scheme. Also shown is the average portion of a page which may be expected to be compressed to each encoding type. The average portion of a page for each encoding type will vary based upon the type of documents that are printed. The portions shown in the 'Average portion of page' column of the table are derived from measurements of a number of full color monthly magazines, where each page is printed using a four color process. In these magazines, there is no additional cost in the inclusion of more color area on a page. It is assumed that when there is no penalty (in either printing cost or time) for printing in color that the amount of color used in office publications will eventually approach the use of color in full color magazines.

Compression ratio for a 'typical' page by encoding type

| Cell Type | Subcell Type | Average portion of page | Bytes per page | Compression ratio versus CC'MM'YK bitmap | Compression ratio versus CMYK contone |
|---|---|---|---|---|---|
| White | — | 0% | 10,764 | 1,728 | 9,216 |
| Black on white | White | 18% | 48,438 | 172.8 | 921.6 |
| Black on white | Black | 9% | 24,219 | 172.8 | 921.6 |
| Black on white | Pattern | 2.4% | 29,769 | 37.6 | 200.3 |
| Black on white | Explicit | 0.6% | 48,115 | 5.8 | 30.9 |
| Color on white | White | 1.2% | 8,396 | 66.5 | 354.5 |
| Color on white | Black | 0.6% | 4,198 | 66.5 | 354.5 |
| Color on white | Pattern | 0.16% | 2,669 | 27.9 | 148.6 |
| Color on white | Explicit | 0.04% | 3,380 | 5.5 | 29.4 |
| Contone |  | 25% | 275,828 | 42.1 | 224.8 |
| Contone & Text | White | 1.8% | 24,219 | 34.6 | 184.3 |
| Contone & Text | Black | 0.9% | 12,110 | 34.6 | 184.3 |
| Contone & Text | Pattern | 0.24% | 5,554 | 20.1 | 107.2 |
| Contone & Text | Explicit | 0.06% | 5,457 | 5.1 | 27.3 |
| Total |  | 100% | 503,056 | 92.4 | 493 |

The average compression ratio for a 'typical' page is 92.4:1 compared to a CC'MM'YK full bleed 800 dpi bitmap, and 493:1 compared to a CMYK full bleed 800 dpi contone image. This allows the typical page to be stored in approximately 500 KBytes, allowing storage of well over 1,000 pages on a low cost 1 GByte disk drive. The sustained data rate required from disk is approximately 1 MByte/second for a print speed of 120 ppm (one two sided A4 page per second). This can be achieved using low cost SCSI disk drives. The maximum commonly encountered data rate will be for full page contone images. These will compress to approximately 1.1 MBytes each. To maintain 120 ppm print speed when full bleed color pages are encountered, the disk drive would preferably be able to sustain a data rate in excess of 2.2 MBytes per second. This is especially relevant for web fed printers. For sheet fed printers, a pause of one second or so when full color pages are encountered will often be acceptable.

Compression Encoding Algorithm

It is preferable that the image to be compressed is in the form of a 32 bit per pixel CMYK contone image. Other forms are possible, such as an RGB contone image, images in different color spaces, and images with different color resolution. It is also preferable that the page to be printed be created in bands that are 24 lines wide so that an entire contone page memory is not required. An A4 full bleed 800 dpi 32 bit per pixel contone page memory would require 247 MBytes of memory. A 24 line band of such an image requires 635 KBytes of memory. If the compression process can proceed simultaneously (or as a separate thread) then it is preferable to double-buffer the bands, so that two band buffers are required, for a total of 1.27 MBytes.

The following is an algorithm in pseudocode for encoding to the compression scheme disclosed herein:

```
Define Band_width = 276
Define Page_length = 390
Define Cell = 24 x 24 array of 32 bit CMYK colors
Define Bitmap_cell = 24 x 24 array of Booleans
Define JPEG_Cell = 8 x 8 array of CMYK colors
Define Other_color = 32 bit CMYK color specification
Define White_cell = 2 bit binary 00
Define Black_and_white_cell = 2 bit binary 01
Define Color_and_white_cell = 2 bit binary 10
Define Contone_cell = 2 bit binary 11
Define False = 1 bit binary 0
Define True = 1 bit binary 1
Clear Compressed_data
Clear JPEG_compressed_data
Append Band_width to Compressed_data
Append Page_length to Compressed_data
For Band = 0 to Page_length - 1
  Calculate Band
(The calculation of the Band is performed by the prior art PDL
interpreter or other raster image processor system)
  For Cell_in_band = 0 to Band_width - 1
    Set Other_color = color of first non white pixel in cell
    Case
      All pixels in Cell are white
        Append white_cell to Compressed_data
      All pixels in Cell are either white or black
        Append Black_and_white_cell to Compressed_data
        For (x,y) = (0,0) to (23,23)
          If Cell(x,y) = black
            Set Bitmap_cell(x,y) = true
          Else
            Set Bitmap_cell(x,y) = false
          Endif
        Next (x,y)
        Call subroutine Bitmap_encode[Bitmap_cell, Compressed_data]
      All pixels in Cell are either white or Other_color
        Append Color_and_white_cell to Compressed_data
        Append Other_color to Compressed_data
        For (x,y) = (0,0) to (23,23)
          If Cell(x,y) = Other_color
            Set Bitmap_cell(x,y) = true
          Else
            Set Bitmap_cell(x,y) = false
          Endif
        Next (x,y)
        Call subroutine Bitmap_encode[Bitmap_cell, Compressed_data]
      Else
        Append Contone_cell to Compressed_data
        If any pixels in Cell are black
          Append True to Compressed_data
          For (x,y) = (0,0) to (23,23)
            If Cell(x,y) = black
              Set Bitmap_cell(x,y) = True
              Set Cell(x,y) = first non-black color found when
              searching a path spiraling outwards from Cell(x,y)
            Else
              Set Bitmap_cell(x,y) = False
            Endif
          Next (x,y)
          Call subroutine Bitmap_encode [Bitmap_cell,
            Compressed_data]
        Else
          Append False to Compressed_data
```

```
        Endif
        For (n,m) = (0,0) to (7,7)
            Set JPEG_cell (n,m) =
                Average color of Cell(3n,3m) to Cell(3n+2,3m+2)
        Next (n,m)
        JPEG encode[JPEG_cell,JPEC_encoded_output]
            (JPEG encoding subroutines are prior art and avaiable in the public
            domain and are therefore omitted from this specification. The 8 × 8 block
            of CMYK pixels can be JPEG compressed in CMYK format or can be
            converted to an 8 × 8 block of RGB or CMY pixels. Such conversion is
            assumed in the calculation of compression ratios. The JPEG encoded data
            is placed in a separate compressed data stream.)
            Append JPEG_encoded_output to JPEG_compressed_data
        End Case
    Next Cell_in_band
Next Band
End
Subroutine Bitmap_encode[Bitmap_cell, Compressed_data]
Define Number_of_patterns = 250
Define White_subcell = 2 bit binary 00
Define Black_subcell = 2 bit binary 01
Define Pattern_subcell = 2 bit binary 10
Define Explicit_subcell = 2 bit binary 11
Define Subcell_pattern = an set of 8 × 8 bitmap patterns
    (an example set of patterns is shown in FIG. 10)
Define Pattern_number as a byte
For (n,m) = (0,0) to (2,2)
    For (x,y) = (0,0) to (7,7)
        Set Subcell(x,y) = Bitmap_Cell(n*8+x,m*8+y)
    Next (x,y)
    Case
        All elements in Subcell are false
            Append White_subcell to Compressed_data
        All elements in Subcell are true
            Append Black_subcell to Compressed_data
        Subcell matches Subcell_pattern(Pattern_nuinber), a specific
member
            of the set of Subcell patterns
                (There are many efficient methods of coding this comparison which rely
                upon coherence in the set of patterns which are obvious to skilled
                programmers. A direct comparison of all patterns is very inefficient and is
                not recommended. The pattern match preferably allows a tolerance of
                mismatched elements, such as a maximum of three pixel 'errors' which
                must be contiguous to elements of the same sense in the reference pattern.
                The use of a tolerance on the match allows more matches and therefore
                greater compression ratios.)
            Append pattern_subcell to compressed_data
            Append pattern_number to compressed_data
        Else
            Append Explicit_subcell to Compressed_data
            Append Subcell to compressed_data
    End Case
Next (n,m)
Return
```

The output of the algorithm is two sets of compressed data: Compressed_data and JPEG_compressed_data. The two data sets are separate to allow the use of existing JPEG hardware codecs.

The compression algorithm does not need to operate in real-time (that is, synchronously to page printing). In most systems it will be preferable to implement the compression algorithm in software. Details of the software implementation will depend upon the computer language chosen. The structure of the algorithm can be changed for efficient operation in the chosen computer language.

Where tests for a specific color occur (such as black, white, or any specific other color) it is preferable to allow a small range (for example ±3 least significant bits) around the color value to be interpreted as exactly the required color. This is required so that rounding errors in the raster image processor, PDL interpreter, or image creation software do not result in a reduced page compression ratio.

Other features can be added to this compression scheme, such as error detection and correction capabilities, line synchronization codes, and so forth without departing from the scope of the invention.

Expansion Algorithm

The following is an algorithm in pseudocode for decoding the compression scheme disclosed herein:

```
Define Cell_type = 2 bit binary number
Define Text_overlay_flag = 1 bit Boolean
    (other definitions as per compression algorithm)
Input Band_width from Compressed_data
```

-continued

```
Input Page_length from Compressed_data
For Band = 0 to Page_length - 1
    For Cell_in_band = 0 to Band_width - 1
        Input Cell_type from Compressed_data
        Case
            Cell_type = White_cell
                Set all pixels in Cell to white
            Cell_type = Black_and_white_cell
                Call subroutine Bitmap_decode[Compressed_data, Bitmap_cell]
                For (x,y) = (0,0) to (23,23)
                    If Bitmap_cell(x,y) = True
                        Set Cell(x,y) = black
                    Else
                        Set Cell(x,y) = white
                    Endif
                Next (x,y)
            Cell_type = Color_and_white_cell
                Input Other_color from Compressed_data
                Call subroutine Bitmap_decode[Compressed_data, Bitmap_cell]
                For (x,y) = (0,0) to (23,23)
                    If Bitmap_cell(x,y) = True
                        Set Cell(x,y) = Other_color
                    Else
                        Set Cell(x,y) = white
                    Endif
                Next (x,y)
            Else
                Input JPEG_encoded_data from JPEG_compressed_data
                    (If a JPEG decoding chip isused, the data will typically be input from
                        the JPEG_compressed_data stream by the JPEG chip)
                JPEG decode [JPEG_encoded_data, JPEG_cell]
                    (JPEG decoding subroutines are prior art and available in the public
                        domain and are therefore omitted from this specification. JPEG
                        expansion hardware devices such as C-Cube CL550 and other chips
                        may be used for high performance systems)
                For (n,m) = (0,0) to (7,7)
                    For (i,j) = (0,0) to (2,2)
                        Set Cell(3n+i,3m+j) = JPEG_cell (n,m)
                    Next (i,j)
                Next (n,m)
                Input Text_overlay_flag from Compressed_data
                If Text_overlay_flag = True
                    Call subroutine Bitmap_decode[Compressed_data,
                        Bitmap_cell]
                    For (x,y) = (0,0) to (23,23)
                        If Bitmap_cell(x,y) = True
                            Set Cell(x,y) = black
                        Endif
                    Next (x,y)
                Endif
        End Case
        Halftone the Cell
            (The halftoning of the Band is preferably performed using a dispersed dot
                ordered dither without perceptible repeating patterns and with good
                distribution of the cell 'energy' to high frequencies. A halftone cell size of 64 ×
                64 is adequate for most purposes. The cyan, magenta, yellow and black
                components of the image can be halftoned using the same halftoning cell.
                The halftone cell can be generated using stochastic algorithms such as
                Hewlett-Packard's 'Void and Cluster' algorithm, or via simulated annealing
                as disclosed in A method for calculating high quality dither matrices using
                simulated annealing is disclosed in a patent application: Silverbrook and
                Naylor PCT AU/94 00515. In high performance systems, the halftoning
                function will typically be performed by hardware)
    Next Cell_in_band
    Print the halftoned band
        (In high speed printing systems and other systems where the print engine
            cannot be stopped part way through a page the halftoned band is printed by
            hardware at the same time that the next band is being calculated.)
Next Band
End
Subroutine Bitmap_decode[Compressed_data, Bitmap_cell]
Define Subcell_type = 2 bit binary number
Define Text_overlay_flag = 1 bit Boolean
    (other definitions as per compression algorithm)
For (n,m) = (0,0) to (2,2)
    Input Subcell_type from compressed_data
    Case
        Subcell_type = white_subcell
            Set all elements of Subcell to False
        Subcell_type = Black_subcell
```

```
      Set all elements of Subcell to True
   Subcell_type = pattern_subcell
      Input pattern_number from compressed_data
      Set Subcell = Subcell_pattern(Pattern_number)
   Else
      Input Subcell from compressed_data
   End Case
   For (x,y) = (0,0) to (7,7)
      Set Bitmap_Cell(n*8+x,m*8+y) = Subcell(x,y)
   Next (x,y)
Next (n,m)
Return
```

Real-Time Expansion System for High Speed Color Printing

In high speed printing systems, it will often be desirable to ensure that the expansion algorithm operates in real-time. For a printer able to print 120 A4 800 dpi CC'MM'YK ppm, a processing capability of at least 8,000 RISC MIPs is required to ensure real-time expansion. This level of performance is beyond that available in any currently available processor chip. Parallel arrays of high speed processors can be used, as the most compute intensive parts of the expansion algorithm can be parallelized. For example, a multi-processor system incorporating four Texas Instruments TMS320C80 Multimedia Video Processors (MVPs) may have adequate processing power to perform the expansion and halftoning in real time, if the software is efficiently coded and the algorithm is modified to suit the architecture of the MVP. The UltraSparc processor from Sun Microsystems may also be sufficient when used in a multiprocessor cluster of four processors. The disadvantage of a multiprocessing system using arrays of general purpose processors is high cost. At present, it is not economically viable to produce a 120 ppm real-time expansion system using general purpose processors if the printer is to have a retail price of under $10,000.

Low cost real-time operation can be achieved with the combination of a general purpose processor, a special purpose processor such as a JPEG expansion chip, and an application specific integrated circuit (ASIC) for compressed bitmap expansion, contone pixel replication, bitmap and contone pixel combining, and halftoning.

To minimize design costs, the ASICs required should be able to be fabricated using commonly available gate array or standard cell processes, and preferably operate with a clock speed lower than 70 MHz.

Figure 11:
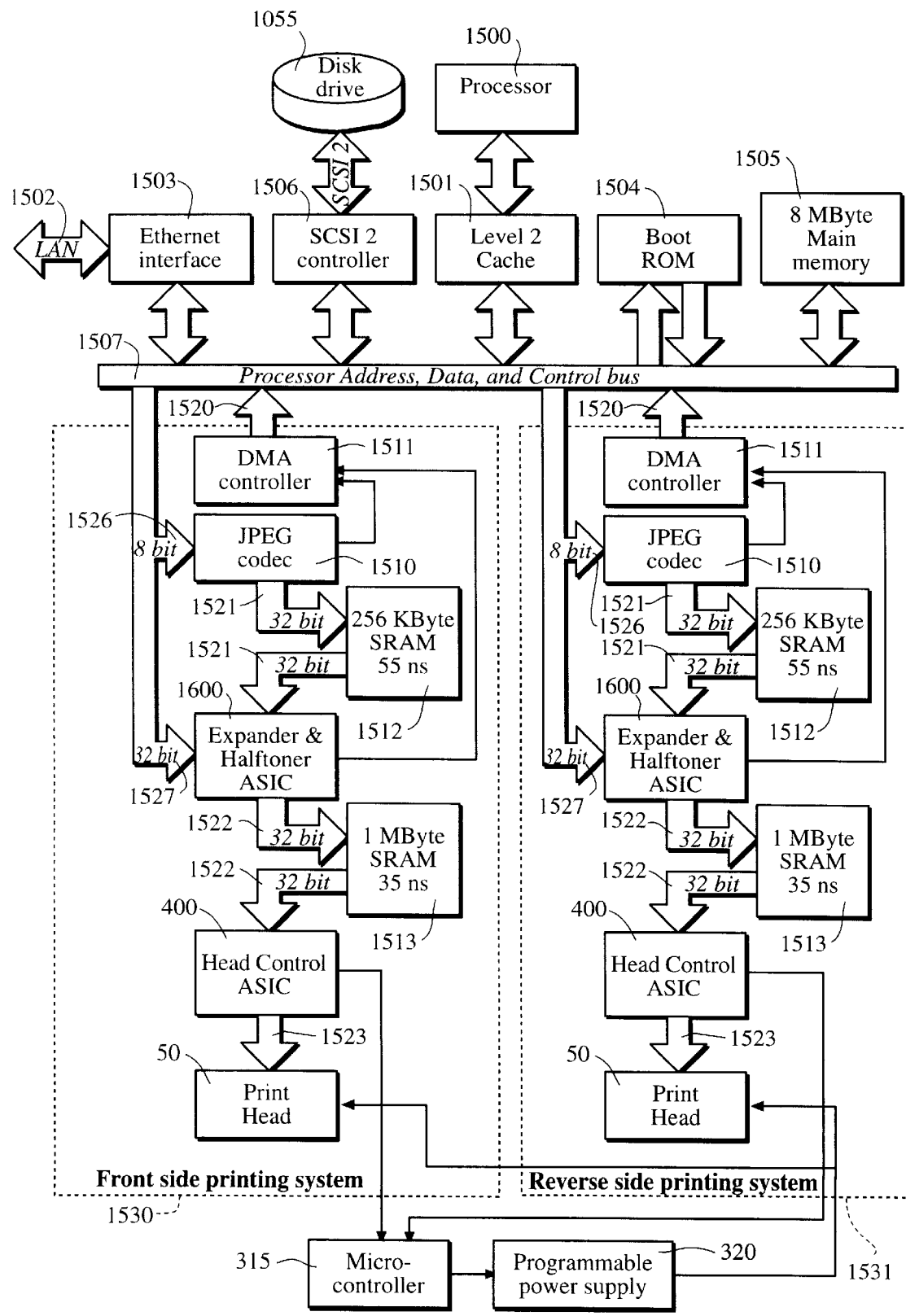
FIG. 11 is a block schematic diagram of a real-time page image expansion system for high speed color printing.

FIG. 11 is a block schematic diagram for a controller system for a high speed color printer with a compressed document store, which can simultaneously expand two compressed page images for real time duplex printing. The processor 1500 is preferably a 32 bit or 64 bit processor with a performance in excess of 100 RISC MIPS. Many choices of such processors are currently available, including IBM and Motorola PowerPC™ devices, MIPS R4000™ series devices, DEC Alpha™ series devices, Intel Pentium™, Hewlett-Packard PA-RISC™ devices, and Sun Microsystems Sparc™ devices. The processor is not required to perform the expansion algorithm, as this requires high speed real-time operations. However, the processor performs most of the compression algorithm, PDL interpreting, raster image processing (RIPping), operating system functions, and miscellaneous control functions. Although these operations are generally not required to occur in real-time, users of a high speed color printing system would likely expect that they occur quickly. The processor 1500 is connected to the processor address, data, and control buses 1507 via an optional second level cache 1501. When the processor is initialized, it obtains its instructions from a boot ROM 1504. For flexibility, the main programs are preferably stored on the disk drive 1055. Also stored on the disk drive 1055 are the compressed page images for printing, and data used by the PDL, such as outline fonts. To be able to supply more than 1,000 compressed page images for real-time printing, the disk drive 1055 should preferably have a capacity of 1 GByte or more, and a sustained data access rate of 2 MBytes per second. Adequate data rate connections to the processor bus 1507 can be provided using SCSI 2 interface standard, with a SCSI 2 controller 1506. Other disk drive interfaces such as IPI can also be used. The printer system may be connected to an Ethernet network 1502 via an Ethernet interface 1503. Other interfaces, such as serial, parallel, other LAN formats, or external SCSI interfaces may be provided. The printer system has a main memory 1505. The main memory 1505 stores the programs for the processor 1500, fonts cache, compressed data cache from disk, JPEG compressed data, page descriptions in the PDL, rendering bands, and other data. The amount of memory required depends upon the choice of PDL, size of disk and font caches, operating system, processor, and other factors. Eight MBytes of DRAM will be adequate for the main memory 1505 in many circumstances.

Two sets of expansion hardware are provided. This is the front side printing system 1530 and the reverse side printing system 1531. A single system with twice the processing capability and twice the memory capacity could be provided instead of a separate system for the front and back sides of a sheet. However, there is little cost advantage in providing a single system, and it has the disadvantage of increased design costs and reduced flexibility. It is desirable that the compressed pages can be printed in any order. To facilitate this, the compressed page data should be separate for each page. Having a separate printing system for each page that is to be printed simultaneously avoids problems with switching the context of the JPEG data stream for each band of the two page set from the JPEG compressed image of one page to that of the other page.

In each set of expansion hardware a JPEG codec 1510 (such as the C-Cube CL550 or other devices manufactured by LSI Logic and other companies) is provided with a JPEG compressed data stream on bus connection 1526. The maximum average data rate on this connection is 1.5 MBytes per second, so an eight bit bus multiplexed from the processor data bus 1507 is adequate. The address for the JPEG compressed data is generated by DMA controller 1511, and placed on the processor bus 1507 via address bus 1520. Contone pixel data generated by the JPEG Codec 1510 is buffered in a contone buffer memory 1512, which contains up to two bands (16 lines) of CMYK pixel data at 266.6 dpi. The memory 1512 may be composed of two 64K×16 SRAMs such as Hitachi HM621664. The maximum data rate writing to the contone buffer memory 1512 on the bus 1521 is 27 MBytes per second. Data must also be read out of the contone buffer memory 1512 at 27 MBytes per second to provide contone pixel information for the expander and halftoner ASIC 1600. Thus the total data rate on the bus 1521 is 54 MBytes per second. An interleaved 32 bit bus operating at 74 ns (or less) cycle times which alternates access cycles between the JPEG codec 1510 and the expander and halftoner ASIC 1600 is suitable. The expander and halftoner ASIC 1600 replicates each 266.6 dpi pixel from the JPEG codec 1510 to form a 3×3 array of 800 dpi pixels. The compressed data stream is acquired via the bus 1527 and expanded to form bitmaps of cells 1101 by circuitry within the expander and halftoner ASIC 1600. The bitmaps of cells 1101 are combined with the pixel replicated contone image data to form reconstructed 800 dpi image data. The reconstructed 800 dpi image data is then halftoned, also within the expander and halftoner ASIC 1600. The halftoned data is stored to the halftone band memory 1513 as CC'MM'YK bi-level data. Other color models such as CMYK or CMY may be used, though CC'MM'YK gives superior image quality. The amount of memory required for the halftone band memory 1513 depends upon the distance between the first row of each color and last row of the last color of nozzles on the print head. Storage for an extra two bands (48 rows) of pixels is also required to provide double buffering for the expander and halftoner ASIC 1600 output. To print full bleed A4 pages at 800 dpi using the CC'MM'YK color model with a print head in which the colors are separated by 1143 μm (36 rows of pixels), the halftone band memory 1513 should preferably be at least 6.9 MBits (844 KBytes). The total data rate into and out of this memory is 91.6 MBytes per second. The memory 1513 may be composed of two 256K×16 SRAMs with a maximum 35 ns cycle time. An interleaved 32 bit bus 1522 operating at 43 ns (or less) cycle times which alternates access cycles between the expander and halftoner ASIC 1600 and the head control ASIC 400 is suitable. Halftoned data is read from the memory 1513 by the head control ASIC 400 and provided to the print head 50 via a bus 1523. The print head 50 may be a monolithic pagewidth print head. Power to the print head 50 is provided by a programmable power supply which is controlled by a microcontroller 315. Print density data is provided to the microcontroller 315 by the head control ASIC 400.

Some characteristics of a print head suitable for use as the print head 50 are listed in the table "LIFT head type A4-6-800". This print head has a speed which is slightly slower than the maximum speed of the printing systems 1530 and 1531 described herein, so the specifications of the printing systems could be reduced somewhat.

Expansion and Halftoning Integrated Circuit

It is important in the design of high speed real-time decoders to minimize the requirements on general purpose processors. Current general purpose processors cannot provide useful processing at the pixel rate (in excess of 60 MHz), and the processing which can be reliably performed at the cell 1101 rate (in excess of 100 KHz) is extremely limited if the processor is to provide any other functions. This is partly due to the high processing overheads involved in context switching, but also that general purpose processors are very inefficient (in terms of gate MHz) at bit manipulation. In this case the processor 1500 is only used to initialize the decoding process. The decoding process proceeds without processor involvement once initialized. This means that the hardware on the printing systems 1530 and 1531 must be able to fully interpret the encoded data.

JPEG codecs which can expand JPEG data without processor involvement are commercially available. The compression scheme disclosed herein generates a separately compressed data stream for high resolution bitmap information. This information is expanded by the Expander and Halftoner ASIC 400.

The Expander and Halftoner ASIC 400 provides the following functions on one integrated circuit:
1) pixel replication of the JPEG expanded contone data;
2) expansion of compressed cells 1101 and subcells 1103 (with the exception of JPEG compressed data);
3) combination of the pixel replicated contone data with bitmap data from expanded cells; and
4) halftoning of the contone information to provide a bi-level output image.

The halftoning function is combined with the expansion function to avoid any external buses which operate at the full contone pixel data rate. This data rate is over 244 MBytes per second for a printer which prints 60 ppm of 800 dpi CMYK A4 pages. Such a data rate requires careful design to achieve at an inter-IC level, but is relatively easy to achieve inside a single integrated circuit.

Figure 12:
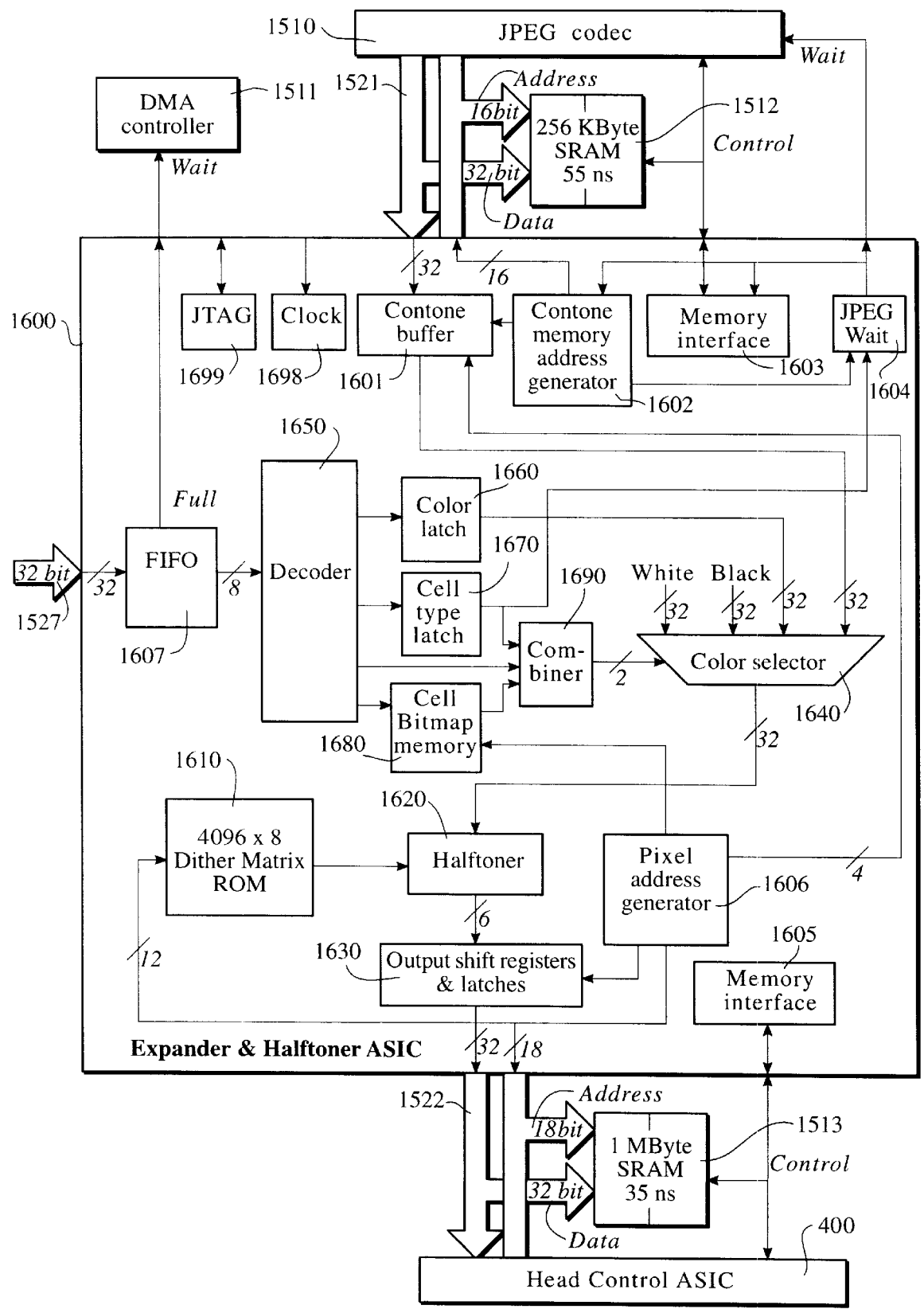
FIG. 12 is a block schematic diagram of an ASIC to implement real-time expansion of compressed page images.

FIG. 12 shows a block schematic diagram of the expander and halftoner ASIC 1600 in context in a printing system 1530 or 1531. Compressed data in JPEG format is expanded by the JPEG codec 1510 and temporarily stored in the contone buffer memory 1512. The bus 1521 is time division multiplexed between the JPEG codec and the expander and halftoner ASIC 1600, and is used to read data from the contone buffer memory 1512 and store it temporarily in the contone buffer 1601. The contone buffer 1601 stored two rows of 8 pixels, with each pixel being 32 bits, for a total of 512 bits. It is organized as a double buffer for a row of a single JPEG cell, and holds data for 3×3 pixel replication, to reduce the memory bandwidth required from the contone buffer memory 1512 by a factor of nine. The read addressing required to replicate the pixels from the contone buffer 1601 is generated by the pixel address generator 1606. The read address to the contone buffer memory 1512 and the write address to the contone buffer 1601 is generated by the contone memory address generator 1602. Read and write signals, memory timing, and arbitration of the bus 1521 is controlled by the memory interface 1603.

JPEG data is only included only in those cells where the cell type is 'Contone_cell' (see compression algorithm). The JPEG codec operates intermittently, controlled by a wait signal generated by the JPEG wait module 1604. The JPEG wait module 1604 generates a wait signal based upon the contents of the cell type latch 1670 and the contone memory address generator 1602. This allows the contone buffer memory 1512 to operate as a large off-chip FIFO.

The pixel replicated contone data is at the pixel rate (approx. 61 MHz for full bleed A4 800 dpi printing at 60 ppm) and forms one data input to a color selector 1640.

The compressed data stream is input to the expander and halftoner ASIC 1600 via the bus 1527, and enters a FIFO 1607. The depth of the FIFO depends upon the bus availability characteristics of the processor bus 1507. A FIFO depth of 4 should be adequate for most circumstances. The address for reading the compressed data from the processor bus is generated by a DMA controller 1511. The DMA controller 1511 is shown as an external device, but could readily be incorporated on the ASIC 1600. Once initialized, a new 32 bit word of compressed data is read from the processor bus 1507 and stored in the FIFO 1607 whenever the FIFO is not full. Compressed data from the FIFO 1607 goes to a decoder 1650, which decodes the compressed data stream according to the expansion algorithm described herein. Three types of data are generated by the decoder 1650:

1) a 32 bit color specification which is stored in the color latch 1660;
2) a 2 bit cell type specification which is stored in the cell type latch 1670; and
3) a 576 bit 24×24 bitmap of the current cell which is stored in the cell bitmap memory 1680.

The output of the color latch 1660 forms another data input to the color selector 1640. The other two data inputs to the multiplexer 1640 are constant states representing the colors black and white. The bit of the cell bitmap corresponding to the current pixel location is read from the cell bitmap memory 1680 using an address generated by the pixel address generator 1606. This bit is combined in a combiner 1690 with the two bit cell type from the cell type latch 1670 and the text overlay flag to form the two bit select input of the color selector 1640. The logic of the combiner 1690 is shown in the table "Combiner 1690 table".

Combiner 1690 table

| Cell Type | Cell Bitmap | Text flag | Multiplexer input selected |
|---|---|---|---|
| 00 | 0 | X | White |
| 00 | 1 | X | White |
| 01 | 0 | X | White |
| 01 | 1 | X | Black |
| 10 | 0 | X | White |
| 10 | 1 | X | Color |
| 11 | 0 | 0 | Contone |
| 11 | 1 | 0 | Contone |
| 11 | 0 | 1 | Contone |
| 11 | 1 | 1 | Black |

The color data selected by the color selector 1640 forms the contone data input to the halftoner 1620. The halftoner 1620 is preferably a dithering system using a large (64×64 pixel) dispersed dot ordered dither cell, which is stored in the dither matrix ROM 1610. A dispersed dot ordered dither cell of size approximately 64×64 or larger can be calculated so that no regular patterns are visible in the repeating cell. A method for calculating high quality dispersed dot dither matrices using simulated annealing is disclosed in a patent application: Silverbrook and Naylor PCT AU/94 00515. Addressing of the dither matrix ROM 1610 is based on the pixel address, and is generated by the pixel address generator 1606. The dither cell data read from the dither matrix ROM forms the dither threshold input of the halftoner 1620. The halftoner 1620 converts the contone data to bi-level data. The bi-level data should match the color model used by the print head 50. For a three color print head 50, the halftoner 1620 may produce bi-level CMY data. For a four color print head 50, the halftoner 1620 may produce bi-level CMYK data. For a six color print head 50, the halftoner 1620 may produce bi-level CC'MM'YK data. The production of CC'MM'YK halftone data is assumed herein. Other halftoning is simpler, and can readily be derived from the system disclosed herein. The CC'MM'YK data is a 6 bit data stream at the pixel rate. This data is converted to 32 bit parallel words and latched by the output shift registers and latches 1630. For each 32 pixels, six 32 bit words of halftoned page image data are written to the halftone buffer memory 1513. The bus 1522 is used to write data to the halftone buffer memory 1513. The bus 1522 is time division multiplexed between the expander and halftoner ASIC 1600 and the head control ASIC 400. The write address to the halftone buffer memory 1513 is generated by the pixel address generator 1606. Read and write signals, memory timing, and arbitration of the bus 1522 is controlled by the memory interface 1605.

A clock circuit 1698 buffers an external clock, divides the clock frquency where appropriate, and distributes system clocks to those modules requiring them. Testing circuits are preferably incorporated in the device. These testing circuits may have an external JTAG (Joint Test Action Group) interface 1699.

Figure 13:
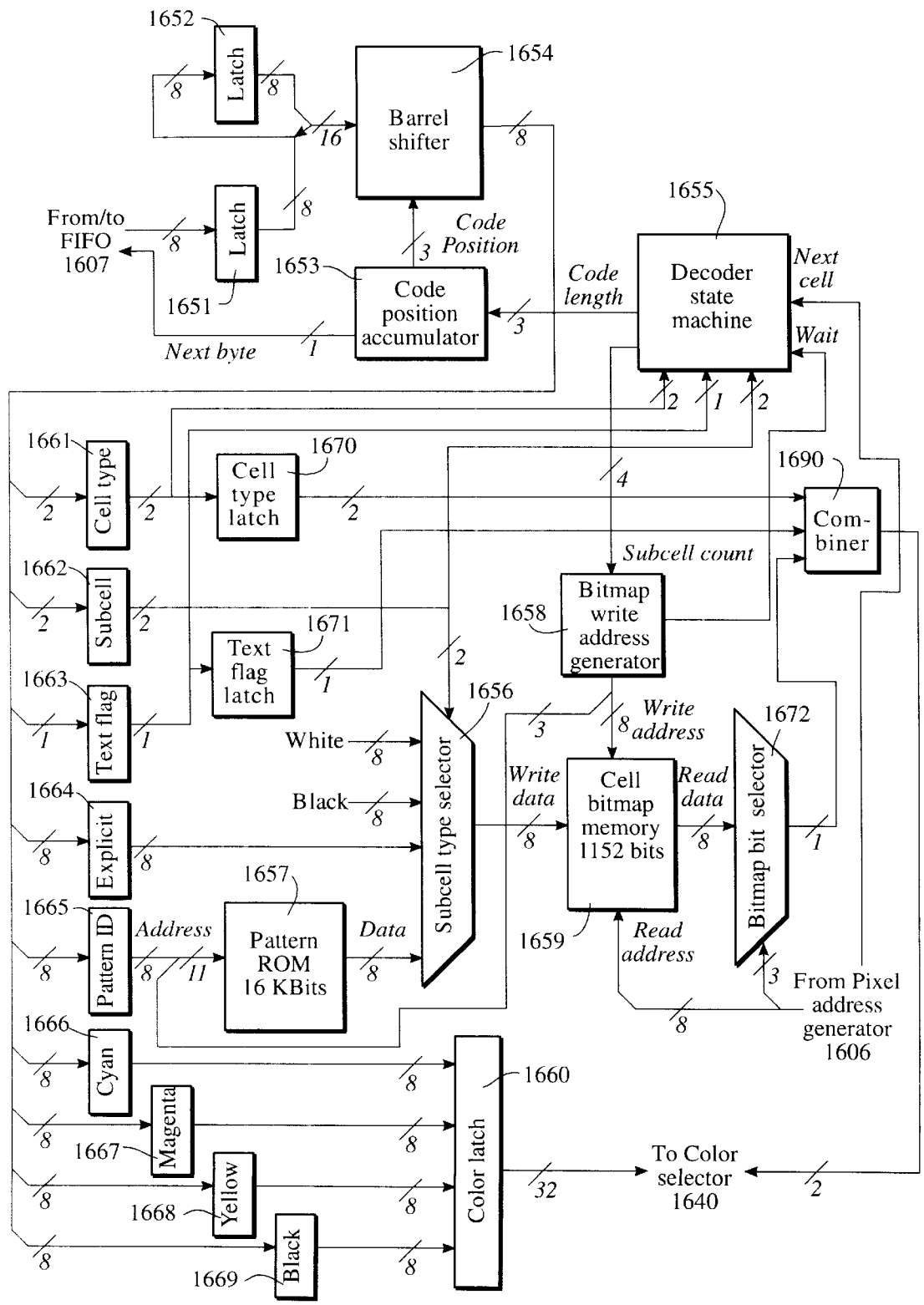
FIG. 13 is a block schematic diagram of the expansion section of the ASIC shown in FIG. 12.

FIG. 13 is a schematic block diagram of the compressed data decoding system of the expander and halftoner ASIC 1600. The decoding system is controlled by the decoder state machine 1655, which operates according to the table "decoder state table".

Decoder state table

| Current State | Cell type | Subcell type | Subcell Count (SC) | Current code | Code length | Next State | Next SC |
|---|---|---|---|---|---|---|---|
| 0 | 00 | XX | X | Cell type = White | 2 | 0 | 0 |
| 0 | 01 | XX | X | Cell type = Black & white | 2 | 1 | 0 |
| 0 | 10 | XX | X | Cell type = Color on white | 2 | 11 | 0 |
| 0 | 11 | XX | X | Cell type = Contone | 2 | 15 | 0 |
| 1 | XX | 00 | 0–7 | Subcell type = White | 2 | 1 | Inc. |
| 1 | XX | 00 | 8 | Subcell type = White | 2 | 0 | 0 |
| 1 | XX | 01 | 0–7 | Subcell type = Black | 2 | 1 | Inc. |
| 1 | XX | 01 | 8 | Subcell type = Black | 2 | 0 | 0 |
| 1 | XX | 10 | X | Subcell type = Pattern ID | 2 | 2 | SC |
| 1 | XX | 11 | X | Subcell type = Explicit | 2 | 3 | SC |
| 2 | XX | XX | 0–7 | Pattern ID | 8 | 1 | Inc. |
| 2 | XX | XX | 8 | Pattern ID | 8 | 0 | 0 |
| 3–9 | XX | XX | X | Byte of explicit pattern | 8 | Inc. | SC |
| 10 | XX | XX | 0–7 | Byte of explicit pattern | 8 | 1 | Inc. |
| 10 | XX | XX | 8 | Byte of explicit pattern | 8 | 0 | 0 |
| 11 | XX | XX | X | Cyan color | 8 | 12 | 0 |
| 12 | XX | XX | X | Magenta color | 8 | 13 | 0 |
| 13 | XX | XX | X | Yellow color | 8 | 14 | 0 |
| 14 | XX | XX | X | Black color | 8 | 1 | 0 |
| 15 | XX | XX | X | Text overlay flag (off) | 1 | 0 | 0 |
| 15 | XX | XX | X | Text overlay flag (on) | 1 | 1 | 0 |

In the table 'Decoder state table', "X" indicates that the quantity is irrelevant, and "Inc." indicates that the quantity is incremented by one.

The most recent byte of the compressed data stream read from the FIFO 1607 is latched by latch 1651. The output of the latch 1651 is latched by the latch 1652, providing the previous byte of the compressed data stream. The outputs of latches 1651 and 1652 are combined to provide a 16 bit input to barrel shifter 1654. The barrel shifter 1654 shifts the input data by an amount determined by the code position accumulator 1653 to provide an 8 bit output with the current code aligned to the output. The code position accumulator 1653 accumulates a code length representing the number of bits in the current code, which is provided by the decoder state machine 1655. The code position accumulator 1653 accumulates the code position modulo 8. Whenever the accumulator 'wraps around', the next byte is fetched from the FIFO 1607 and the latches 1651 and 1652 are clocked.

The current code produced by the barrel shifter 1654 is latched by different latches according to clocks produced by the decoder state machine 1655 determined by the code type. The different code types are latched as follows:
1) cell types are latched by the cell type latch 1661;
2) subcell types are latched by the subcell type latch 1662;
3) text overlay flags are latched by the text flag latch 1663;
4) explicit subcell bitmap data is latched by the explicit latch 1664;
5) pattern ID are latched by the pattern ID latch 1665;
6) cyan color specifications are latched by the cyan latch 1666;
7) magenta color specifications are latched by the magenta latch 1667;
8) yellow color specifications are latched by the yellow latch 1668; and
9) black color specifications are latched by the black latch 1669.

The outputs of the cell type latch 1661, subcell type latch 1662, and text flag latch 1663 form control inputs to the decoder state machine 1655. The output of the cell type latch 1661 is latched by the cell type latch 1670 whenever the pixel address generator 1606 starts addressing a new cell (the "next cell" time). By this means, the output of the cell type latch 1670 indicates the correct cell type for all of the 576 pixels in the 24×24 cell. The output of the text flag latch 1663 is also latched by the text flag latch 1671 at the "next cell" time. The outputs of the cyan latch 1666, the magenta latch 1667, the yellow latch 1668, and the black latch 1669 are also latched by the 32 bit color latch 1660 at the "next cell" time.

Subcell type data latched by the subcell type latch 1662 selects one of four 8 bit inputs to the subcell type selector 1656. These 8 bit inputs each represent 8 pixels with one bit per pixel. If the bit is off, the color is white (unless the cell type is contone, in which case the color is the contone color from JPEG expansion). If the bit is on, the color is black (unless the cell type is color_on_white, in which case the color is the color latched in the color latch 1660). The four data inputs to the subcell type selector are:
1) white: all 8 bits are off;
2) black: all 8 bits are on;
3) explicit: the 8 bits are explicitly provided in the compressed data, and are latched by the explicit latch 1664; and
4) pattern: the 8 bits are looked up in the pattern ROM 1657. The pattern ROM 1657 is a 16 KBit ROM organized as 2K bytes. The pattern ROM stores a set of patterns which is the same as that which were used for subcell comparisons in the encoding process. An example set of patterns is shown in FIG. 10. Eight bits of the address are provided by the pattern ID latch 1665, and select one pattern from the set of patterns. The other three bits of the address are provided by the bitmap write address generator 1658, and select which of the eight lines of the selected pattern is to be read.

The output of the subcell type selector 1656 forms the write data input of the cell bitmap memory 1659. The cell bitmap memory 1659 is a 1152 bit memory organized as a double buffer of a cell bitmap. The cell bitmap is a 24×24 array, with one bit per pixel. The two cells are each organized as a 3×3 array of subcells, each containing 8×8 one bit pixel values. The cell bitmap memory 1659 is organized as a byte wide memory, with the 8 bits in a row of a subcell being written or read simultaneously. The write address for the cell bitmap memory is provided by the bitmap write address generator 1658 which interacts with the decoder state machine 1655. The read address for the cell bitmap memory is provided by the pixel address generator 1606, and corresponds to the position of the current subcell row in the 24×24 cell. The read data from the cell bitmap memory 1659 forms the data input of an 8:1 multiplexer which is the bitmap data selector 1672. The bit of this data which corresponds to the current pixel is selected by a three bit address provided by the pixel address generator 1606. This bit is combine in the combiner 1690 with the cell type information and the text overlay flag to form the select input to the color selector 1640. The combination of the cell bitmap memory 1659 and the bitmap bit selector 1672 for the cell bitmap memory 1680 of FIG. 12.

Figure 14:
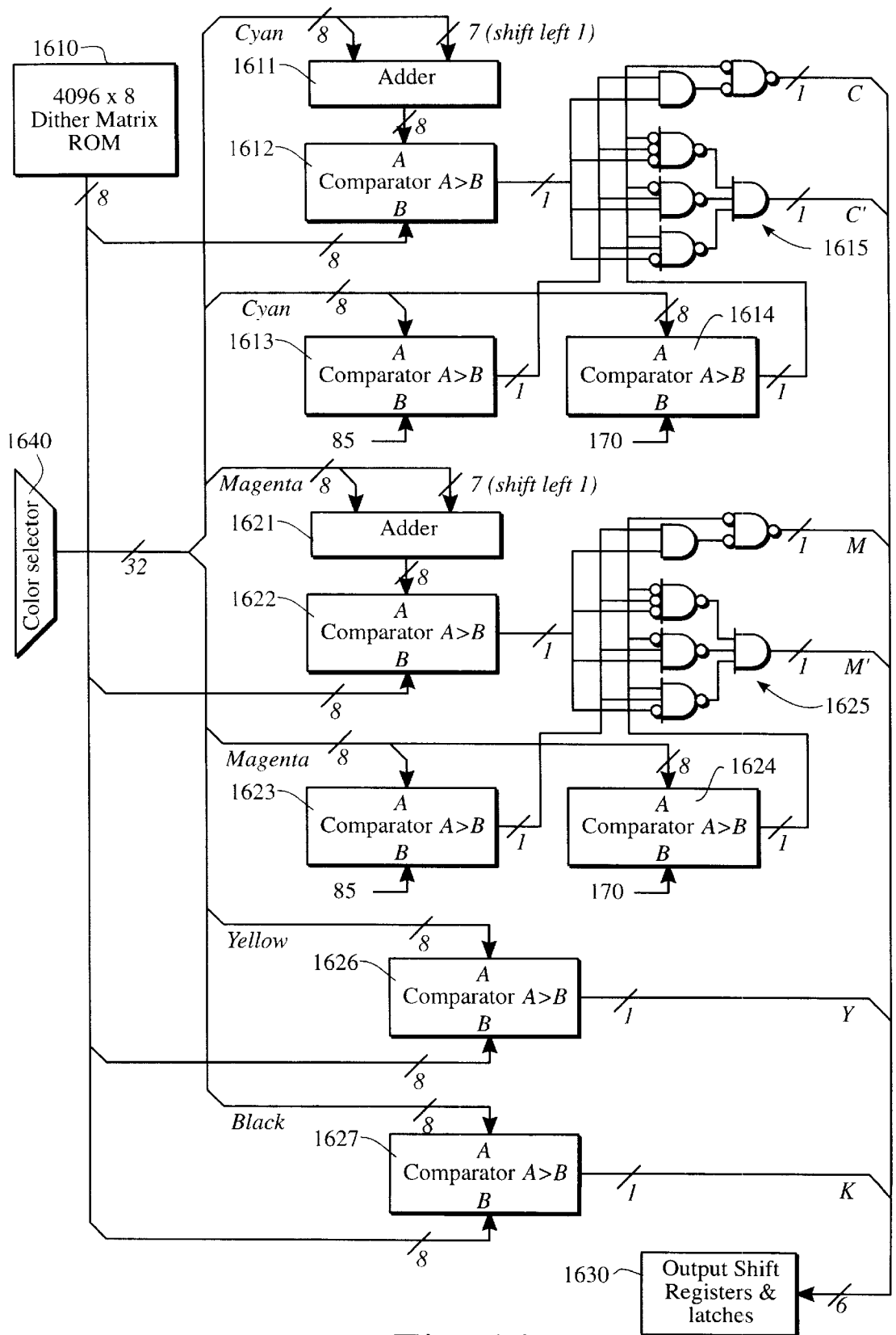
FIG. 14 is a block schematic diagram of the halftoning section of the ASIC shown in FIG. 12.

FIG. 14 is a schematic block diagram of the halftoning section of the expander and halftoner ASIC 1600. The 32 bit CMYK color of the current pixel is provided by the output of the color selector 1640. The minimum value of any color component is 0, and the maximum value is 255. A higher value corresponds to a higher average optical density of ink to be printed. The current dither value (the entry of the 64×64 dither matrix corresponding to current pixel) is provided by the dither matrix ROM 1610. The color model used is CC'MM'YK, where two bits are provided for cyan and magenta, and one bit is provided for yellow and black, to provided 6 halftoned bits per pixel. These 6 bits form the input to the output shift registers and latches 1630.

The eight bit cyan component of the current color is multiplied by three, modulo 256, by the adder 1611. The output of the adder 1611 is compared to the current dither value by the comparator 1612. The cyan component is compared to the constant 85 (one third of 255) by the comparator 1613. The cyan component is compared to the constant 170 (two thirds of 255) by the comparator 1614. The comparison outputs of the comparators 1612, 1613, and 1614 are combined by the logic 1615 to form the C and C' components of the CC'MM'YK halftoned data. A logical true value of the C component indicates that a cyan dot of $\frac{2}{3}$ optical density is printed. A logical true value of the C' component indicates that a cyan dot of $\frac{1}{3}$ optical density is printed.

The eight bit magenta component of the current color is multiplied by three, modulo 256, by the adder 1621. The output of the adder 1621 is compared to the current dither value by the comparator 1622. The magenta component is compared to the constant 85 (one third of 255) by the comparator 1623. The magenta component is compared to the constant 170 (two thirds of 255) by the comparator 1624. The comparison outputs of the comparators 1622, 1623, and 1624 are combined by the logic 1625 to form the M and M' components of the CC'MM'YK halftoned data. A logical true value of the M component indicates that a magenta dot of $\frac{2}{3}$ optical density is printed. A logical true value of the M' component indicates that a magenta dot of $\frac{1}{3}$ optical density is printed.

The eight bit yellow component of the current color is compared to the current dither value by the comparator 1626. The comparison output of the comparator 1626 forms the Y component of the CC'MM'YK halftoned data. A logical true value of the Y component indicates that a yellow dot of full optical density is printed.

The eight bit black component of the current color is compared to the current dither value by the comparator 1626. The comparison output of the comparator 1627 forms the K component of the CC'MM'YK halftoned data. A logical true value of the K component indicates that a black dot of full optical density is printed.

The table "Approximate gate count of Expander and Halftoner ASIC 1600" shows an approximate and implementation dependent number of gates, number of RAM bits, number of ROM bits, and number of pins for implementation of the expander and halftoner ASIC 1600 as a single CMOS standard cell integrated circuit using currently available integrated circuit design and fabrication processes such as those provided by LSI Logic Inc.

Approximate gate count of Expander and Halftoner ASIC 1600

| Ref. | Description | RAM | ROM | Gates | Pins |
|---|---|---|---|---|---|
| 1601 | Contone buffer | 512 | — | ~100 | 32 |
| 1602 | Contone memory address gen. | — | — | ~160 | 16 |
| 1603 | Memory interface | — | — | ~150 | 4 |
| 1604 | JPEG wait controller | — | — | ~40 | 1 |
| 1605 | Memory interface | — | — | ~150 | 4 |
| 1606 | Pixel address generator | — | — | ~440 | 18 |
| 1607 | FIFO | 128 | — | ~100 | 34 |
| 1610 | Dither Matrix ROM | — | 32,784 | ~856 | — |
| 1611 | Cyan adder | — | — | ~84 | — |
| 1612 | Cyan dither comparator | — | — | ~60 | — |
| 1613 | Cyan 85 comparator | — | — | ~60 | — |
| 1614 | Cyan 170 comparator | — | — | ~60 | — |
| 1615 | Cyan gates | — | — | ~14 | — |
| 1621 | Magenta adder | — | — | ~84 | — |
| 1622 | Magenta dither comparator | — | — | ~60 | — |
| 1623 | Magenta 85 comparator | — | — | ~60 | — |
| 1624 | Magenta 170 comparator | — | — | ~60 | — |
| 1625 | Magenta gates | — | — | ~14 | — |
| 1626 | Yellow dither comparator | — | — | ~60 | — |
| 1627 | Black dither comparator | — | — | ~60 | — |
| 1630 | Output shift registers and latches | — | — | ~3840 | 32 |
| 1640 | Color selector (latched) | — | — | ~544 | — |
| 1651 | Latch | — | — | ~48 | — |
| 1652 | Latch | — | — | ~48 | — |
| 1653 | Code position accumulator | — | — | ~60 | — |
| 1654 | Barrel shifter | — | — | ~140 | — |
| 1655 | Decoder state machine | — | — | ~500 | — |
| 1656 | Subcell type selector | — | — | ~64 | — |
| 1657 | Pattern ROM | — | 16,384 | ~600 | — |
| 1658 | Bitmap write address generator | — | — | ~80 | — |
| 1659 | Cell bitmap memory | 1,152 | — | ~600 | — |
| 1660 | Color latch | — | — | ~192 | — |
| 1661 | Cell type latch | — | — | ~12 | — |
| 1662 | Subcell type latch | — | — | ~12 | — |
| 1663 | Text flag latch | — | — | ~6 | — |
| 1664 | Explicit Latch | — | — | ~48 | — |
| 1665 | Pattern ID Latch | — | — | ~48 | — |
| 1666 | Cyan Latch | — | — | ~48 | — |
| 1667 | Magenta Latch | — | — | ~48 | — |
| 1668 | Yellow Latch | — | — | ~48 | — |
| 1669 | Black Latch | — | — | ~48 | — |
| 1676 | Cell type latch | — | — | ~12 | — |
| 1671 | Text flag latch | — | — | ~6 | — |
| 1672 | Bitmap bit selector | — | — | ~24 | — |
| 1690 | Combiner | — | — | ~14 | — |
| 1698 | Clock circuits | — | — | ~100 | 2 |
| 1699 | JTAG and other test circuits | — | — | ~1000 | 4 |
| — | Miscellaneous glue logic | — | — | ~1000 | — |
| — | Power and ground | — | — | — | 36 |
| 1600 | Total | 1,792 | 49,152 | ~11,862 | 183 |

The reference numbers in the table "Approximate gate count of Expander and Halftoner ASIC 1600" are those of FIGS. 12, 13, and 14. This table does not include the I/O buffers. The numbers of gates are approximate, and are a guide intended for assessing implementation feasibility and die size in the standard cell technologies offered by numerous vendors. The actual number of gates consumed by any function will depend upon the design techniques and tools used, the efficiency of the design, the types of primitives available, and the specific ASIC technology chosen for implementation. Gate overheads from implementing serial readback circuits in latches and pipeline stages are included in the "JTAG and other test circuits" estimation.

The total number of ROM bits, RAM bits, random gates, and pins, in conjunction with the maximum clock frequency requirement of 61 MHz, indicates that the expander and halftoner ASIC 1600 can readily be implemented using currently available standard cell processes from a variety of manufacturers.

The foregoing describes one embodiment of the present invention. Modifications, obvious to those skilled in the art, can be made thereto without departing from the scope of the invention.

APPENDIX A

LIFT head type A4-6-800
This is a six color print head for A4 size printing. The print head is fixed, and is the full width of the A4 paper. Resolution is 800 dpi bi-level for high quality color output.

| Basic specifications | | Derivation |
|---|---|---|
| Resolution | 800 dpi | Specification |
| Print head length | 215 mm | Width of print area, plus 5 mm |
| Print head width | 8 mm | Derived from physical and layout consrtaints of head |
| Ink colors | 6 | CC'MM'YK |
| Page size | A4 | Specification |
| Print area width | 210 mm | Pixels per line/Resolution |
| Print area length | 297 mm | Total length of active printing |
| Page printing time | 1.3 seconds | Derived from scans, lines per page and dot printing rate |
| Pages per minute | 37 ppm | 60/(120% of print time in seconds) |
| Basic IC process | 1.5 $\mu$m CMOS | Recommendation |
| Bitmap memory requirement | 44.3 MBytes | Bitmap memory required for one scan (cannot pause) |

APPENDIX A-continued

LIFT head type A4-6-800
This is a six color print head for A4 size printing. The print head is fixed, and is the full width of the A4 paper. Resolution is 800 dpi bi-level for high quality color output.

| | | |
|---|---|---|
| Pixel spacing | 31.8 μm | Reciprocal of resolution |
| Pixels per line | 6,624 | Active nozzles/Number of colors |
| Lines per page | 9,354 | Scan distance * resolution |
| Pixels per page | 61,960,896 | Pixels per line * lines per page |
| Drops per page | 247,843,584 | Pixels per page * simultaneous ink colors |
| Average data rate | 32.9 MBytes/sec | Pixels per second * ink colors/8 MBits |
| Ejection energy per drop | 977 nJ | Energy applied to heater in finite element simulations |
| Energy to print full black page | 242 J | Drop ejection energy * drops per page |
| Recording medium speed | 22.0 cm/sec | 1/(resolution * actuation period times phases) |

| Yield and cost | | Derivation |
|---|---|---|
| Number of chips per head | 1 | Recommendation |
| Wafer size | 300 mm (12") | Recommendation |
| Chips per wafer | 22 | From chip size and recommended wafer size |
| Print head chip area | 17.2 cm$^2$ | Chip width * length |
| Yield without fault tolerance | 0.34% | Using Murphy's method, defect density = 1 per cm$^2$ |
| Yield with fault tolerance | 89% | See fault tolerant yield calculations (D = 1/cm$^2$, CF = 2) |
| Functional print heads per month | 195,998 | Assuming 10,000 wafer starts per month |
| Print head assembly cost | $10 | Estimate |
| Factory overhead per print head | $17 | Based on $120 m. cost for refurbished 1.5 μm Fab line amortised over 5 years, plus $16 m. P.A. operating cost |
| Wafer cost per print head | $31 | Based on materials cost of $600 per wafer |
| Approx. total print head cost | $58 | Sum of print head assembly, overhead, and wafer costs |

| Nozzle and actuation specifications | | Derivation |
|---|---|---|
| Nozzle radius | 10 μm | Specification |
| Number of actuation phases | 8 | Specification |
| Nozzles per phase | 4,968 | From page width, resolution and colors |
| Active nozzles per head | 39,744 | Actuation phases * nozzles per phase |
| Redundant nozzles per head | 39,744 | Same as active nozzles for 100% redundancy |
| Total nozzles per head | 79,488 | Active plus redundant nozzles |
| Drop rate per nozzle | 6,944 Hz | 1/(heater active period * number of phases) |
| Heater radius | 10.5 μm | From nozzle geometry and radius |
| Heater thin film resistivity | 2.3 μΩm | For heater formed from TaAl |
| Heater resistance | 1,517 Ω | From heater dimensions and resistivity |
| Average heater pulse current | 6.0 mA | From heater power and resistance |
| Heater active period | 18 μs | From finite element simulations |
| Settling time between pulses | 126 μs | Active period * (actuation phases − 1) |
| Clock pulses per line | 5,678 | Assuming multiple clocks and no transfer register |
| Clock frequency | 39.4 MHz | From clock pulses per line, and lines per second |
| Drive transistor on resistance | 56 Ω | From recommended device geometry |
| Average head drive voltage | 9.4 V | Heater current * (heater + drive transistor resistance) |
| Drop selection temperature | 50° C. | Temperature at which critical surface tension is reached |
| Heater peak temperature | 120° C. | From finite element simulations |

| Ink specifications | | Derivation |
|---|---|---|
| Basic ink carrier | Water | Specification |
| Surfactant | 1-Hexadecanol | Suggested method of achieving temperature threshold |
| Ink drop volume | 9 pl | From finite element simulations |
| Ink density | 1.030 g/cm$^3$ | Black ink density at 60° C. |
| Ink drop mass | 9.3 ng | Ink drop volume * ink density |
| Ink specific heat capacity | 4.2 J/Kg/° C. | Ink carrier characteristic |
| Max. energy for self cooling | 1,164 nJ/drop | Ink drop heat capacity * temperature increase |
| Total ink per color per page | 0.56 ml | Drops per page per color * drop volume |
| Maximum ink flow rate per color | 0.41 ml/sec | Ink per color per page/page print time |
| Full black ink coverage | 35.7 ml/m$^2$ | Ink drop volume * colors * drops per square meter |
| Ejection ink surface tension | 38.5 mN/m | Surface tension required for ejection |
| Ink pressure | 7.7 kPa | 2 * Ejection ink surface tension/nozzle radus |
| Ink column height | 763 mm | Ink column height to achieve ink pressure |

I claim:

1. A high capacity compressed document image storage apparatus which is incorporated in a printing system having a print head comprising:

(a) a plurality of drop-emitter nozzles;
(b) a body of ink associated with said nozzles;
(c) pressure means for subjecting ink in said body of ink to a pressure of at least 2% above ambient pressure, at least during drop selection and separation;
(d) drop selection means for selecting predetermined nozzles and generating a difference in meniscus position between ink in selected and non-selected nozzles; and drop separating means for causing ink from selected nozzles to separate as drops from the body of ink, while allowing ink to be retained in non-selected nozzles;

said image storage apparatus comprising:

(1) an image creation system which can operate on a band by band basis;
(2) an input memory which stores at least one band of the uncompressed page image, but less than 50% of said uncompressed page image;
(3) a page image compression system which can operate on a band by band basis;
(4) a mass storage device able to store a plurality of compressed page images;
(5) a page image expansion system which expands compressed page image data to form an expanded page image at a rate which is within 20% of the page printing rate when measured over the duration of the page printing time;
(6) an output memory which stores at least one band of said expanded page image, but less than 50% of said expanded page image; and
(7) an apparatus which provides page image data from said output memory to a printing device wherein the time taken to provide a band of image data to the printing device does not vary by more than ±50% of the mean time to provide a band of image data to the printing device.

2. A high capacity compressed document image storage apparatus which is incorporated in a printing system having a print head comprising:
(a) a plurality of drop-emitter nozzles;
(b) a body of ink associated with said nozzles;
(c) drop selection means for selecting predetermined nozzles and generating a difference in meniscus position between ink in selected and non-selected nozzles; and
(d) drop separating means for causing ink from selected nozzles to separate as drops from the body of ink, while allowing ink to be retained in non-selected nozzles, said drop selecting means being capable of producing said difference in meniscus position in the absence of said drop separation means; said image storage apparatus comprising:
  (1) an image creation system which can operate on a band by band basis;
  (2) an input memory which stores at least one band of the uncompressed page image, but less than 50% of said uncompressed page image;
  (3) a page image compression system which can operate on a band by band basis;
  (4) a mass storage device able to store a plurality of compressed page images;
  (5) a page image expansion system which expands compressed page image data to form an expanded page image at a rate which is within 20% of the page printing rate when measured over the duration of the page printing time;
  (6) an output memory which stores at least one band of said expanded page image, but less than 50% of said expanded page image; and
  (7) an apparatus which provides page image data from said output memory to a printing device wherein the time taken to provide a band of image data to the printing device does not vary by more than ±50% of the mean time to provide a band of image data to the printing device.

3. A high capacity compressed document image storage apparatus which is incorporated in a printing system having a print head comprising:
(a) a plurality of drop-emitter nozzles;
(b) a body of ink associated with said nozzles, said ink exhibiting a surface tension decrease of at least 10 mN/m over a 30° C. temperature range;
(c) drop selection means for selecting predetermined nozzles and generating a difference in meniscus position between ink in selected and non-selected nozzles; and
(d) drop separating means for causing ink from selected nozzles to separate as drops from the body of ink, while allowing ink to be retained in non-selected nozzles; said image storage apparatus comprising:
  (1) an image creation system which can operate on a band by band basis;
  (2) an input memory which stores at least one band of the uncompressed page image, but less than 50% of said uncompressed page image;
  (3) a page image compression system which can operate on a band by band basis;
  (4) a mass storage device able to store a plurality of compressed page images;
  (5) a page image expansion system which expands compressed page image data to form an expanded page image at a rate which is within 20% of the page printing rate when measured over the duration of the page printing time;
  (6) an output memory which stores at least one band of said expanded page image, but less than 50% of said expanded page image; and
  (7) an apparatus which provides page image data from said output memory to a printing device wherein the time taken to provide a band of image data to the printing device does not vary by more than ±50% of the mean time to provide a band of image data to the printing device.

4. A high capacity compressed document image storage apparatus including:
(1) an image creation system which can operate on a band by band basis;
(2) an input memory which stores at least one band of the uncompressed page image, but less than 50% of said uncompressed page image;
(3) a page image compression system which can operate on a band by band basis in which page images are compressed by an average of more than 400:1 compared to a 32 bit contone representation of said page images;
(4) a mass storage device able to store a plurality of compressed page images;
(5) a page image expansion system which expands compressed page image data to form an expanded page image at a rate which is within 20% of the page printing rate when measured over the duration of the page printing time;
(6) an output memory which stores at least one band of said expanded page image, but less than 50% of said expanded page image; and
(7) an apparatus which provides page image data from said output memory to a printing device wherein the time taken to provide a band of image data to the printing device does not vary by more than ±50% of the mean time to provide a band of image data to the printing device.

5. A high capacity compressed document image storage apparatus including:

(1) an image creation system which can operate on a band by band basis;
(2) an input memory which stores at least one band of the uncompressed page image, but less than 50% of said uncompressed page image;
(3) a page image compression system which can operate on a band by band basis;
(4) a mass storage device able to store a plurality of compressed page images in which more than 1,000 page images can be stored per GByte of said mass storage;
(5) a page image expansion system which expands compressed page image data to form an expanded page image at a rate which is within 20% of the page printing rate when measured over the duration of the page printing time;
(6) an output memory which stores at least one band of said expanded page image, but less than 50% of said expanded page image; and
(7) an apparatus which provides page image data from said output memory to a printing device wherein the time taken to provide a band of image data to the printing device does not vary by more than ±50% of the mean time to provide a band of image data to the printing device.

6. A high capacity compressed document image storage apparatus including:
(1) an image creation system which can operate on a band by band basis;
(2) an input memory which stores at least one band of the uncompressed page image, but less than 50% of said uncompressed page image;
(3) a page image compression system which can operate on a band by band basis wherein cells of the page image which contain more than two colors are compressed using at least JPEG compression;
(4) a mass storage device able to store a plurality of compressed page images;
(5) a page image expansion system which expands compressed page image data to form an expanded page image at a rate which is within 20% of the page printing rate when measured over the duration of the page printing time;
(6) an output memory which stores at least one band of said expanded page image, but less than 50% of said expanded page image; and
(7) an apparatus which provides page image data from said output memory to a printing device wherein the time taken to provide a band of image data to the printing device does not vary by more than ±50% of the mean time to provide a band of image data to the printing device.

7. An image storage apparatus as claimed in claim 6 wherein cells of the page image which contain only black and white pixels are not compressed using JPEG compression.

8. A high capacity compressed document image storage apparatus including:
(1) an image creation system which can operate on a band by band basis;
(2) an input memory which stores at least one band of the uncompressed page image, but less than 50% of said uncompressed page image:
(3) a page image compression system which can operate on a band by band basis;
(4) a mass storage device able to store a plurality of compressed page images;
(5) a page image expansion system which expands compressed page image data at an average rate of more than 30 million pixels per second to form an expanded page image at a rate which is within 20% of the page printing rate when measured over the duration of the page printing time;
(6) an output memory which stores at least one band of said expanded page image, but less than 50% of said expanded page image; and
(7) an apparatus which provides page image data from said output memory to a printing device wherein the time taken to provide a band of image data to the printing device does not vary by more than ±50% of the mean time to provide a band of image data to the printing device.

9. A high capacity compressed document image storage apparatus including:
(1) an image creation system which can operate on a band by band basis;
(2) an input memory which stores at least one band of the uncompressed page image, but less than 50% of said uncompressed page image;
(3) a page image compression system which can operate on a band by band basis;
(4) a mass storage device able to store a plurality of compressed page images;
(5) a page image expansion system which can expand a plurality of said compressed page images simultaneously, each at an average rate of more than 30 million pixels per second to form an expanded page image at a rate which is within 20% of the page printing rate when measured over the duration of the page printing time;
(6) an output memory which stores at least one band of said expanded page image, but less than 50% of said expanded page image; and
(7) an apparatus which provides page image data from said output memory to a printing device wherein the time taken to provide a band of image data to the printing device does not vary by more than ±50% of the mean time to provide a band of image data to the printing device.

10. A method of page image compression said method including the following steps:
(a) dividing said page image into an array of cells of pixels;
(b) encoding said cells containing only white pixels to a specific code;
(c) encoding said cells containing only black and white pixels to a different specific code, and supplementing said code with information encoding the pattern of black and white pixels in said cell; and
(d) encoding said cells containing a plurality of colors to a mutually different code, and supplementing said code with information encoding the colors of the pixels in said cell.

11. A compression system as claimed in claim 10 said compression system being incorporated in a printing system which includes a print head comprising:
(a) a plurality of drop-emitter nozzles;
(b) a body of ink associated with said nozzles;
(c) a pressurizing device adapted to subject ink in said body of ink to a pressure of at least 2% above ambient pressure, at least during drop selection and separation to form a meniscus with an air/ink interface;

(d) drop selection apparatus operable upon the air/ink interface to select predetermined nozzles and to generate a difference in meniscus position between ink in selected and non-selected nozzles; and (e) drop separation apparatus adapted to cause ink from selected nozzles to separate as drops from the body of ink, while allowing ink to be retained in non-selected nozzles.

12. A compression system as claimed in claim 10 said compression system being incorporated in a printing system which includes a print head comprising:

(a) a plurality of drop-emitter nozzles;

(b) a body of ink associated with said nozzles, said body of ink forming a meniscus with an air/ink interface at each nozzle;

(c) drop selection apparatus operable upon the air/ink interface to select predetermined nozzles and to generate a difference in meniscus position between ink in selected and non-selected nozzles; and (d) drop separation apparatus adapted to cause ink from selected nozzles to separate as drops from the body of ink, while allowing ink to be retained in non-selected nozzles, said drop selection apparatus being capable of producing said difference in meniscus position in the absence of said drop separation apparatus.

13. A compression system as claimed in claim 10 said compression system being incorporated in a printing system which includes a print head comprising:

(a) a plurality of drop-emitter nozzles;

(b) a body of ink associated with said nozzles, said body of ink forming a meniscus with an air/ink interface at each nozzle and said ink exhibiting a surface tension decrease of at least 10 mN/m over a 30° C. temperature range;

(c) drop selection apparatus operable upon the air/ink interface to select predetermined nozzles and to generate a difference in meniscus position between ink in selected and non-selected nozzles; and (d) drop separation apparatus adapted to cause ink from selected nozzles to separate as drops from the body of ink, while allowing ink to be retained in non-selected nozzles.

14. A compression system as claimed in claim 10 wherein said cells of pixels are rectangular and the number of pixels in said cells is an integral multiple of eight in one dimension, and a further integral multiple of eight in the perpendicular dimension, wherein said multiples of eight may be identical or may be different.

15. A compression system as claimed in claim 14 wherein the number of pixels in said cells is 24 in both dimensions.

16. A compression system as claimed in claim 10 wherein said specific code is a two bit code.

17. A compression system as claimed in claim 10 wherein said cells containing only black and white pixels are further divided into arrays of subcells.

18. A compression system as claimed in claim 10 wherein:

(a) Subcells containing only white pixels are encoded to a specific subcode;

(b) Subcells containing only black pixels are encoded to a further specific subcode;

(c) Subcells containing a pattern which matches one of a predetermined set of patterns are encoded to a further specific subcode, plus a further subcode representing the pattern which is matched; and (d) Subcells containing a pattern which is neither all black, all white, nor match any of said predetermined set of patterns are encoded to a further specific subcode and supplemented with data which directly encodes said pattern.

19. A compression system as claimed in claim 10 wherein an exact match between the pattern of pixels in said subcell and one of a predetermined set of patterns is not required for said subcell to be encoded using said subcode representing said pattern which is matched.

20. A compression system as claimed in claim 10 wherein said cells containing only color pixels are subsampled to form an 8×8 JPEG cell.

21. A compression system as claimed in claim 20 wherein said JPEG cells are JPEG compressed.

22. A compression system as claimed in claim 20 wherein said cells are low pass filtered before subsampling.

23. A printing system incorporating a page image compression system wherein said printing system includes a print head comprising:

(a) a plurality of drop-emitter nozzles;

(b) a body of ink associated with said nozzles;

(c) a pressurizing device adapted to subject ink in said body of ink to a pressure of at least 2% above ambient pressure, at least during drop selection and separation to form a meniscus with an air/ink interface;

(d) drop selection apparatus operable upon the air/ink interface to select predetermined nozzles and to generate a difference in meniscus position between ink in selected and non-selected nozzles; and (e) drop separation apparatus adapted to cause ink from selected nozzles to separate as drops from the body of ink, while allowing ink to be retained in non-selected nozzles.

24. A printing system incorporating a page image compression system wherein said printing system includes a print head comprising:

(a) a plurality of drop-emitter nozzles;

(b) a body of ink associated with said nozzles, said body of ink forming a meniscus with an air/ink interface at each nozzle;

(c) drop selection apparatus operable upon the air/ink interface to select predetermined nozzles and to generate a difference in meniscus position between ink in selected and non-selected nozzles; and (d) drop separation apparatus adapted to cause ink from selected nozzles to separate as drops from the body of ink, while allowing ink to be retained in non-selected nozzles, said drop selection apparatus being capable of producing said difference in meniscus position in the absence of said drop separation apparatus.

25. A printing system incorporating a page image compression system wherein said printing system includes a print head comprising:

(a) a plurality of drop-emitter nozzles;

(b) a body of ink associated with said nozzles, said body of ink forming a meniscus with an air/ink interface at each nozzle and said ink exhibiting a surface tension decrease of at least 10 mN/m over a 30° C. temperature range;

(c) drop selection apparatus operable upon the air/ink interface to select predetermined nozzles and to generate a difference in meniscus position between ink in selected and non-selected nozzles; and (d) drop separation apparatus adapted to cause ink from selected nozzles to separate as drops from the body of ink, while allowing ink to be retained in non-selected nozzles.

26. An expansion apparatus for expanding compressed page image data in real-time as the page is being printed, said apparatus including:
   (a) a mass storage unit for storage of the compressed page images;
   (b) a JPEG decoder which expands the JPEG encoded portions of the compressed page image into contone image data;
   (c) a contone band memory which temporarily holds at least one band of said contone image data;
   (d) an expander circuit which expands compressed black and white text and graphics bitmaps and combines said bitmaps with said contone image data read from said contone band memory.

27. An expansion apparatus as claimed in claim 26 which is incorporated in a printing system having a print head comprising:
   (a) a plurality of drop-emitter nozzles;
   (b) a body of ink associated with said nozzles;
   (c) a pressurizing device adapted to subject ink in said body of ink to a pressure of at least 2% above ambient pressure, at least during drop selection and separation to form a meniscus with an air/ink interface;
   (d) drop selection apparatus operable upon the air/ink interface to select predetermined nozzles and to generate a difference in meniscus position between ink in selected and non-selected nozzles; and
   (e) drop separation apparatus adapted to cause ink from selected nozzles to separate as drops from the body of ink, while allowing ink to be retained in non-selected nozzles.

28. An expansion apparatus as claimed in claim 26 which is incorporated in a printing system having a print head comprising:
   (a) a plurality of drop-emitter nozzles;
   (b) a body of ink associated with said nozzles, said body of ink forming a meniscus with an air/ink interface at each nozzle;
   (c) drop selection apparatus operable upon the air/ink interface to select predetermined nozzles and to generate a difference in meniscus position between ink in selected and non-selected nozzles; and
   (d) drop separation apparatus adapted to cause ink from selected nozzles to separate as drops from the body of ink, while allowing ink to be retained in non-selected nozzles, said drop selection apparatus being capable of producing said difference in meniscus position in the absence of said drop separation apparatus.

29. An expansion apparatus as claimed in claim 26 which is incorporated in a printing system having a print head comprising:
   (a) a plurality of drop-emitter nozzles;
   (b) a body of ink associated with said nozzles, said body of ink forming a meniscus with an air/ink interface at each nozzle and said ink exhibiting a surface tension decrease of at least 10 mN/m over a 30° C. temperature range;
   (c) drop selection apparatus operable upon the air/ink interface to select predetermined nozzles and to generate a difference in meniscus position between ink in selected and non-selected nozzles; and
   (d) drop separation apparatus adapted to cause ink from selected nozzles to separate as drops from the body of ink, while allowing ink to be retained in non-selected nozzles.

30. An expansion apparatus as claimed in claim 26 which also contains a head control circuit which provides data to the print head when required by the print head.

31. An expansion apparatus as claimed in claim 26 which also includes a halftoner circuit which calculates bi-level image data from the image data created by said expander circuit.

32. An expansion apparatus as claimed in claim 31 which also includes a halftone image memory which stores a plurality of lines of said bi-level image data.

33. An expansion apparatus as claimed in claim 32 where the number of lines of said bi-level image data stored in said halftone image memory is less than the number of lines in the printed page.

34. An expansion apparatus as claimed in claim 31 in which said expander circuit and said halftoner circuit are contained on the same integrated circuit.

35. An expansion apparatus as claimed in claim 26 wherein the image resolution of said contone image data is less than the image resolution of said bitmap image data.

36. An expansion apparatus as claimed in claim 35 wherein said contone image data is pixel replicated after JPEG expansion so that the image resolution of said pixel replicated contone image data is the same as the image resolution of said bitmap image data.

37. A method of compressing an image said method including the steps of:
   (a) dividing the image into a plurality of cells;
   (b) detecting which of the pixels in each cell are of a specific color;
   (c) compressing information specifying the location of said pixels;
   (d) replacing said specific color in said pixels with a different color; and
   (e) compressing said cells by JPEG compression.

38. A method of compressing an image as claimed in claim 37, said method being used in a printing system having a print head comprising:
   (a) a plurality of drop-emitter nozzles;
   (b) a body of ink associated with said nozzles;
   (c) a pressurizing device adapted to subject ink in said body of ink to a pressure of at least 2% above ambient pressure, at least during drop selection and separation to form a meniscus with an air/ink interface;
   (d) drop selection apparatus operable upon the air/ink interface to select predetermined nozzles and to generate a difference in meniscus position between ink in selected and non-selected nozzles; and
   (e) drop separation apparatus adapted to cause ink from selected nozzles to separate as drops from the body of ink, while allowing ink to be retained in non-selected nozzles.

39. A method of compressing an image as claimed in claim 37, said method being used in a printing system having a print head comprising:
   (a) a plurality of drop-emitter nozzles;
   (b) a body of ink associated with said nozzles, said body of ink forming a meniscus with an air/ink interface at each nozzle;
   (c) drop selection apparatus operable upon the air/ink interface to select predetermined nozzles and to generate a difference in meniscus position between ink in selected and non-selected nozzles; and
   (d) drop separation apparatus adapted to cause ink from selected nozzles to separate as drops from the body of ink, while allowing ink to be retained in non-selected nozzles, said drop selection apparatus being capable of producing said difference in meniscus position in the absence of said drop separation apparatus.

40. A method of compressing an image as claimed in claim 37, said method being used in a printing system having a print head comprising:
(a) a plurality of drop-emitter nozzles;
(b) a body of ink associated with said nozzles, said body of ink forming a meniscus with an air/ink interface at each nozzle and said ink exhibiting a surface tension decrease of at least 10 mN/m over a 30° C. temperature range;
(c) drop selection apparatus operable upon the air/ink interface to select predetermined nozzles and to generate a difference in meniscus position between ink in selected and non-selected nozzles; and
(d) drop separation apparatus adapted to cause ink from selected nozzles to separate as drops from the body of ink, while allowing ink to be retained in non-selected nozzles.

41. A method of compressing an image as claimed in claim 37 wherein said specific color is black.

42. A method of compressing an image as claimed in claim 37 wherein said specific color is determined by a color specification which is included in the compressed data.

43. A method of compressing an image as claimed in claim 37 wherein said specific color in said pixels is replaced by a color which is the average color of all of the pixels in said cell which are not the specific color.

44. A method of compressing an image as claimed in claim 37 wherein said specific color in said pixels is replaced by a color which is the weighted average of all of the pixels which are not the specific color and which are within a specific radius of the pixel in which the color is being replaced.

45. A method of compressing an image as claimed in claim 37 wherein said specific color in said pixels is replaced by a color which is the first color found which is not said specific color when following a search path from the pixel in which the color is being replaced.

46. A method of compressing an image as claimed in claim 37 wherein said cells of pixels are rectangular and the number of pixels in said cells is an integral multiple of eight in one dimension, and a further integral multiple of eight in the perpendicular dimension, wherein said multiples of eight may be identical or may be different.

47. A method of compressing an image as claimed in claim 46 wherein the number of pixels in said cells is 24 in both dimensions.

48. A method of compressing an image as claimed in claim 37 wherein the pixels in said cells are subsampled to form 8×8 JPEG cells prior to JPEG encoding.

49. A method of compressing an image as claimed in claim 37 wherein the colors of pixels in 64 subsets of each of said cells are mathematically combined to form each pixel of 8×8 JPEG cells.

50. A compressed image expansion apparatus comprising:
(a) a JPEG decoder which converts first compressed image data to contone pixel data at a first resolution;
(b) a resolution conversion device which converts said first contone pixel data to a second contone pixel data of a second resolution, said second resolution being different from said first resolution;
(c) a compressed bitmap decoder which converts second compressed image data to bitmap image data at said second resolution;
(d) creation means to create a third contone pixel data at said second resolution, based upon the pattern of true and false entries in said bitmap image data; and
(e) a combination means which combines said second contone pixel data with said third contone pixel data to produce a fourth contone pixel data.

51. A compressed image expansion apparatus as claimed in claim 50, said expansion apparatus being used to expand image data for a printing system having a print head comprising:
(a) a plurality of drop-emitter nozzles;
(b) a body of ink associated with said nozzles;
(c) a pressurizing device adapted to subject ink in said body of ink to a pressure of at least 2% above ambient pressure, at least during drop selection and separation to form a meniscus with an air/ink interface;
(d) drop selection apparatus operable upon the air/ink interface to select predetermined nozzles and to generate a difference in meniscus position between ink in selected and non-selected nozzles; and
(e) drop separation apparatus adapted to cause ink from selected nozzles to separate as drops from the body of ink, while allowing ink to be retained in non-selected nozzles.

52. A compressed image expansion apparatus as claimed in claim 50, said expansion apparatus being used to expand image data for a printing system having a print head comprising:
(a) a plurality of drop-emitter nozzles;
(b) a body of ink associated with said nozzles said body of ink forming a meniscus with an air/ink interface at each nozzle;
(c) drop selection apparatus operable upon the air/ink interface to select predetermined nozzles and to generate a difference in meniscus position between ink in selected and non-selected nozzles; and
(d) drop separation apparatus adapted to cause ink from selected nozzles to separate as drops from the body of ink, while allowing ink to be retained in non-selected nozzles, said drop selection apparatus being capable of producing said difference in meniscus position in the absence of said drop separation apparatus.

53. A compressed image expansion apparatus as claimed in claim 50, said expansion apparatus being used to expand image data for a printing system having a print head comprising:
(a) a plurality of drop-emitter nozzles;
(b) a body of ink associated with said nozzles, said body of ink forming a meniscus with an air/ink interface at each nozzle and said ink exhibiting a surface tension decrease of at least 10 mN/m over a 30° C. temperature range;
(c) drop selection apparatus operable upon the air/ink interface to select predetermined nozzles and to generate a difference in meniscus position between ink in selected and non-selected nozzles; and
(d) drop separation apparatus adapted to cause ink from selected nozzles to separate as drops from the body of ink, while allowing ink to be retained in non-selected nozzles.

54. A compressed image expansion apparatus as claimed in claim 50 wherein said second resolution is an integral multiple of said first resolution in at least one dimension.

55. A compressed image expansion apparatus as claimed in claim 50 wherein said second resolution is the same integral multiple of said first resolution in both dimensions.

56. A compressed image expansion apparatus as claimed in claim 50 wherein the conversion method employed by said resolution conversion device to convert said first contone pixel data to said second resolution is pixel replication.

57. A compressed image expansion apparatus as claimed in claim 50 wherein the conversion method employed by said resolution conversion device to convert said first contone pixel data to said second resolution is bi-linear interpolation.

58. A compressed image expansion apparatus as claimed in claim 50 wherein the conversion method employed by said resolution conversion device to convert said first contone pixel data to said second resolution is bi-cubic interpolation.

59. A compressed image expansion apparatus as claimed in claim 50 wherein said compressed bitmap decoder includes a memory which contains a set of bitmap patterns which are substituted into said bitmap image data at said second resolution when codes specifying a member of said set of bitmap patterns is encountered in said second compressed image data.

60. A compressed image expansion apparatus as claimed in claim 50 which also includes a halftoning means which halftones said fourth contone pixel data to produce bi-level pixel data.

61. A compressed image expansion apparatus as claimed in claim 60 where said halftoning means operates by dithering.

62. A compressed image expansion apparatus as claimed in claim 60 where said halftoning means operates by error diffusion.

63. A compressed image expansion apparatus as claimed in claim 60 where said halftoning means operates by dispersed dot ordered dithering.

64. A compressed image expansion apparatus as claimed in claim 60 where said halftoning means is included on the same integrated circuit as said resolution conversion device and said compressed bitmap decoder.

* * * * *